United States Patent [19]
Cutler

[11] 3,875,382
[45] Apr. 1, 1975

[54] PATH GENERATING APPARATUS AND METHOD PARTICULARLY FOR GENERATING A TWO-LOBED EPITROCHOID CONTOUR

[76] Inventor: Hymie Cutler, 16230 Santer Rosa, Detroit, Mich. 48221

[22] Filed: July 26, 1973

[21] Appl. No.: 382,862

[52] U.S. Cl............. 235/151.11, 318/570, 318/571, 318/573
[51] Int. Cl............................................ G06f 15/46
[58] Field of Search ....... 235/151.11, 152; 318/570, 318/571, 572, 573; 90/11 C

[56] References Cited
UNITED STATES PATENTS

| | | | |
|---|---|---|---|
| 3,555,253 | 1/1971 | Seki | 235/152 X |
| 3,673,396 | 6/1972 | Seki | 318/570 X |
| 3,684,874 | 8/1972 | Kelling | 235/151.11 |
| 3,720,814 | 3/1973 | Klein | 318/573 X |

Primary Examiner—Malcolm A. Morrison
Assistant Examiner—Jerry Smith
Attorney, Agent, or Firm—Benjamin J. Barish

[57] ABSTRACT

The system described is particularly useful for tracing a two-lobed epitrochoid contour in order to produce this complex shaped housing for the Wankel rotary engine. The system generates the precise tool-center path in the form of incremental motion command pulses which are supplied to X-axis and Y-axis positioning systems to effect the relative displacement of a tracing tool (e.g. a cutter or grinding wheel) with respect to an object (e.g. the workpiece) to trace on the latter the two-lobed epitrochoid surface, and at the commanded feedrate velocity. The system described is a hard-wired one arranged to perform all the operations in parallel to achieve a very high output rate. The required calculations are performed by approximation techniques involving only simple addition, subtraction or numerical comparison, but no trigonometric operations.

22 Claims, 21 Drawing Figures

$A = (\Delta x_2 + \Delta y_2)(x_1 + y_1) \quad B = (\Delta x_1 + \Delta y_1)(x_2 + y_2)$ $E\alpha_1 = E\alpha + (\Delta x_2 + \Delta y_2)(x_1 + y_1) - 3(\Delta x_1 + \Delta y_1)(x_2 + y_2)$ $FP_2 = (E\alpha_1 < 0)$

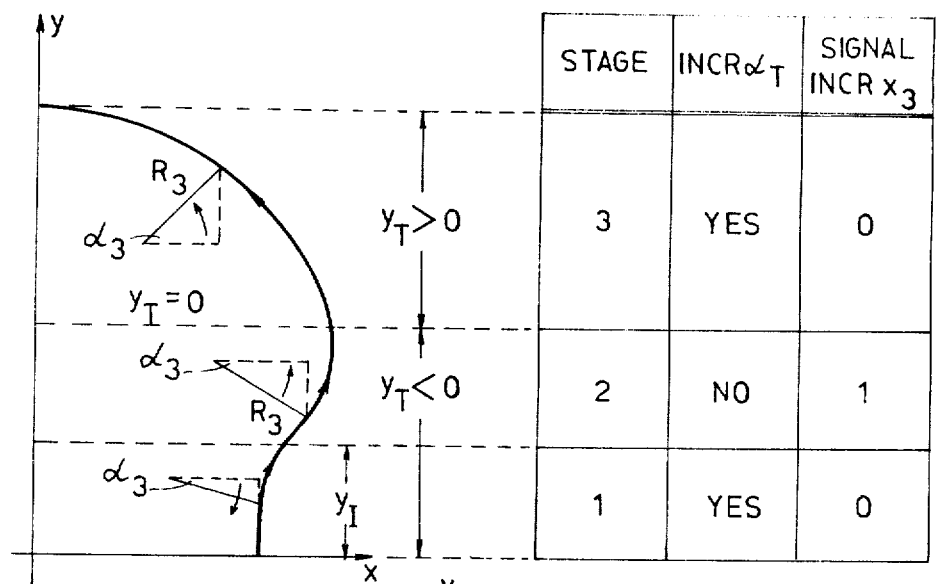
FIG.15
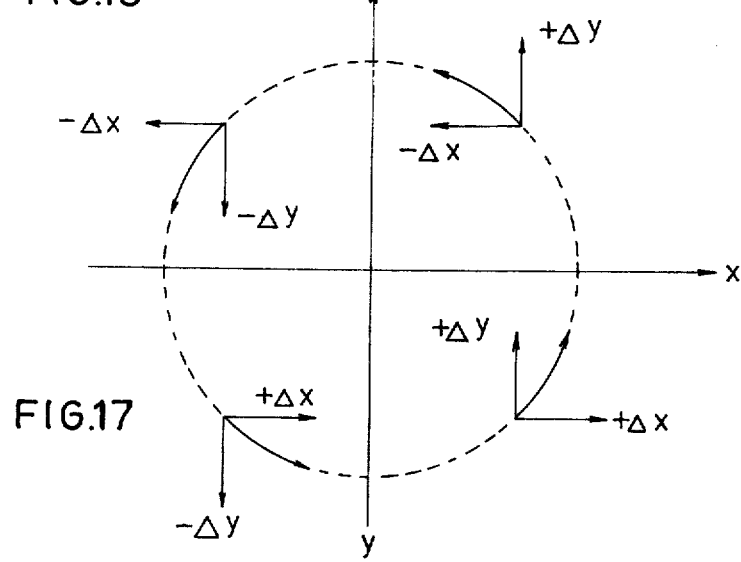
FIG.17
FIG.19
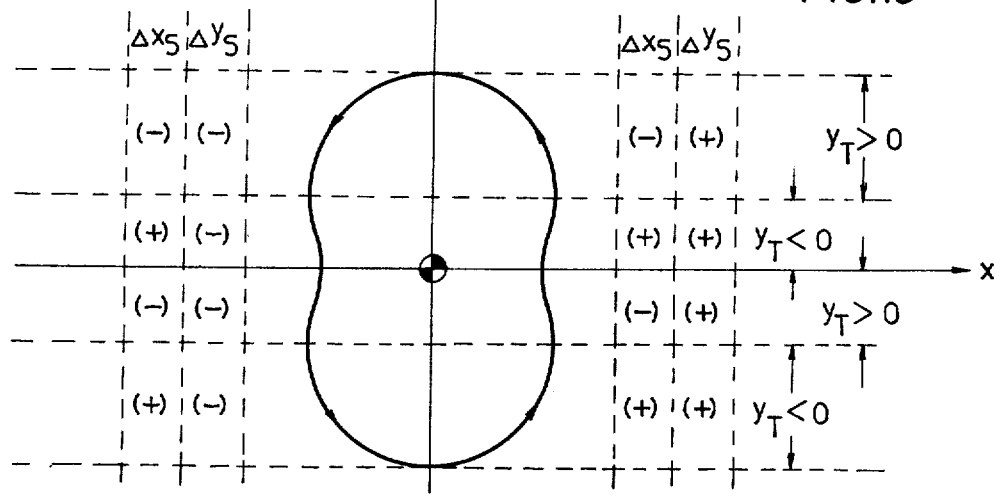

3,875,382

PATH GENERATING APPARATUS AND METHOD PARTICULARLY FOR GENERATING A TWO-LOBED EPITROCHOID CONTOUR

RELATED APPLICATIONS

This application is related to my pending U.S. Pat. application Ser. No. 319,316 filed Dec. 29, 1972 for Feedrate Control System for Numerical Control Apparatus, now U.S. Pat. No. 3,792,333, granted Feb. 12, 1974, and also to my pending U.S. Pat. application Ser. No. 319,317 filed Dec. 29, 1972 for Path Generator System for Numerical Control Apparatus. The apparatus and method of the present application preferably use the systems of these pending applications, as will be described below.

BACKGROUND OF THE INVENTION

The present invention relates to a path generating system, and particularly to a two-lobed epitrochoid generating system for numerical control apparatus, to enable such apparatus to produce the complex shaped housing for the Wankel rotary engine.

As known, the Wankel rotary engine has many advantages over conventional internal combustion engines, including less weight, more compactness, smoother operation, and fewer parts. Its housing, however, is a complex shape called a two-lobed epitrochoid. This is the figure traced by a point in a generating circle as it rolls around a base circle, the radius of the base circle being twice that of the generating circle. This complex shape must be produced with the highest degree of precision since it directly affects the sealing of the rotor and thereby the efficiency of the engine.

Such a shape is now generally produced by the use of a templet following machine, but such machines have a number of disadvantages. One serious disadvantage is that the templets are subject to wear thereby affecting the accuracy of the housing produced and requiring frequent replacement. Also, a separate templet is required for each size housing. Further, templet following machines are relatively expensive because of the need of a drive for the templet and the tracer mechanism.

SUMMARY OF THE INVENTION

The present invention provides apparatus and also a method for generating the epitrochoid contour in an electronic manner.

More specifically, the present invention, and particularly the preferred embodiment thereof described below, provides a control system that mathematically generates the precise tool center path so that the prescribed two-lobed epitrochoid surface and the prescribed velocity along that surface will be produced. This control system consists of digital electronics, highly amenable to design by integrated circuits, arranged to accept the numerical data of the basic parameters that define the required two-lobed epitrochoid surface, the velocity that the surface is to be generated, and the radius of the cutter that is to produce that surface. The output from this control is two streams of pulses, where each pulse represents a command to move a small incremental distance. Each pulse stream is supplied to an axis servo that drives a machine slide. The slides are in a Cortesian coordinate configuration so as to position the tool as commanded. The control performs the necessary computations so that the tool following the output commands will produce the contour at the surface velocity that was called for in the program.

This control system may be used for milling, grinding, honing, inspection, drafting, or other machines that require the two-lobed epitrochoid shape to be accurately traced. The method employed in this generating system for the tool path permits precise contours to be produced at high velocities. For example, for the commonly used contour parameters, rates up to 300 IPM can be produced with axes feedback of 0.0001 inch per pulse.

Allowances can be made for the dimensions of the apex seals by simply entering the data for the tool radius that much less than the actual tool size. The result will be that the control system will generate a contour parallel to and larger than the two-lobed epitrochoid shape by precisely that difference between the actual and the entered tool size. Similarly, stock can be left for subsequent machining operations by simply entering the data larger than the actual tool radius by the amount later to be removed.

Easily appended to the control system is the necessary logic to provide for bringing the tool into and out of the workpiece, for automatic homing of the axes to simplify set-up, and in the case of grinders, to provide for periodic wheel dressing and a corresponding updating of the grinding wheel radius data register.

The external control provides a "start" signal to the two-lobed epitrochoid generating system. After one complete pass of the contour has been generated, a "cycle done" signal is supplied to the external control. A number of different means such as push button keyboards, thumb switches, or read only memories (ROM's) may be provided to enter the numerical data. Once entered, the data needs to be resupplied only if it is to be changed.

Such a machine is inherently simpler than a templet following machine since it obviates the need for drives for the templet and tracer mechanism. Also, non-wearing electronics replaces the templets which are subject to wear, and a wide range of sizes can be produced by a simple change of input data. Further, the invention enables very accurate control of the surface cutting velocity thereby provided improved finish, better tool life, and optimum production rates. In addition, the use of a Cortesian coordinate system rather than a Polar one, makes multi-spindle machines possible to greatly increase production rates at a modest increase of capital and operating costs. Still further, the numerical control of the axes motions facilitates rapidly achieving precise set-up dimensions; this permits short runs without suffering the penalty of a considerable production loss while setting up for the next part.

An alternative method of electronically generating the required contour is to utilize a general purpose computer rather than the special hardwired control of the preferred system described below. One difficulty of using a computer for a real-time application is the time it takes to operate. While it may perform each individual arithmetic operation very quickly, it can perform only one operation at a time. To perform the trigonometric calculations required to locate the position of the cutter center so that the two-lobed epitrochoid surface and proper velocity are produced, takes an appreciable number of computational steps. Because of the time that it takes to calculate the cutter position, the greater the velocity at which the contour is to be generated, the greater the distance between the calculated contour points. This can affect the accuracy of the resulting contour.

The hard-wired control system of the preferred embodiment of the invention described below is arranged to perform all of its operations in parallel so a very high output rate can be achieved. Its output is in terms of incremental motion command pulses having the same fine resolution as the axes feedback. The method of performing the required calculations that is provided by this invention involves only addition, subtraction or numerical comparison operations. All direct trigonometric calculations are eliminated.

There are further advantages provided by the invention or various features thereof described below, including the following:

The velocity control system of the apparatus described is applied so as to maintain the velocity on the generated surface at the programmed rate, rather than controlling the velocity at the center of the cutting tool. When generating curves, the velocity of the tool center differs from the velocity at the surface being machined. This difference is greater for larger cutters or for sharper curves.

The numerical control systems in present use do not provide a correction for the commanded tool center path velocity so that a programmed velocity will be realized along the surface of the shape created by the tool. But it is obviously desirable in order to produce truly uniform machining rates so the resulting surface will be smoother. In the apparatus described below, maintaining of the prescribed velocity on the surface being machined is inherent.

The described apparatus provides a scheme which generates electronically with mathematical digital precision the desired shape that is to be produced by the cutter. From the current generated point on that surface, the control locates the cutter center position in a digital manner so that its radius vector is normal to the contour at the point of contact. In the usual NC system the programmer calculates the tool center path that must be programmed for the particular size of tool he intends to use so the desired shape will be cut.

Further, one of the sub-systems herein disclosed provides a simple digital means of coordinating the generating of two separate circles so their angles will be related precisely by the ratio of three-to-one. For other applications, the same principle can be applied to realize other ratios.

While the system described herein refers to the English units of measure, it will be appreciated that it could just as well be based on the metric units.

BRIEF DESCRIPTION OF THE DRAWINGS

The invention is herein described, by way of example only, with respect to a preferred embodiment thereof illustrated in the accompanying drawings, wherein:

FIG. 15 illustrates different stages in direction of the R3 circle rotation;

FIGS. 17 – 19 are diagrams helpful in understanding the contour generator of FIG. 15.

DESCRIPTION OF THE PREFERRED EMBODIMENT

General System Configuration of the Numerical Control Apparatus

Figure 1:
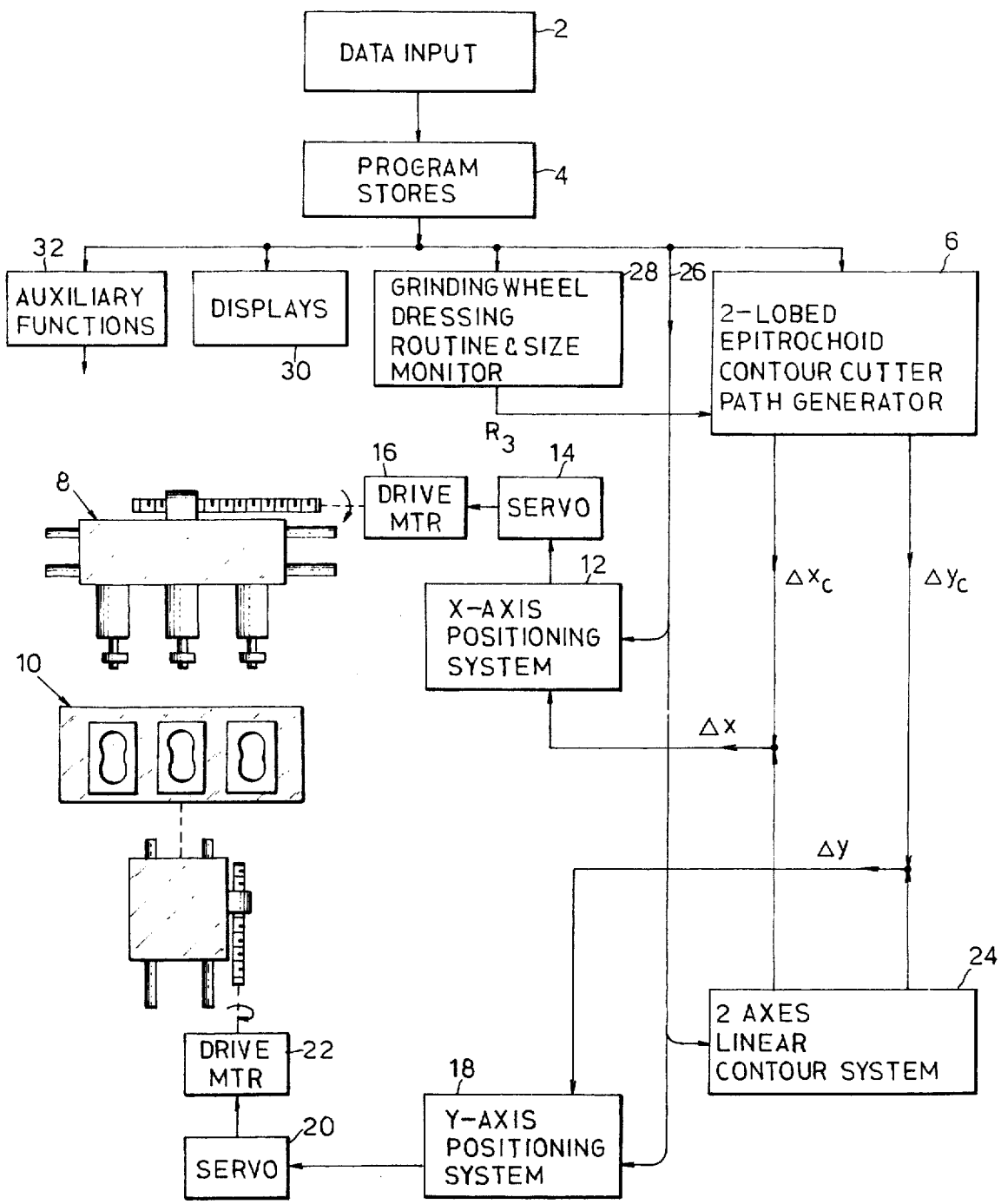
FIG. 1 is a block diagram illustrating numerical control apparatus constructed in accordance with the invention for producing two-lobed epitrochoid housings for rotary engines.

FIG. 1 illustrates the general system configuration of numerical control apparatus constructed in accordance with the invention for producing two-lobed epitrochoid housings for rotary engines of the Wankel type.

Briefly, the apparatus includes a data input 2 for entering the required data, the data being stored in a program store 4. The entered data controls a system, generally designated by block 6, which electronically generates the two-lobed epitrochoid contour cutter path. The output of generator 6 is in the form of two trains of pulses $\Delta X_c$ and $\Delta Y_c$, each pulse representing a command to move a small incremental distance along the X-axis and Y-axis respectively.

The contour is traced by displacing a tool, in this case a multiple-spindle cutter machine 8, along one orthogonal axis (the X-axis), while at the same time displacing the work-piece holder 10 along the other orthogonal axis (the Y-axis). The $\Delta X_c$ pulses from the path generator 6 are fed to the X-axis positioning system 12 which controls servo 14 for drive motor 16 driving cutter 8 along the X-axis. The $\Delta Y_c$ pulses are fed to the Y-axis positioning system 18 which controls servo 20 for drive motor 22 driving the work-piece holder 10 along the Y-axis.

The steps of motion produced by the two axes drives as commanded by the $\Delta X$ and $\Delta Y$ pulses are so small and so rapidly performed that the relative motion between the cutter and work-piece holder is effectively smooth and continuous.

Actually, the X-axis and Y-axis drives are controlled by $\Delta X$ and $\Delta Y$ pulses derived from the epitrochoid contour generator 6 and also from a two-axes linear contour system 24, to produce other programmed contours, to provide automatic homing of the axes, etc. The programmed information further includes data specifying whether the system is to operate according to a position or linear contour mode, such data being supplied via line 26 to the two-axes linear contour system 24 and to the two axes positioning systems 12 and 18. The system illustrated further includes grinding wheel dressing routine and size monitor, generally designated by box 28; displays, generally designated by box 30; and auxiliary functions (such as controls of valves and motor starters), generally designated by box 32. All of the foregoing are controlled by the program information entered through the date input 2.

Except for the epitrochoid contour path generator 6, all the foregoing sub-systems are well known in numerical control machine tools, and therefore the remainder of this description will be substantially restricted to the epitrochoid contour path generator per se.

Calculating the Cutter-Center Path for Tracing a Two-Lobed Epitrochoid Surface

Figure 2:
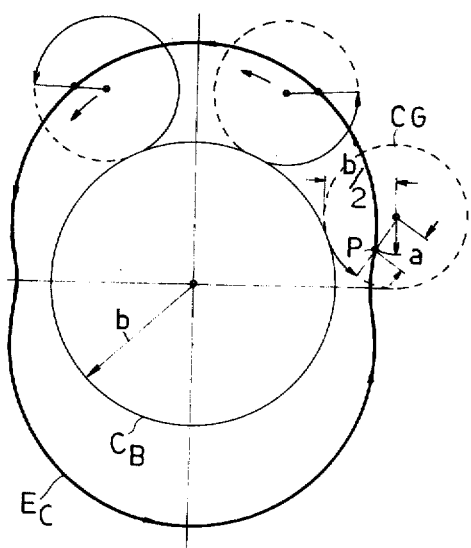
FIGS. 2 – 6 are diagrams helpful in explaining the apparatus of FIG. 1.

FIG. 2 illustrates a two-lobed epitrochoid contour EC defined by the trace of a point P in a generating circle $C_G$ as it rolls around a base circle $C_B$. The distance of the trace point P from the center of the generating circle is indicated as $a$ and the radius of the base circle is indicated as $b$. The base circle radius is twice that of the generating circle, so the radius of the latter is indicated as $b/2$.

Figure 3:
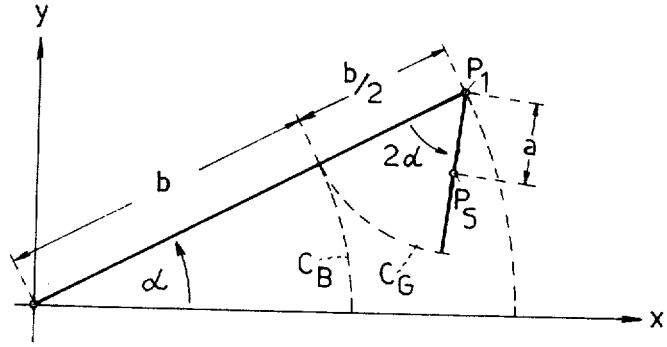

FIG. 3 is an enlarged diagram illustrating the generation of the foregoing contour, wherein, it will be seen that point $P_S$ on the radius of the generating circle $C_G$ generates the two-lobed epitrochoid contour as angle $\alpha$, formed by the radius of the base circle with the X-axis, progresses from zero to 360°.

Figure 4:
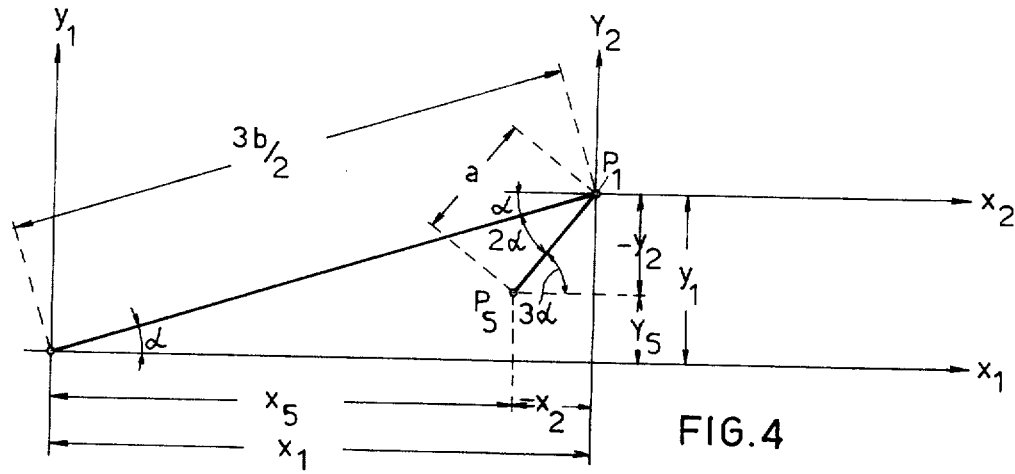

FIG. 4 diagrammatically illustrates how the coordinates of the two-lobed epitrochoid contour may be calculated. From this figure we have the following relationships:

(1) $\quad X_s = X_1 + X_2 \qquad Y_s = Y_1 + Y_2$ (2) $\quad X_1 = \frac{3b}{2} \cos \alpha \qquad Y_1 = \frac{3b}{2} \sin \alpha$ (3) $\quad \begin{aligned} X_2 &= a \cos(\pi + 3\alpha) \\ X_2 &= -a \cos 3\alpha \end{aligned} \qquad \begin{aligned} Y_2 &= a \sin(\pi + 3\alpha) \\ Y_2 &= -a \sin 3\alpha \end{aligned}$ Substituting equations (2) and (3) into equation (1) yields:

(4) $\quad X_s = \frac{3b}{2} \cos \alpha - a \cos 3\alpha$ (5) $\quad Y_s = \frac{3b}{2} \sin \alpha - a \sin 3\alpha$ The above equations (4) and (5) define the two-lobed epitrochoid surface.

Figure 5:
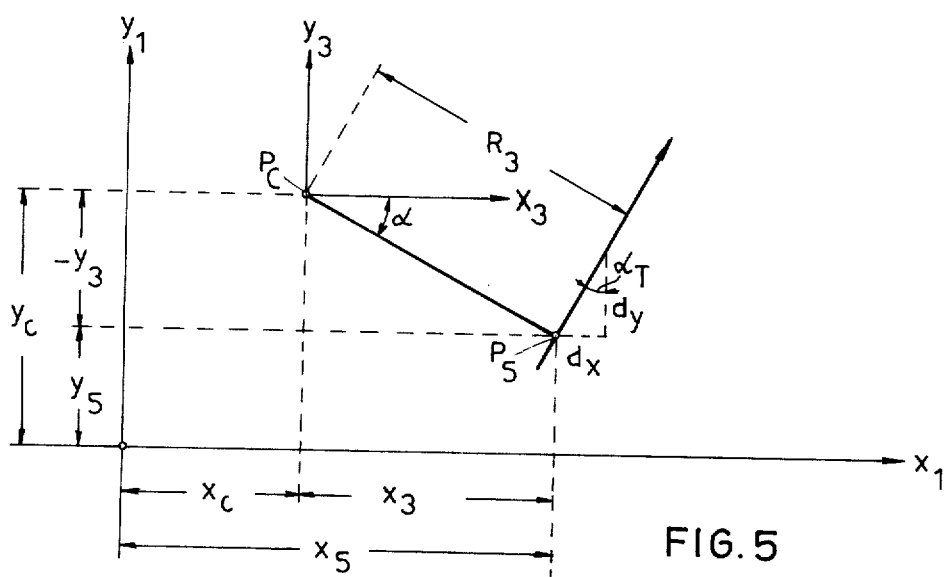

The apparatus described herein electronically generates not just the contour of the two-lobed epitrochoid surface, but also the path of the center of the cutter tool to generate this surface as its cutting edge. The diagram of FIG. 5 will be helpful in understanding how this is accomplished. Here:

$R_3$ = Cutter Radius
$P_c$ = Cutter Center Point
$P_s$ = Point on the two-lobed epitrochoid surface (6) $\quad \alpha_T = \text{Arc Tan} \frac{dxs}{dys}$ (7) $\quad \alpha_{33} = \text{Arc Tan} \frac{Y_3}{X_3}$ where $X_3$ and $Y_3$ are the axial components of the radius vector $R_3$.

The object is to continually control the position of the cutter (Point $P_c$) so that the required two-lobed epitrochoid will be produced. That requires that the vector $R_3$ must be normal to the surface at the point of contact, P. That means:

$$\alpha_3 = \alpha_T$$

or Tan $\alpha_3$ = Tan $\alpha_T$
substituting equations (6) and (7) into the above:

(8) $\quad \frac{dxs}{dys} = \frac{Y_3}{X_3}$

Differentiation of equations (4) and (5) yields the following:

$$\frac{dxs}{dys} = \frac{\frac{3b}{2} \sin \alpha + 3a \sin 3\alpha}{\frac{3b}{2} \cos \alpha - 3a \cos 3\alpha}$$

Substituting into the above the relationships expressed by equations (2) and (3) results in the following:

(9) $\quad \frac{dxs}{dys} = \frac{X_1 - 3Y_2}{X_1 + 3X_2}$

Substituting the above into equations (8) yields:

(10) $\quad \frac{Y_3}{X_3} = \frac{Y_1 + 3Y_2}{X_1 + 3X_2}$

From the geometry of the figure we can write the following:

(11) $X_c = X_s - X_3$
(12) $Y_c = Y_s - Y_3$

Equations (10), (11) and (12) define the cutter center where, as previously shown:

$X_s = X_1 + X_2$
$Y_s = Y_1 + Y_2$ $X_1 = \frac{3b}{2} \cos \alpha$ $Y_1 = \frac{3b}{2} \sin \alpha$ $X_2 = -a \cos 3\alpha$
$Y_2 = -a \sin 3\alpha$
$X_3 = R_3 \cos \alpha_T$
$Y_3 = R_3 \sin \alpha_T$ And where the angle $\alpha_T$ is defined by the relationship of equation (10).

Figure 6:
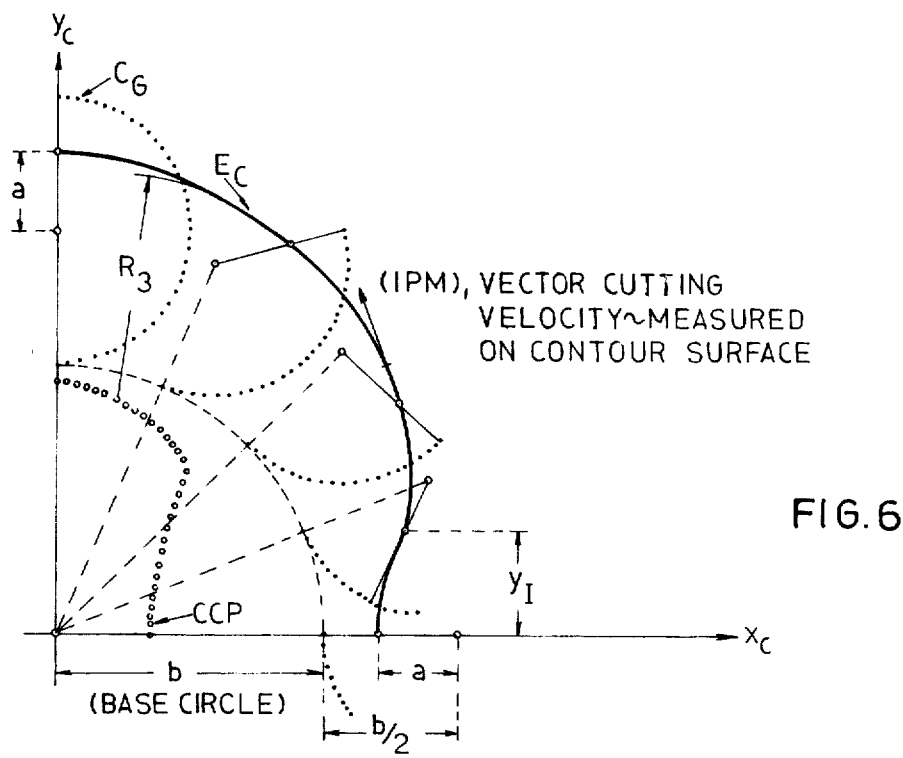

FIG. 6 illustrates the generation of a quadrant of the two-lobed epitrochoid contour EC by controlling the cutter-center path CCP, the cutter having a length $R_3$ from its center to its cutting edge. This figure also illustrates the inflection point $Y_1$, namely the point on the contour EC wherein the direction of curvature changes. It is also the point where the angle $\alpha_T$ is at a maximum value. This point will be determined off-line and fed into the apparatus with the other data determining the parameters of the contour to be generated. It can be shown that:

$$Y_i = \left(\frac{5b}{4} - a - \frac{3a^2}{b}\right) \sqrt{\frac{1}{2} - \frac{b}{16a} - \frac{3a}{4b}}$$

General System Configuration of Epitrochoid Contour Generator

Figure 7:
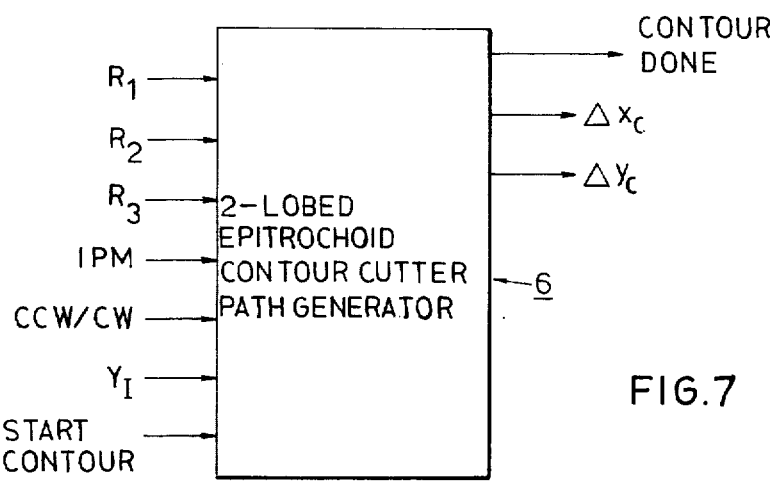
FIG. 7 is a diagram illustrating the inputs and outputs of the tool-center path generator that produces the two-lobed epitrochoid.
Figure 8:
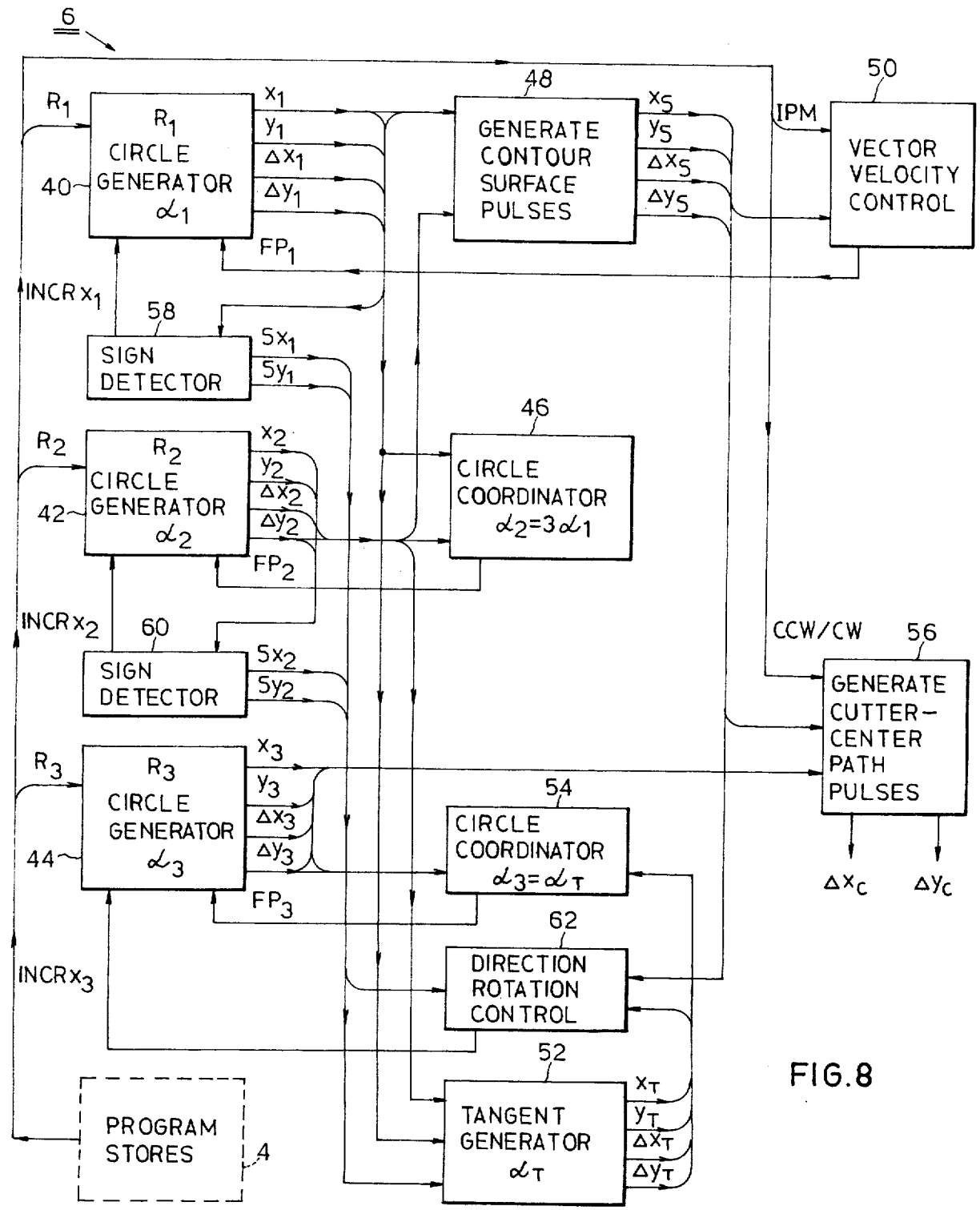
FIG. 8 is a block diagram of the tool-center path generator system in the apparatus of FIG. 1.

FIG. 7 illustrates the various inputs and outputs of the 2-lobed contour cutter-center path generator 6 used in the numerical control apparatus of FIG. 1, and FIG. 8 illustrates in block diagram form the main sub-system included in contour generator 6.

Referring first to FIG. 7, it will be seen that the inputs to the contour generator 6 include data $R_1$ and $R_2$. These relate to the parameters $a$ and $b$ mentioned above which determine the size of the epitrochoid contour to be generated. More particularly $R_1$ is equal to $3b/2$ and $R_2$ is equal to $a$. The input further includes data $R_3$, which is the cutter size, namely the length from the center of the cutter to its cutting edge. In the case of a grinding wheel this would be its radius. Further included is the feedrate command data, expressed as IPM (inches per minute), determining the cutting velocity; the commanded direction of path generation (CCW or CW); the inflection point $Y_i$ mentioned above; and the "start contour" signal.

The outputs from contour generator 6 include the $\Delta X_c$ and $\Delta Y_c$ pulses which command the step motions to the axes servo drives, and the "contour done" signal.

The main sub-systems included in the contour generator 6 are illustrated in FIG. 8. These include A. Three circle generators 40,42,44, generating electrical signals representing three circular paths having radii designated $R_1$, $R_2$ and $R_3$, respectively:

| RADIUS | EQUIVALENT QUANTITY | OUTPUT ELECTRICAL SIGNALS | | | |
|---|---|---|---|---|---|
| $R_1$ | $\frac{3b}{2}$ | $X_1$, | $Y_1$, | $\Delta X_1$, | $\Delta Y_1$ |
| $R_2$ | $a$ | $X_2$, | $Y_2$, | $\Delta X_2$, | $\Delta Y_2$ |
| $R_3$ | Cutter R. Size | $X_3$, | $Y_3$, | $\Delta X_3$, | $\Delta Y_3$ |

The "$\Delta X$" and "$\Delta Y$" signals outputted from these circle generators, as well as from the other sub-systems described below, represent the increments of motion along the respective X-axis and Y-axis on the circular arc. They are assigned a pulse weight equal to the minimum axis motion step, e.g. 0.0001 inch per pulse. The "X" and "Y" signals outputted from the circle generators and the other sub-systems described below are the respective axial distances from the arc center to the current point on the circular arc.

B. An $R_2$ circle coordinator 46 which produces feed pulses FP2 to control the rotation of the $R_2$ circle generator 42 with respect to the $R_1$ circle generator 40 so that $$\alpha_2 = 3\alpha_1$$

Here $\alpha_1$ is the angle of rotation of the $R_1$ circle, while $\alpha_2$ is the $R_2$ circle angle of rotation. The angles are measured with respect to the X-axis. This results in establishing the relationships given by equations (2) and (3).

C. A logic section 48 that combines the data from the $R_1$ and the $R_2$ circle generators 40,42 to produce the $X_s$ and $Y_s$ data, the latter being the coordinates of the two-lobed epitrochoid surface as per equation (1).

D. A vector velocity control sub-system 50 which receives the $X_s$ and $Y_s$ data together with the feedrate command data (IPM), and produces feed pulses $FP_1$ which control the rate of operation of the $R_1$ circle generator 40 so that the combined $X_s$ and $Y_s$ rate of motion on the two-lobed epitrochoid surface will be at the programmed feedrate.

E. A tangent generator 52 which produces two numbers designated $Y_T$ and $X_T$. These quantities are used to satisfy equation (10).
Here:

$$Y_T = Y_1 + 3Y_2$$
$$X_T = X_1 + 3X_2$$

These numbers establish the angle ($\alpha_T$) of the line tangent to the 2-lobed epitrochoid surface, so that:

$$\text{Tan } \alpha_T = \frac{Y_T}{X_T}$$

F. An $R_3$ circle coordinator 54 which produces feed pulses $FP_3$ to control the rotation of the $R_3$ circle so as to maintain the angle formed by the line between the point of contact of the cutter on the two-lobed epitrochoid surface and the cutter center ($\alpha_3$) normal to that surface. That is accomplished by satisfying equation (10) in this logic section.

G. A logic section 56 which combines the $R_1$, $R_2$ and $R_3$ circle data so as to produce the $X_c$ and $Y_c$ cutter center position data, as per equations (11) and (12). That $X_c$ and $Y_c$ data is supplied to the X and Y axis drive systems, either servos or open loop steppers. This will move the milling cutter or the grinding wheel, whichever is used, through a path that causes a two-lobed epitrochoid surface to be generated at a constant rate equal to the programmed feedrate.

The system further includes sign detectors 58 and 60 for the $R_1$ and $R_2$ circle generators 40 and 42, and a direction rotation control 62 which controls the $R_3$ circle generator 44, as to be described more fully below.

The $R_1$, $R_2$ and $R_3$ Circle Generators 40,42,44

The three circle generators 40,42,44 are preferably of the type described in my copending patent application Ser. No. 319,317, filed Dec. 29, 1972. Each includes three inputs, designated "R", "INCR X", and "FP", and four outputs, designated "X", "Y", "$\Delta X$" and "$\Delta Y$". The four output signals have been described above. Of the three input signals, "R" is the programmed radius such that $X^2 + Y^2 = R^2$; "FP" is the feed pulse signal which causes either a "$\Delta X$" or a "$\Delta Y$" motion pulse to be generated; and "INCR X" is the signal which controls the direction that the circular arc is generated, so that:

$$\frac{X|}{old} + (A_x)(\Delta X) \to \frac{X|}{new}$$

$$\frac{Y|}{old} + (A_y)(\Delta Y) \to \frac{Y|}{new}$$

| SIGNAL | SIGNS | |
|---|---|---|
| "INCR X" | $(A_x)(\Delta X)$ | $(A_y)(\Delta Y)$ |
| 1 | (+1) | (−1) |
| 0 | (−1) | (+1) |

Further details of such a circle generator may be had from the above-cited patent application.

In the system described in that patent application, the "INCR R" signal was supplied from the programmed data. Here, it is supplied by the respective sign detector 58,60, the details of which are illustrated in FIG. 9.

In the present system, the X, Y, $\Delta X$ and $\Delta Y$ data are all handled as positive numbers. The signs of each axis coordinate are stored separately, and when the arc crosses an axis, the sign of the axis whose data was zero changes state.

Figure 9:
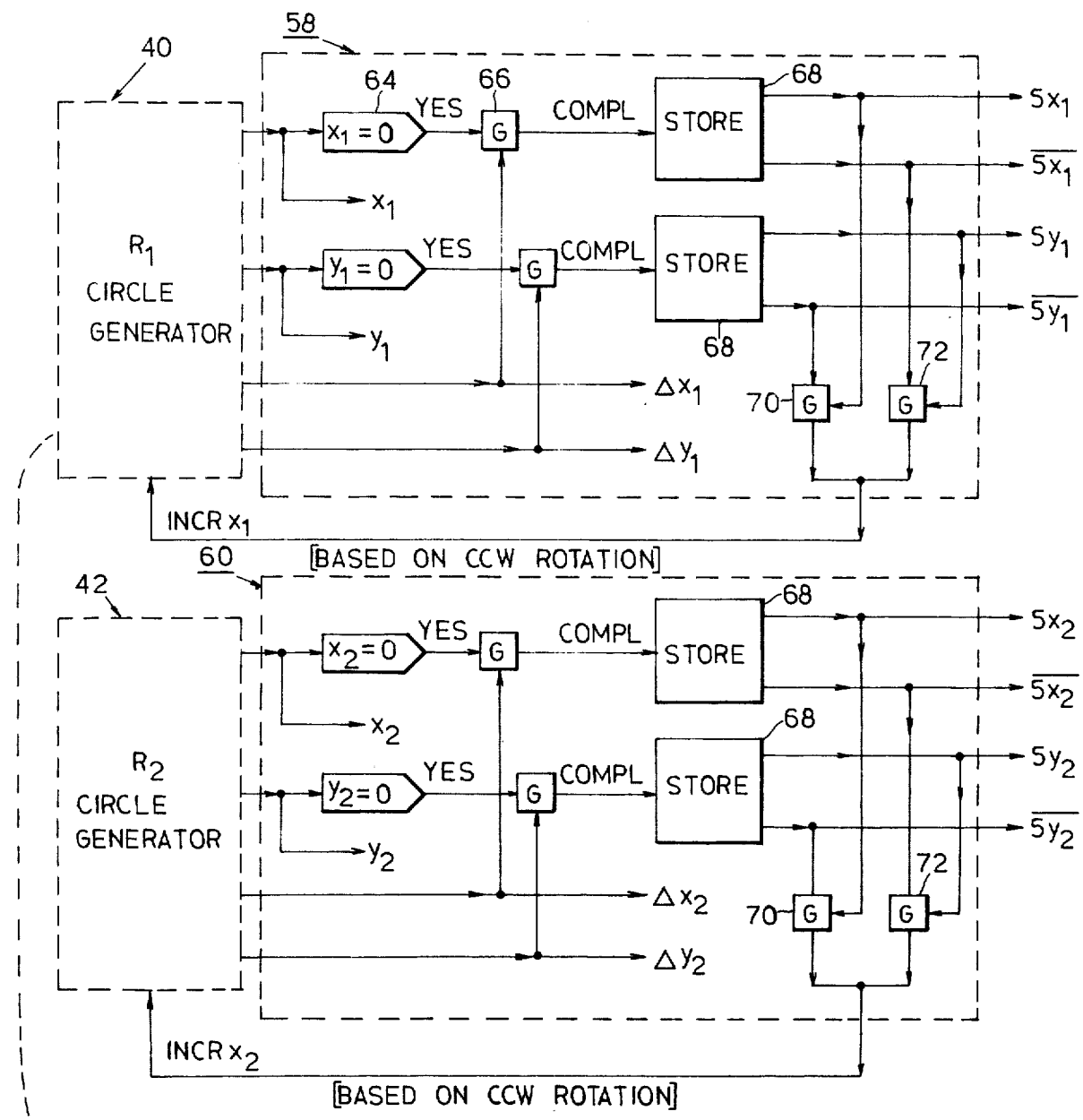
FIG. 9 illustrates the sign detectors in the system of FIG. 8.

This is shown in the block diagram of FIG. 9, wherein (with respect to the $R_1$ circle generator 40) a zero detector 64 detects when the "X" signal passes zero and when it does, gate 66 passes the next $\Delta X_1$ pulse to a flip-flop store 68 to provide a high signal on its output line $SX_1$ or its complement line $\overline{SX}_1$, depending upon the previous state of the store. Thus, the signal on the output lines is indicative of the sign of the "X" value. A similar arrangement is provided with respect to the "Y" signal of the $R_1$ circle generator, and also with respect to the "X" and "Y" signals of the $R_2$ circle generator 42.

The output lines of each sign store 68 are connected to two gates 70,72 as shown, so that an "INCR X" signal is fed to the $R_1$ circle generator 40 whenever there is coincidence between the $SX_1$ and $\overline{SY}_1$ signals, or between the $\overline{SX}_1$ and $SY_1$ signals; and similarly an "INCR $X_2$" signal is fed to the $R_2$ circle generator 42 whenever there is coincidence between the $SX_2$ and $\overline{SY}_2$ signals, or between the $\overline{SX}_2$ and $SY_2$ signals. The foregoing is based on a programmed counter-clockwise rotation; if the rotation is clockwise, the signs would be inverted.

As shown in FIG. 8, the sign signals are also fed to the direction rotation control system 62 and the tangent generator 52 described below.

The Vector Velocity Control System 50

The vector velocity control system 50 is preferably of the type described in my copending patent application Ser. No. 319,316 filed Dec. 29, 1972. Briefly, it receives the contour axis signals $\Delta X_n$, $\Delta Y_n$ from the contour generator 48 (described more fully below) supplied from the $R_1$ circle generator 40, and also receives the programmed feedrate command data IPM, and produces output feed pulses $FP_1$ controlling the rate of pulse generation of the $R_1$ circle generator so that the generation of the contour axis pulses $\Delta X_n$ and $\Delta Y_n$ is at the feedrate commanded by the programmed feedrate command data.

An operator's feedrate override may be provided to vary the actual velocity that the contour is generated, e.g. from zero to 125% of the programmed value, as described in the above-cited patent application. Further details of the system may be had from that patent application.

The programmed feedrate is retained in the machine program store 4 (FIG. 1) until a new feedrate is programmed.

Circle Coordinator 46

As noted above, the present method of generating the two-lobed epitrochoid requires that one circle ($R_2$) follow another ($R_1$) so as to maintain the precise angular relationship:

$$\alpha_2 = 3\alpha_1$$

Where:
$\alpha_1$ = Circle $R_1$ angle of rotation.
$\alpha_2$ = Circle $R_2$ angle of rotation.

That precise angular relationship can be accomplished by maintaining the following equality:

$$\Sigma(X_1 + Y_1)(\Delta X_2 + \Delta Y_2) = \Sigma 3(X_2 + Y_2)(\Delta X_1 + \Delta Y_1)$$

(13)

Figure 10A:
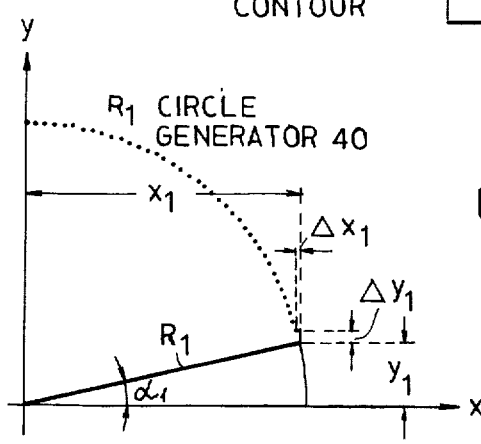
FIGS. 10a and 10b are diagrams helpful in understanding the operation of the R2 circle coordinator in the system of FIG. 8.
Figure 10B:
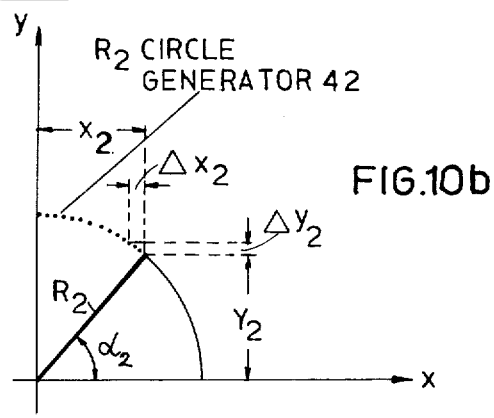

The parameters of the foregoing equation are illustrated in FIG. 10a with respect to the $R_1$ circle generator 40, and in FIG. 10b with respect to the $R_2$ circle generator 42, wherein $\Delta X_1$, $\Delta Y_1$, $\Delta X_2$ and $\Delta Y_2$ are all equal to the increment of motion, the system pulse weight.

Figure 11:
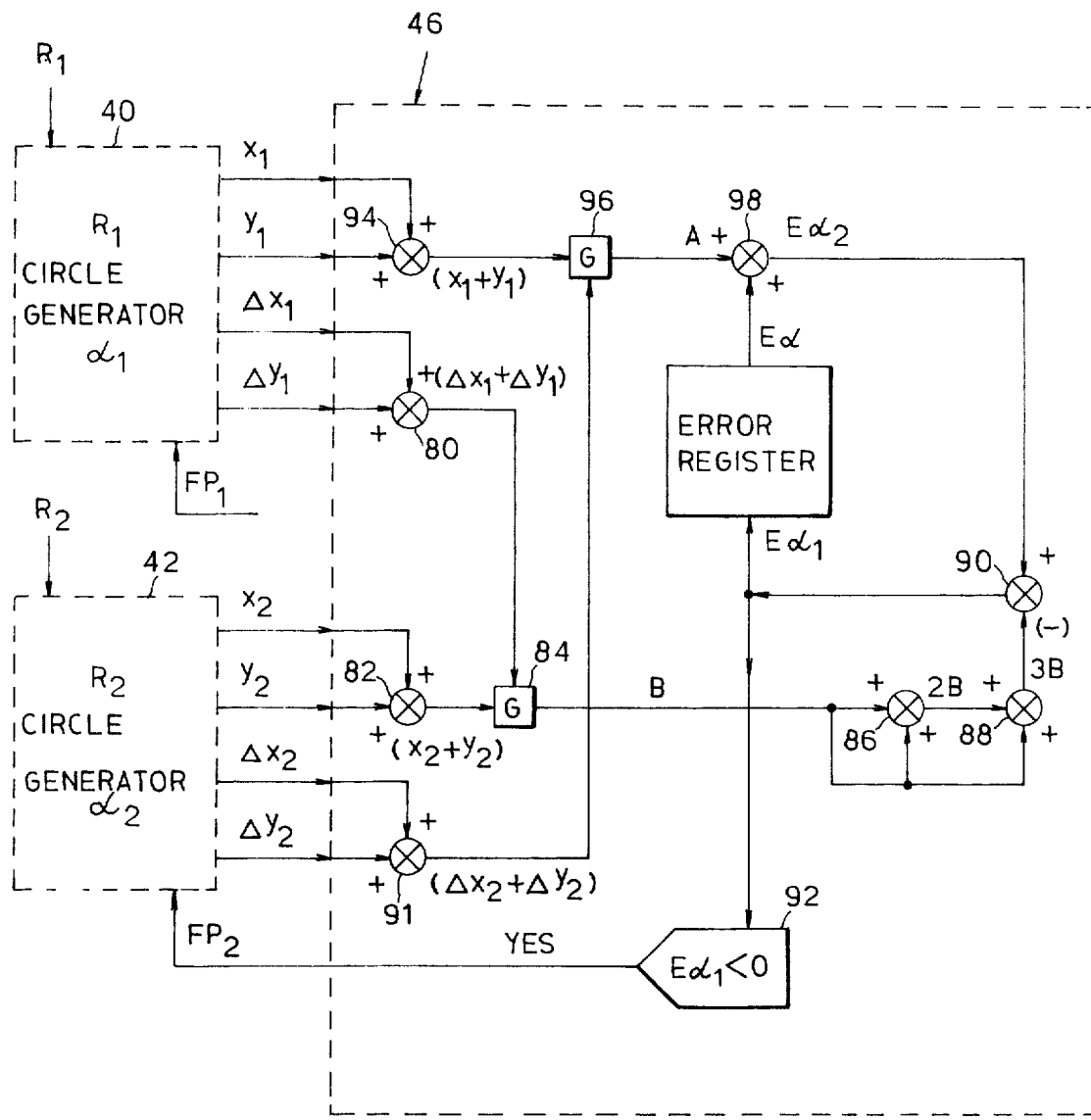
FIG. 11 is a block diagram of the R2 circle coordinator in the system of FIG. 8.

The equality (13) is solved by the circle coordinator 46 having the circuit illustrated in FIG. 11 using an error register labeled $E\alpha$:

(14) $\quad \dfrac{E\alpha}{n} - 3(\Delta X_1 + \Delta Y_1)(X_2 + Y_2) = E\alpha_1$

(15) $\quad E\alpha_1 + (\Delta X_2 + \Delta Y_2)(X_1 + Y_1) = E\alpha_2 = E\alpha_2 \dfrac{E\alpha}{n+1}$

(16) $\quad (E\alpha_1 < 0) = (F\ P_2)$
$\quad (F\ P_2) = (\Delta X_2 + \Delta Y_2)$ Equations (14), (15) and (16) are the control algorithms that result in satisfying equality (13) and thereby realizing the relationship $\alpha_2 = 3\alpha_1$. Here:

$\dfrac{E\alpha}{n}$ = One value of the error register $\dfrac{E\alpha}{n+1}$ = Next value of the error register $E\alpha_1$ = New value of $E\alpha$ due to either $\Delta X_1$ or $\Delta Y_1$ pulses.

$E\alpha_2$ = New value of $E\alpha$ due to either the $\Delta X_2$ or $\Delta Y_2$ pulses.

The circle coordinator circuit of FIG. 11 solves the equality of equation (13) in the following manner.

As the $R_1$ circle generator 40 operates (under the control of FP1 feed pulses as described above) to generate the train of $\Delta X_1$, $\Delta Y_1$ pulses representing the $R_1$ circle (having a radius equal to $3b/2$), each $\Delta X_1$ or $\Delta Y_1$ pulse causes the error register $E\alpha$ to be incremented in one direction (in this case, a subtraction) by three times the sum of $X_2$ and $Y_2$ distances, i.e. the X-axis and Y-axis distances of the current point on the $R_2$ circle radius as shown in FIG. 10b. This is accomplished by summing points 80,82 gate 84, and summing points 86, 88, 90,91 in FIG. 11.

The circle coordinator circuit of FIG. 11 further includes a sign detector 92 which detects the sign of error register $E\alpha$. If the error register is less than zero (a negative number), sign detector 92 generates a feed pulse $FP_2$ which causes the $R_2$ circle generator to produce either a $\Delta X_2$ or $\Delta Y_2$ pulse.

When either a $\Delta X_2$ or $\Delta Y_2$ pulse is generated, it causes the error register $E\alpha$ to be incremented in the opposite direction (in this case, an addition) by the sum of the $X_1$ and $Y_1$ values, i.e. the X-axis and Y-axis distances of the current point on the $R_1$ circle radius as shown in FIG. 10a. This is accomplished by summing points 92,94 gate 96, and summing point 98 in FIG. 11.

When the error register finally becomes zero or positive, the generation of further $FP_2$ pulses as well as $\Delta X_2$ and $\Delta Y_2$ pulses, will cease; and only when additional $\Delta X_1$ or $\Delta Y_1$ pulses are generated, will the error register again become negative to produce further feed pulses $FP_2$ and thereby further $\Delta X_2$ and $\Delta Y_2$ pulses.

Thus, the system behaves so as to always tend to keep the contents of the error register $E\alpha$ equal to zero, and thereby to realize the equality of equation (13).

The equality of equation (13) has also been derived mathematically but such derivation is not essential to an understanding of the invention and therefore is not included herein.

In a numerical example, wherein $R_1 = 150$ and $R_2 = 40$, the circle coordination $\alpha 2 = 3\alpha 1$ was found to be non-cumulative and to an accuracy where the error was less than one pulse of motion. For a digital system, that is zero error.

Control of $R_3$ Circle Generator 44

As noted above one of the things need in order to generate the cutter-center path that will produce the specified 2-lobed epitrochoid is to maintain precisely the following angular relationship: $\alpha 3 = \alpha T$ Where:

$\alpha 3$ = Angle formed by the X-axis and the cutter radius vector, $R_3$ that contacts the current generated point on the two-lobed epitrochoid surface; and $\alpha_T$ = Angle with respect to the Y-axis formed by the tangent to the current generated point on the two-lobed epitrochoid surface.

This function is performed by circle coordinator 54. As shown in FIG. 8, this circle coordinator has an input from tangent generator 52 (illustrated in FIG. 12) and a second input from $R_3$ circle generator 44. FIG. 13 illustrates a block diagram of the circle coordinator 54. Its output is in the form of $FP_3$ feed pulses which control the $R_3$ circle generator 44 to maintain the foregoing relationship $\alpha 3 = \alpha_T$. The direction of rotation of $R_3$ circle generator 44 is controlled by sub-system 62 (illustrated in FIG. 14) which determines the direction of rotation by its output "INCR $X_3$" signal.

Tangent Generator 52

From FIG. 8, it will be seen that tangent generator 52 includes inputs from the $R_1$ and $R_2$ circle generators 40,42 and from their respective sign detectors 58,60 and produces the following outputs:

a. $X_T$ and $Y_T$ data, which defines the angle $\alpha_T$ at the current generated point on the two-lobed epitrochoid surface; and $\Delta X_T$ and $\Delta Y_T$ pulses, which have a value of one unit, the basic system pulse value. These pulses modify the $X_T$ and the $Y_T$ data respectively such that:

$$X_T = X_{T0} + \Sigma \Delta X_T$$

$$Y_T = Y_{T0} + \Sigma \Delta Y_T$$

where $X_{T0}$ and $Y_{T0}$ are the initial values.

The quantities $X_T$ and $Y_T$ are the X and Y components of a line normal to the current generated point of the two-lobed epitrochoid surface. It can be shown that they can be derived from the above-mentioned inputs to the tangent generator as follows:

(17) $\quad Y_T = Y_1 + 3Y_2 \qquad X_T = X_1 + 3X_2$ or the equivalent

(18) $\quad \Delta Y_T = \Delta Y_1 + 3(\Delta Y_2) \qquad \Delta X_T = \Delta X_1 + 3(\Delta X_2)$

(19) $\quad Y_T = Y_{T0} + \Sigma \Delta Y_T \qquad X_T = X_{T0} + \Sigma \Delta X_T$ $\quad Y_{T0} = 0 \qquad X_{T0} = R_1 - 3R_2$ The initial values $X_{T0}$ and $Y_{T0}$ are based on a starting for generating the contour at angle $\alpha_1 = 0$. The signs of the delta quantities $\Delta X_1$; $\Delta Y_1$, $\Delta X_2$ and $\Delta Y_2$ from the circle generators are as defined earlier.

Figure 12:
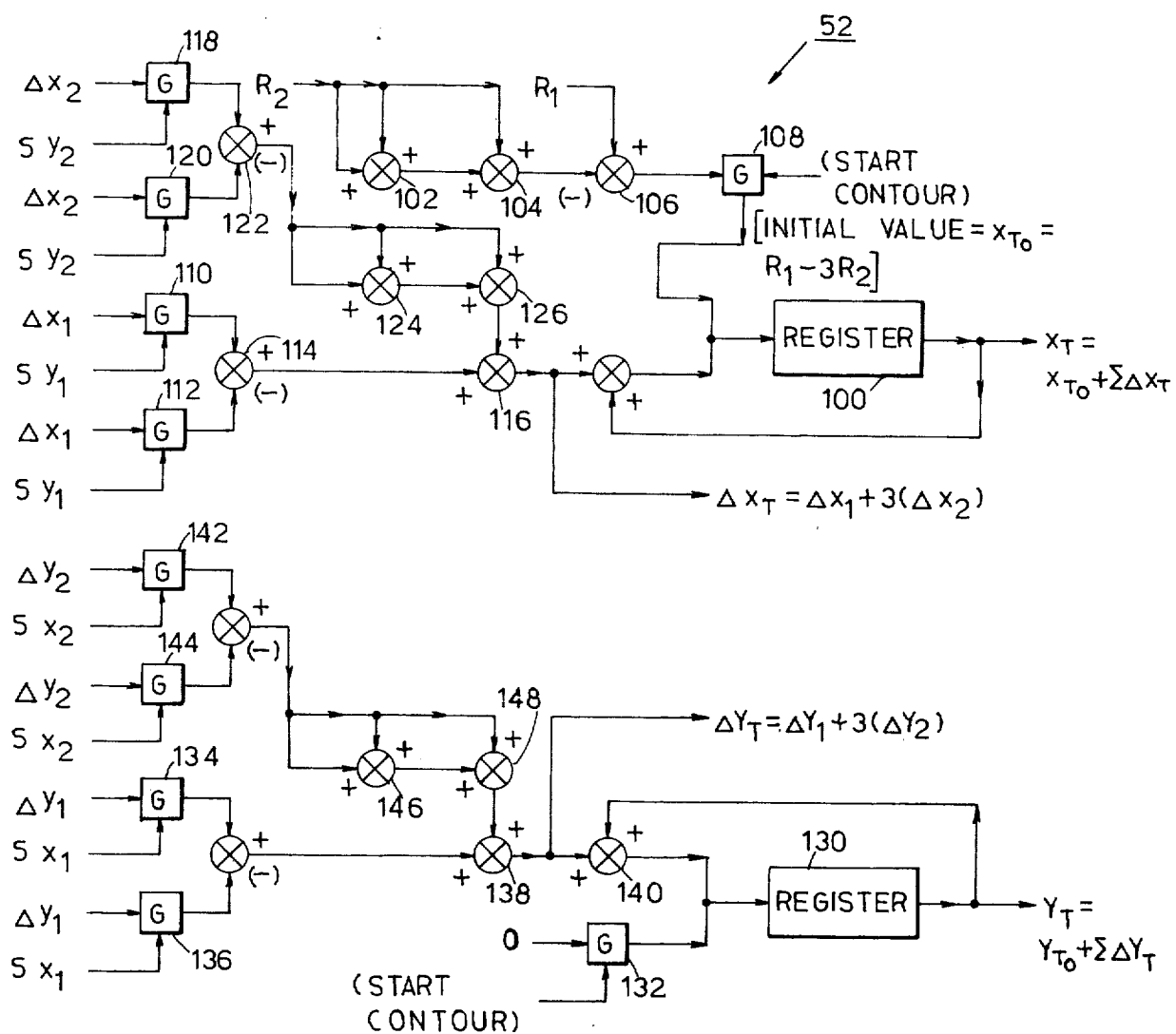
FIG. 12 is a block diagram illustrating the tangent generator in the system of FIG. 8.
Figure 13:
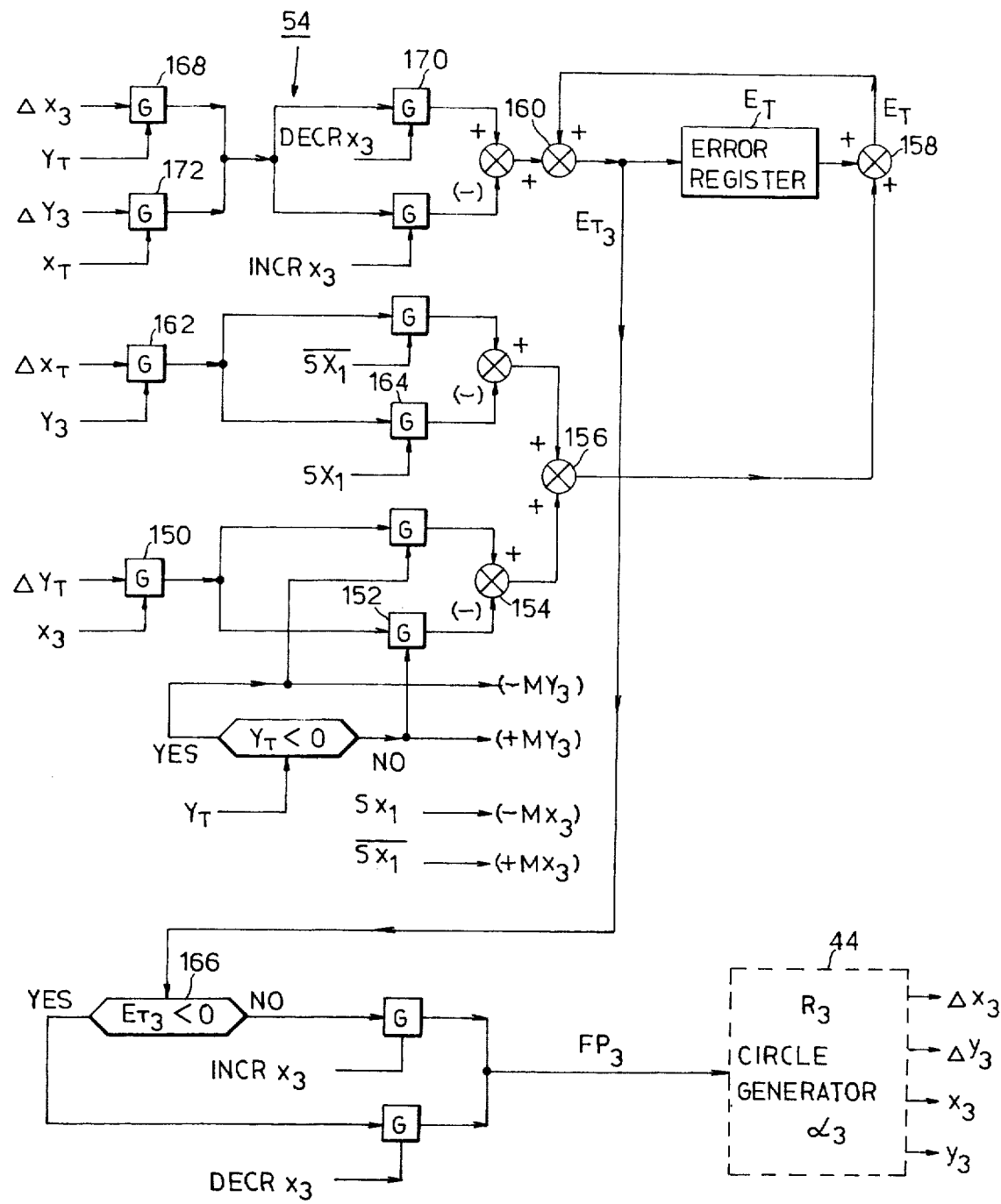
FIG. 13 is a block diagram of the R3 circle coordinator in the system of FIG. 8.

The block diagram of FIG. 12 illustrates such a tangent generator, based on counter-clockwise rotation, with the starting point of the contour on the X-axis at $\alpha_1 = 0°$.

The $X_T$ data is outputted from a register 100 which receives the initial data $(R_1 - 3R_2)$ via summing points 102, 104, 106 and gate 108. The $\Delta X_T$ pulses $\Delta X_T = \Delta X_1 + 3 \Delta X_2$) are produced by gating the $\Delta X_1$ pulses in accordance with the respective sign of $Y_1$ (i.e. $SY_1$ or $\overline{SY}_1$) via gates 110, 112; and summing them, in summing points 114,116, with three times the $\Delta X_2$ pulses supplied from gates 118,120, in accordance with the respective sign of $Y_2$ (i.e. $SY_2$ or $\overline{SY}_2$) and summing points 122, 124, 126.

The $Y_T$ data is outputted from a register 130 which receives the initial data (0, in this case) from gate 132. The $\Delta Y_T$ pulses ($\Delta Y_T = \Delta Y_1 + 3 \Delta Y_2$) are produced by gating the $\Delta Y_1$ pulses in accordance with the respective sign of $X_1$ (i.e. $SX_1$ or $\overline{SX}_1$) via gates 134, 136, and summing them, in summing points 138, 140 with three times the $\Delta Y_2$ pulses supplied from gates 142, 144 in accordance with the respective sign of $X_2$ (i.e. $SX_2$ or $\overline{SX}_2$) and summing points 146, 148.

Circle Coordinator 54

Circle coordinator 54 receives on the one hand the foregoing outputs of tangent generator 52, and on the other hand, the following inputs from the $R_3$ circle generator 44:

a. $X_3$ and $Y_3$ circle coordinate data with respect to the $R_3$ arc center; that data defines the angle $\alpha_3$.

b. $\Delta X_3$ and $\Delta Y_3$ pulses; these have a value of one unit, the basic system pulse value, and are the motion pulses that generate the $R_3$ circular arc.

The output of circular coordinator 54 is an "$FP_3$" feed pulse, which causes the $R_3$ circle generator to produce either a$\Delta X_3$ or a $\Delta Y_3$ pulse rotating the $R_3$ radius vector and thereby modifying the $\alpha_3$ angle. When the generated motion along the surface of the two-lobed epitrochoid causes a change in the angle of the tangent to that current point such that $\alpha_T$ becomes greater than $\alpha_3$, then circle coordinator 54 generates one or more $FP_3$ pulses until the $\alpha_3$ angle becomes either equal to $\alpha_T$ or until the last $\Delta X_3$ or $\Delta Y_3$ pulse produced causes angle $\alpha_3$ to go just beyond angle $\alpha_T$.

The $\Delta X_3$ and $\Delta Y_3$ pulses are used to continuously position the cutter tool so that it will produce the required contour.

It can be shown (again the derivation is herein omitted as not essential to an understanding of the present invention) that this $\alpha_3 = \alpha_T$ relationship can be effected by fulfilling the following:

(20) $\quad X_3 \Sigma \Delta Y_T + Y_3 \Sigma \Delta X_T = X_T \Sigma \Delta Y_3 + Y_T \Sigma \Delta X_3$ This is the basic control equation that allows to control the rotation of the $R_3$ (cutter radius) circle generator 44, to produce a precise $\alpha_3 = \alpha_T$. This equation is implemented by the use of an error register "ET" in FIG. 13, as shown below:

$$(21) \quad \frac{ET}{OLD} - (\Delta Y_T X_3 + \Delta X_T Y_3) + (\Delta Y_3 X_T + \Delta X_3 Y_T) = \frac{ET}{NEW}$$

$$(22) \quad (FP_3) = (ET < 0)$$

The foregoing equations are implemented by the diagram of FIG. 13 which produces the precise control of $(\alpha_3 = \alpha_T)$; it operates as follows:

The presence of either a $\Delta Y_T$ or a $\Delta X_T$ pulse indicates a change of the $\alpha_T$ angle. The $\Delta Y_T$ pulse, via gates 150, 152 and summing points 154, 156, 158, 160, causes the $X_3$ number to be subtracted from the ET register; while a $\Delta X_T$ pulse, via gates 162, 164, causes the $Y_3$ number to be subtracted.

If the ET register becomes negative as detected by sign detector 166, $FP_3$ pulses will be generated. Those pulses will in turn cause the $R_3$ circle generator 44 to operate to produce either $\Delta X_3$ or $\Delta Y_3$ pulses. The $\Delta X_3$ pulse, via gates 168, 170, will cause the $X_T$ number to be added to that register.

When register ET becomes positive, the generation of $FP_3$ pulses will stop. When that occurs angle $\alpha_3$ will either be equal or just beyond $\alpha_T$ by an amount less than that produced by a single $\Delta X_3$ or $\Delta Y_3$ pulse.

Thus by the process just described register ET always tends toward zero with the result that the above equation (20) is satisfied.

It should be noted that in the above discussions a simplification was made wherein it was assumed all motion pulses produced a change of angle in the same direction. That will not always be so. The circle coordinator 54 thus utilizes the sign signals $(SX_1, \overline{SX}_1)$ and the "INCR $X_3$", "DECR $X_3$" signals, and also produces signals $(-MY_3, +MY_3, -MX_3, +MX_3)$ identifying the direction of motion of the $\Delta X_3, \Delta Y_3$ pulses, which are fed to the direction rotation control sub-system 62, as described below.

Direction Rotation Control 62

Figure 14:
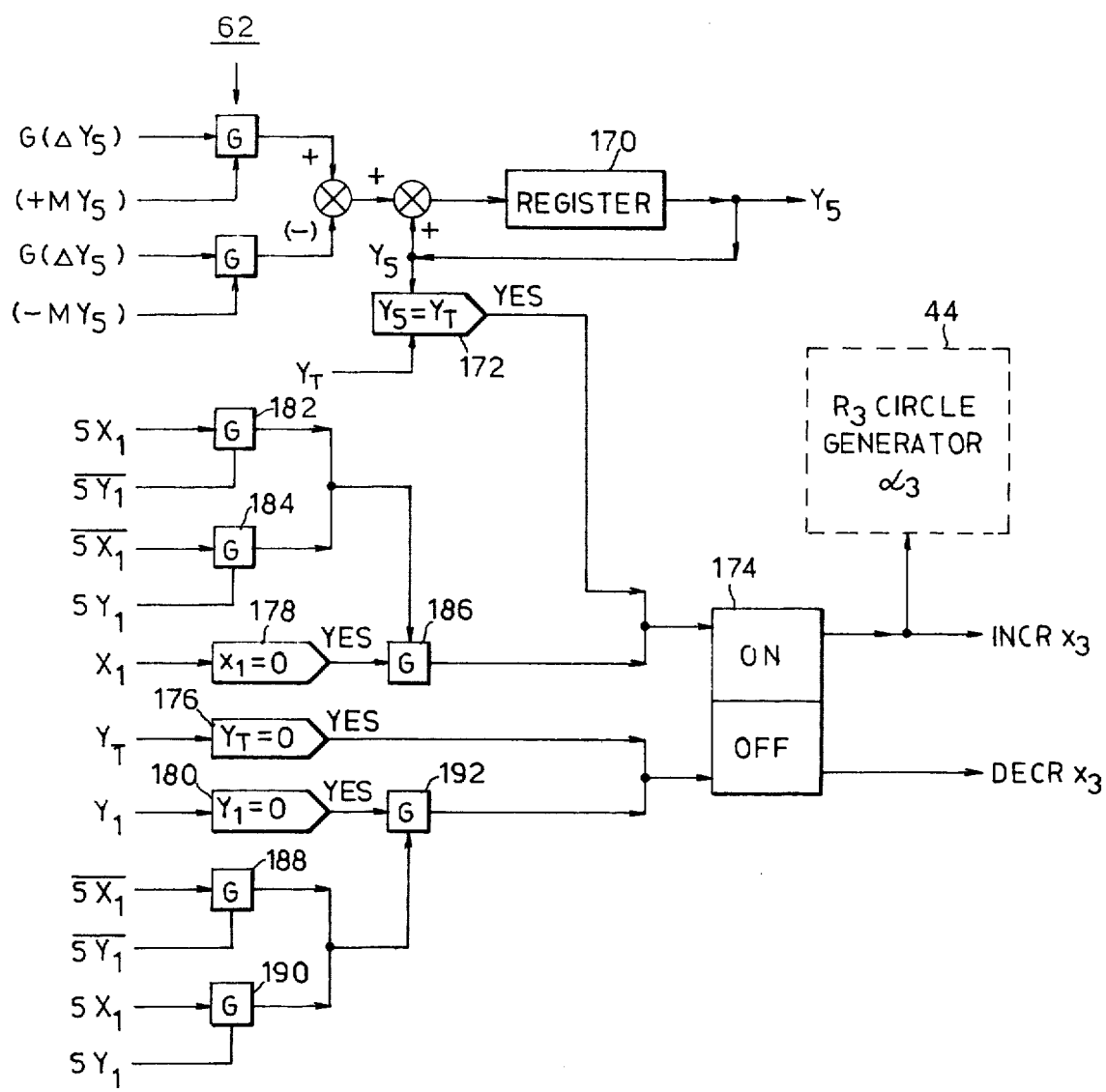
FIG. 14 is a block diagram of the direction of the R3 circle rotation control sub-system in the system of FIG. 8.

The direction rotation control sub-system 62 is illustrated in FIG. 14. Its main function is to provide an "INCR $R_3$" signal to $R_3$ circle generator 44 which controls the direction of rotation of the $R_3$ radius while following the change of the angle of tangent $\alpha_T$.

FIG. 15 illustrates a quadrant of the 2-lobed contour. Shown on the figure is how the state of the "INCR $X_3$" signal changes in the quadrant.

The "$Y_I$" dimension in FIG. 15 is the Y-component of the point of inflection of the contour. At that point angle $\alpha_T$ is at its maximum negative angle, as indicated earlier. The "$Y_I$" number will be determined off-line and supplied as one of the programmed parameters. The control compares the generated Y-axis surface coordinate (labeled $Y_s$) to the programmed value of $Y_I$; and when $Y_s = Y_I$, the state of the "INCR $X_3$" signal is changed.

This is seen in FIG. 14, wherein a register 170 stores the $Y_s$ value (from the contour surface generator 48, shown broadly in FIG. 8, and specifically in FIG. 16, described more fully below). The $Y_s$ value is compared in comparator 172, with the programmed $Y_I$ value, and whenever $Y_s = Y_I$, a signal is produced to change the state of a flip-flop store 174. One output line of the latter provides the "INCR $X_3$" signal to the $R_3$ circle generator 44.

The $Y_T$ number is the Y-component of the tangent vector and is determined by the tangent generator 52, FIG. 12. When the $Y_T$ number changes sign, the "INCR $X_3$" signal also changes its state. This is shown in FIG. 14 by comparator 176 which detects when $Y_T$ passes zero and provides a signal to flip-flop 174 when this occurs.

The flip-flop store 174 is also changed in one direction when $X_1$ passes zero, and in the opposite direction when $Y_1$ passes zero, these conditions being detected by "zero" detectors 178 and 180, respectively. Note from FIG. 14 that the $X_1$ signal will produce an "INCR $X_3$" signal only when the signs of $X_1, Y_1$ (FIG. 9) are $SX_1$ and $\overline{SY}_1$, or $\overline{SX}_1$ and $SY_1$, as controlled by gates 182, 184, 186; and that the $Y_1$ signal will produce a "DECR $X_3$" signal only when the respective signs are $\overline{SX}_1$ and $\overline{SY}_1$, as controlled by gates 182, 184, 186; and that the $Y_1$ signal will produce a "DECR $X_3$" signal only when the respective signs are $\overline{SX}_1$ and $\overline{SY}_1$ or $SX_1$ and $SY_1$, as controlled by gates 188, 190, 192.

The set of algorithms that follow are equations (21) and (22) with the proper signs assigned so as to generate $\alpha_3 = \alpha_T$ in the first quadrant when the direction of motion about the contour is counter-clockwise. These algorithms take into account whether the $\Delta X_3$ or $\Delta Y_3$ pulses are increasing or decreasing the angles.

All numbers are handled as positive quantities except for $\Delta X_T$ and $\Delta Y_T$ which are signed pulses where the sign denotes the direction of motion.

a. Stage 1, $Y_s < Y_1$ $$\frac{ET}{OLD} + (\Delta X \cdot Y_T + \Delta Y_3 X_T) + (\Delta Y_T X_3 + \Delta X_T Y_3) = \frac{ET}{NEW}$$
$$(\Delta X_3 + \Delta Y_3) = (ET < 0)$$

b. Stage 2 $(Y_s > Y_I, Y_T < 0)$ $$\frac{ET}{OLD} - (\Delta X_3 Y_T + \Delta Y_3 X_T) + (\Delta Y_T X_3 + \Delta X_T Y_3) = \frac{ET}{NEW}$$

c. Stage 3 $Y_T > 0$ $$\frac{ET}{OLD} + (\Delta X_3 Y_T + \Delta Y_3 X_T) + (-\Delta Y_T X_3 + \Delta X_T Y_3) = \frac{ET}{NEW}$$

In a numerical example, wherein $R_1 = 150$, $R_2 = 40$ and $R_3 = 50$, it was found that the system described above controlled the $R_3$ circle generator 44 rotation so as to hold $\alpha_3 = \alpha_T$ within one pulse of $R_3$ rotation.

Contour Surface Pulse Generator 48

Figure 16:
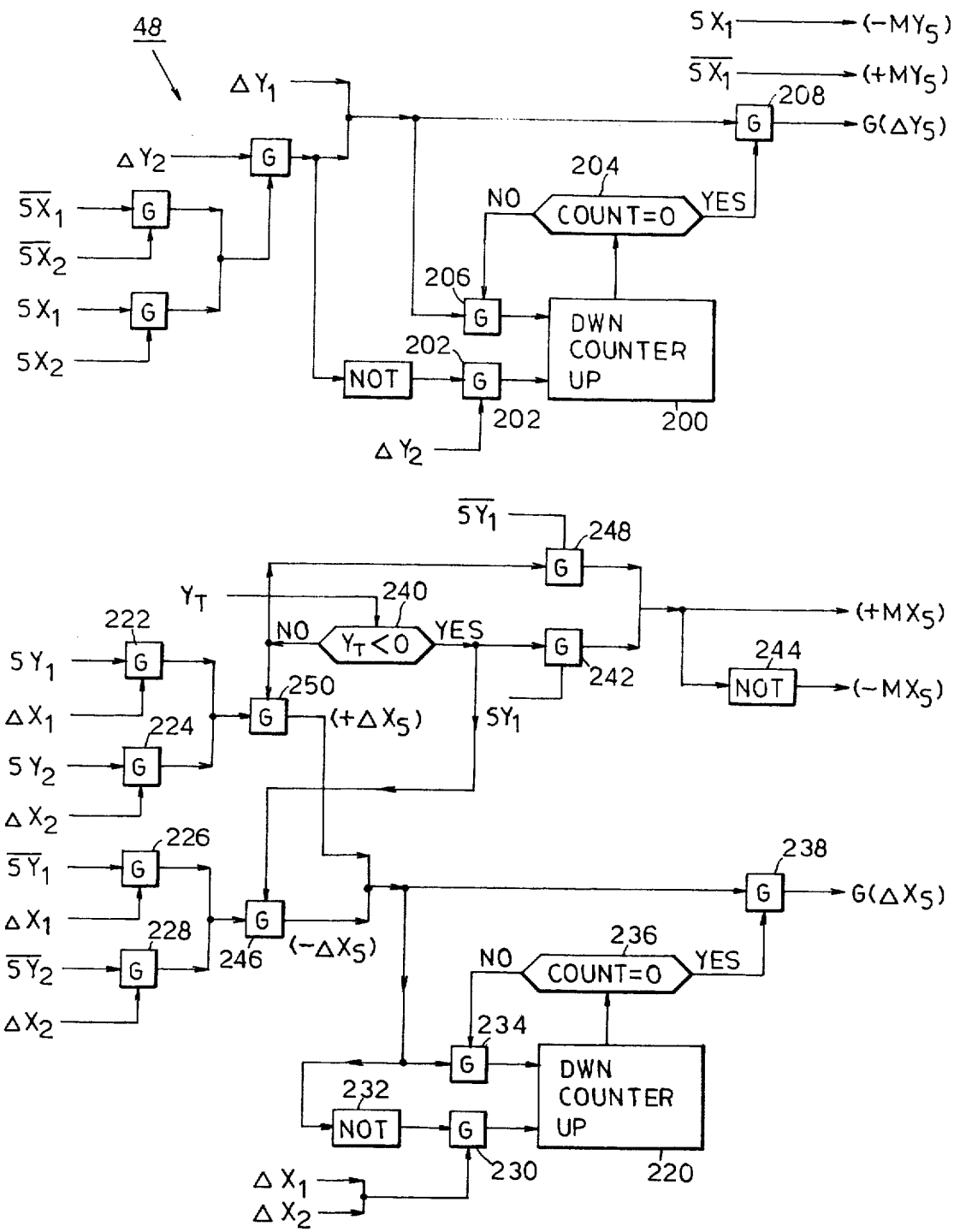
FIG. 16 is a block diagram of the contour generator in the system of FIG. 8.

FIG. 16 illustrates the system for generating the contour data $X_s, Y_s$ and motion pulses $\Delta X_s, \Delta Y_s$ from the outputs of the $R_1$ and $R_2$ circle generators 40, 42.

The contour is generated by implementing the previous given equation (1) which is:

$$X_s = X_1 + X_2 \qquad Y_s = Y_1 + Y_2$$

Where $X_1$ and $Y_1$ are from the $R_1$ circle generator; $X_2$ and $Y_2$ are from the $R_2$ circle generator; and $X_s$ and $Y_s$ provide the coordinates of the two-lobed epitrochoid surface. Here we will explain the direction signs involved with equation (1). Equation (1) may be written as follows:

(23)
$$X_s = X_{s0} + \Sigma \Delta X_s$$
$$Y_s = Y_{s0} + \Sigma \Delta Y_s$$

where $$\Delta X_s = \Delta X_1 + \Delta X_2 \quad \Delta Y_s = \Delta Y_1 + \Delta Y_2$$
$$X_{s0} = R_1 - R_2 \quad Y_{s0} = 0$$

In the following we will assume counter-clockwise motion around the contour surface. The signs representing the direction of motion would be complemented if we assume the other direction of rotation. For both circles $R_1$ and $R_2$, the signs giving the direction of the increments of motion represented by their output pulses are given in FIG. 17.

The control system provides for circle generator $R_2$ to rotate through three times the angle of arc as circle $R_1$ rotates. That results in the relationship of circle $R_1$ and $R_2$ as shown in FIG. 18.

Figure 18:
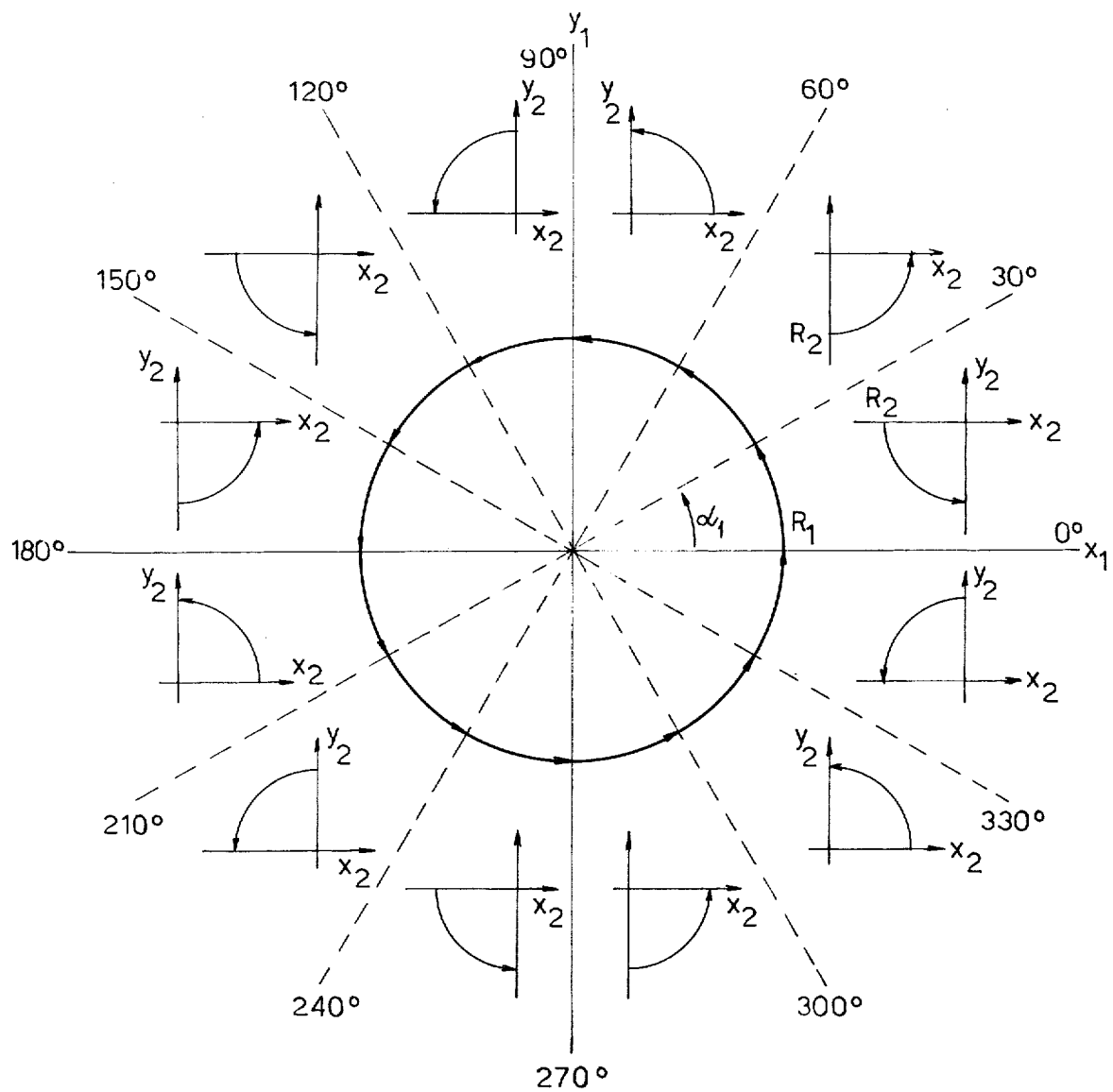

The signs of the $R_1$ and the $R_2$ circle generator output pulses can be charted with respect to angle $\alpha_1$ using FIG. 18 to produce the following table:

| $\alpha 1$ | $\Delta X_1$ | $\Delta X_2$ | $\Delta Y_1$ | $\Delta Y_2$ |
|---|---|---|---|---|
| 0 – 30° | –1 | +1 | +1 | –1 |
| 30 – 60° | –1 | +1 | +1 | +1 |
| 60 – 90° | –1 | –1 | +1 | +1 |
| 90 – 120° | –1 | –1 | –1 | –1 |
| 120 – 150° | –1 | +1 | –1 | –1 |
| 150 – 180° | –1 | +1 | –1 | +1 |
| 180 – 210° | +1 | –1 | –1 | +1 |
| 210 – 240° | +1 | –1 | –1 | –1 |
| 240 – 270° | +1 | +1 | –1 | –1 |
| 270 – 300° | +1 | +1 | +1 | +1 |
| 300 – 330° | +1 | –1 | +1 | +1 |
| 330° – 0° | +1 | –1 | +1 | –1 |

From the above chart it is seen that there are cases where the axis contour surface pulses from the two circle generators are of opposite signs. The actual contour generated is the result of the net sum of those axis pulses. Where the axis pulses from the two circle generators are of unlike sign there will be momentary reversals of one pulse during the process of generating the contour.

As described earlier, the vector velocity control subsystem 50 receives the generated $\Delta X_s$ and $\Delta Y_s$ pulses and performs a computation to produce a rate of feed pulses supplied to the circle $R_1$ generator so that the surface velocity will be as programmed. To properly perform its function the velocity sub-system has to receive only the net pulses. That means the control logic must recognize the direction of the motion at the current generated point of the contour. Any generated axis pulse not in that direction, instead of being supplied to the velocity sub-system, must be stored. Then an axis pulse in the proper direction will cancel out that stored one. Only if the store for the wrong direction pulses is empty will the pulses of the proper direction be supplied to the velocity sub-system.

FIG. 19 shows the criteria for determining the proper direction of motion pulses. It is based on counter-clockwise motion around the contour. Note that the sign of the $Y_T$ data and the quadrant of circle $R_1$ determine the required direction. The $Y_T$ data is the Y-component of a line normal to the generated contour surface and its value is determined by this control system for each point on the contour, as explained earlier.

The foregoing are shown in the FIG. 16 block diagram of the contour surface pulse generator 48.

From FIG. 19 and the previous given tabulation of the signs of $\Delta Y_1$ and $\Delta Y_2$, it can be seen that in all cases the $\Delta Y_1$ pulses are in the same direction as the net $Ys$ motion. That is not so for the $\Delta Y_2$ pulses. In some cases they are in a direction opposite to the $Ys$ motion. If a $\Delta Y_2$ is in a direction reverse from that of the net $Ys$ movement then an up count of counter 200 will occur through gate 202 of FIG. 16. With counter 200 not at zero as recognized by zero detector 204, a $\Delta Y_1$ pulse or a $\Delta Y_2$ pulse in proper direction will restore through gate 206 the counter 200 to zero. Then the zero detector 204 will enable, through gate 208, a $\Delta Y_1$ pulse or a $\Delta Y_2$ pulse that is in the proper direction with respect to the $Ys$ motion to be outputted as a $(\Delta Ys)$ contour surface pulse.

The $G(\Delta X_s)$ pulse is similarly generated by the use of a counter 220 which is incremented downwardly by each $\Delta X_1$ and $\Delta X_2$ pulse under the appropriate sign conditions, determined by the sign signals to gates 222, 224, 226, 228, as shown in FIG. 16. The counter is incremented upwardly by the $\Delta X_1$, $\Delta X_2$ pulses via gate 230 controlled by inverter 232 and gate 234. When the count in counter 220 passes zero, as determined by zero detector 236, a $\Delta X_1$ or $\Delta X_2$ pulse is permitted to pass through gate 238 to appear as a $G(\Delta X_s)$ pulse to be supplied to the cutter-center path generator 56.

The sign of the $Y_T$ data is detected by sign detector 240. Whenever $Y_T$ is negative, i.e. less than zero, and the $Y_1$ data is of the appropriate sign as determined by gate 242, $(+MX_s)$ pulses and $(-MX_s)$ pulses from inverter 244 are supplied to the cutter-center path generator 56. In addition, a pulse is supplied to gate 246 to produce the $G(\Delta X_s)$ pulse described earlier. Whenever $Y_T$ is positive, i.e. greater than zero, and the $Y_1$ data is of the appropriate sign as determined by gate 248, the $(+MX_s)$ and $(-MX_s)$ pulses are supplied and in addition gate 250 is opened to produce the $G(\Delta X_s)$ pulses.

explanation of FIG. 16

The foregoing/assumes that $\Delta Y_1$ and $\Delta Y_2$ pulses will not occur at the same time, and that $\Delta X_1$ and $\Delta X_2$ pulses will also not occur at the same time, but the system itself is not so limited.

Cutter-Center Path Pulse Generator 56

Figure 20:
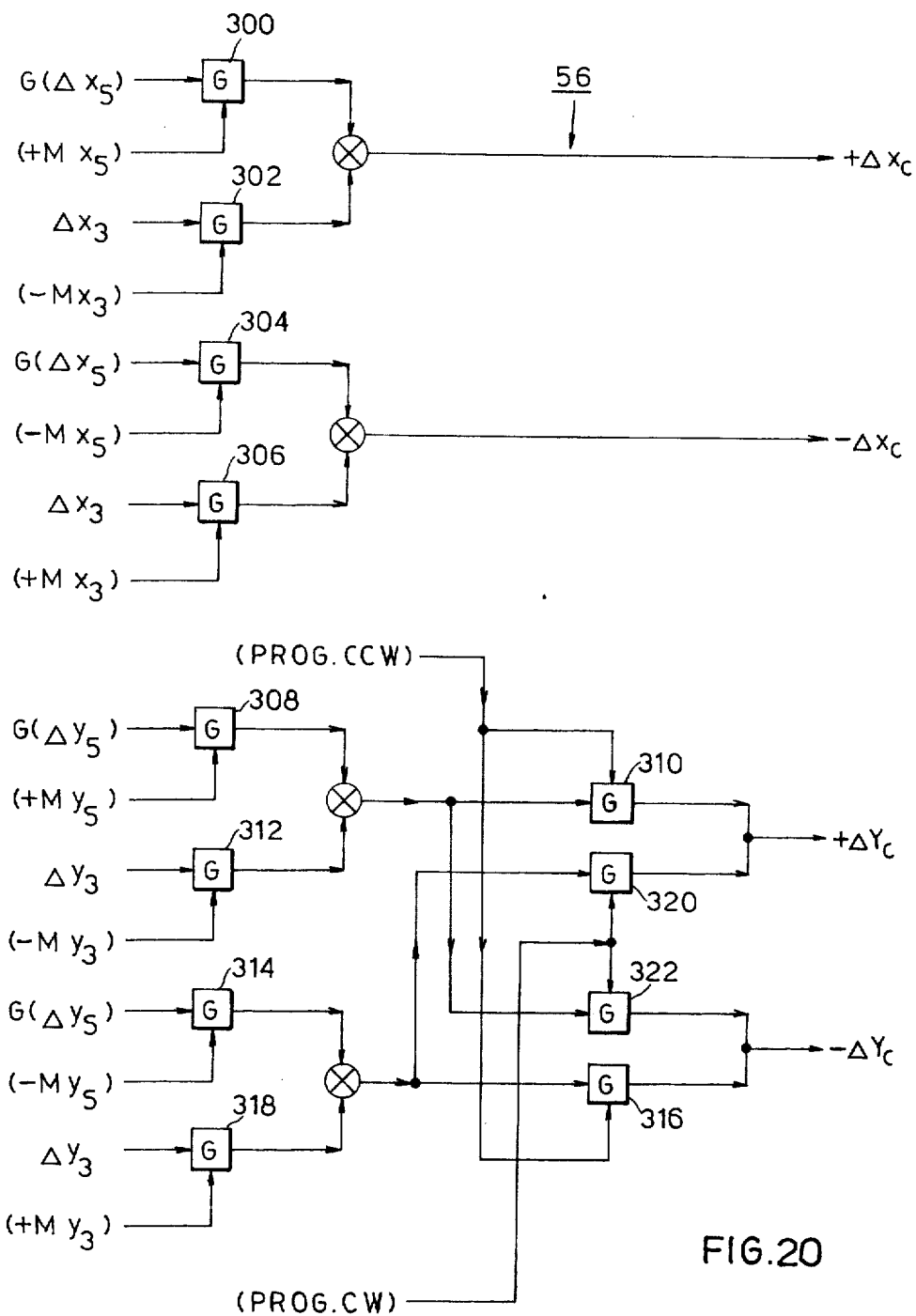
FIG. 20 is a block diagram of the cutter-center path pulse generator of FIG. 8.

FIG. 20 illustrates how the cutter-center path pulse generator 56 generates the $\Delta X_c$ and $\Delta Y_c$ incremental motion command pulses supplied to the axes servos for tracing the two-lobed epitrochoid contour.

From FIG. 20, it will be seen that a $+\Delta X_c$ pulse will be generated each time there is a coincidence of the $G(\Delta X_s)$ and $(+MX_s)$ signals as controlled by gate 300, and each time there is a coincidence of a $\Delta X_3$ pulse with a $(-MX_3)$ direction motion signal, as controlled by gate 302. A $-\Delta X_c$ pulse will be generated each time there is a coincidence of the $G(\Delta X_s)$ and $(-MX_s)$ signals (gate 304), and each time there is a coincidence of a $\Delta X_3$ pulse with a $(+MX_3)$ direction motion signal (gate 306).

The programmed direction of rotation (CCW or CW) controls the polarity of the $\Delta Y_c$ pulses. Thus if CCW is programmed, a $+\Delta Y_c$ pulse is produced whenever there is a coincidence of the $G(\Delta Y_s)$ and $(+MY_s)$ signals (gates 308, 310), and whenever there is a coincidence between the $\Delta Y_3$ pulse with a $(-MY_3)$ direction motion signal (gate 312); and a $-\Delta Y_c$ pulse is produced whenever there is a coincidence of the $G(\Delta Y_s)$ and $(-MY_s)$ signals (gates 314, 316) and a coincidence of the $\Delta Y_3$ pulse with a $(+MY_3)$ direction motion signal (318). If CW rotation is programmed, gates 320, 322 become effective, rather than gates 310, 316 thereby reversing the polarity of the $\Delta Y_c$ signals.

Summary of the Overall Operation

For tracing the two-lobed epitrochoid contour CG (FIG. 2), the pertinent data is entered into the apparatus via data input 2 (FIG. 1) and stored in program store 4. This data includes (FIG. 7): the value "$R_1$", equal to 3b/2; the value "$R_2$", equal to a; the value "$R_3$", radius of the cutter or grinding wheel used; "IPM", or other designation of the commanded feedrate or cutting velocity; "CCW/CW", the commanded direction of path rotation; and "$Y_I$", the inflection point. The programmed input could include additional data, e.g. to perform the other auxiliary functions indicated by the blocks 28, 30, 32 in FIG. 1.

When the "Start Contour" signal is entered, the cutter path generator 6 (FIG. 1) automatically generates the command axis-pulses $\Delta X_c$, $\Delta Y_c$ supplied to the respective axis drives 12, 18, to control the relative displacement of the center of the tracing tool (cutter 8) with respect to the work-pieces 10 to trace thereon the two-lobed epitrochoid.

Exactly how this is done is best seen in FIG. 8. Briefly, the $R_1$, $R_2$ and $R_3$ circle generators 40, 42, 43 each generates a train of pulses for each axis, the respective outputs of each generator being shown in FIG. 8. During this operation, $R_1$ circle generator 40 is the independent variable, and its rate of pulse generation is controlled by the $FP_1$ feed pulses supplied from the vector velocity control system 50 so that the generation of the contour axis-pulses ($\Delta X_s$, $\Delta Y_s$) by the contour pulse generator 48 is at the feedrate commanded by the programmed feedrate command data (IPM).

Circle coordinator 46 controls the $R_2$ circle generator 42, by supplying the appropriate feed pulses $FP_2$ thereto, such that the angle of rotation ($\alpha_2$) of the $R_2$ circle generator pulses is maintained at three times the angle rotation ($\alpha_1$) of the $R_1$ circle generator pulses. Sign detectors 58 and 60 control the direction of rotation of the generated $R_1$ and $R_2$ circles by applying the appropriate "INCR X" signal to the respective generator.

Circle coordinator 54 controls the $R_3$ circle generator 44 so that the radius vector of the generated $R_3$ circle is always normal to the contour being traced. This is accomplished by generating tangent axis-pulses in tangent generator 52 representing the tangent of the contour being traced (having an angle of rotation $\alpha_T$) and controlling the rate of generation of the axis-pulses of the $R_3$ circle generator 44 (having an angle of rotation $\alpha_3$) by supplying the appropriate feedpulses $FP_3$ thereto, so that the angle $\alpha_3$ with respect to one orthogonal axis formed by the radius of the $R_3$ circle generator (in this case, the X-axis) follows the angle $\alpha_T$ with respect to the other orthogonal axis (in this case, the Y-axis) formed by the tangent to the current generated point on the contour. The direction of rotation is controlled by sub-system 62 which supplies the appropriate "INCR $X_3$" signal to $R_3$ circle generator 44.

Finally, the cutter-center path pulse generator 56 receives the contour axis data from contour generator 48, and the $R_3$ circle axis data from generator 44, together with the programmed direction of rotation (CCW/CW), and produces the incremental motion command axis-pulses $\Delta X_c$, $\Delta Y_c$, supplied to the axes positioning systems 12, 18.

Numerical Example

The annexed Tables I, II, III and IV provide a numerical example of the generation of a two-lobed epitrochoid surface in accordance with the invention. In this example $R_1 = 150$, $R_2 = 40$ and $R_3 = 50$.

Table I illustrates the operation of the circle coordinator 46 to maintain the relationship $\alpha_2 = 3\alpha_1$, in accordance with equations (14) – (16) above. It will be noted that:

A. The error ($3\alpha_1 - \alpha_2$) is non-accumulative; and

B. In each case the error ($3\alpha_1 - \alpha_2$) would become greater if the $R_2$ circle either had rotated one pulse of motion less or one pulse more.

Thus it can be concluded that the control algorithms have indeed controlled the rotation of the $R_2$ circle such that angle $\alpha_2$ is as precisely equal to three times $\alpha_1$ as the system pulse weight will permit.

Table II includes a tabulation of the generated two-lobed epitrochoid contour points in accordance with equation (23). It also includes a tabulation of the computed points in accordance with equations (4) and (5). The differences between the computed and the generated points are listed as the error. Note that the largest "error" is less than two units. Those units are the system pulse weight which may have values of 0.0001 or 0.00005 as typical inches per pulse.

The reason that "error" can be as large as almost two units is because the contour is produced by summing two streams of pulses each of which simultaneously may contribute a pulse. But if such an overshoot does momentarily occur, the next output within microseconds will bring it back on the mathematically correct path. The relatively slow machine slide response can not recognize individual pulses at such a rapid rate. The slide servo tends to average those pulses so that the actual error will be less than the theoretical values shown.

Table III illustrates the operation of circle coordinator 54 ($\alpha_3 = \alpha_T$), and it will be noted this relationship is maintained within one pulse of the $R_3$ circle rotation.

Table IV illustrates the operation of the cutter-center path pulse generator 56 and compares its results with computed cutter-center path positions. Note that the generated and computed positions agree, within an average of less than one unit, thus demonstrating the precise accuracy of the commanded cutter position produced by this invention.

TABLE I
CIRCLE COORDINATOR ($\alpha_2 = 3\alpha_1$) OPERATION
$R_1 = 150$    $R_2 = 40$

| $\Delta X_1$ | $X_1$ | $\Delta Y_1$ | $Y_1$ | $E_1$ | $\alpha_1°$ | $\Delta X_2$ | $X_2$ | $\Delta Y_2$ | $Y_2$ | $E_2$ | $\alpha_2°$ | $E_{\alpha_1}$ | $E_{\alpha_2}$ | $3\alpha_1 - \alpha_2$ |
|---|---|---|---|---|---|---|---|---|---|---|---|---|---|---|
|  | 150 |  |  | 75 | 0° |  | 40 |  | 0 | 20 | 0 | 0 | 0 | 0 |
| 0 |  | 1 | 1 | 74 | 0.382 | 0 |  | 1 | 1 | 19 | 1.43° | -120 | 31 | -0.26° |
| 0 |  | 1 | 2 | 72 | 0.764 | 0 |  | 1 | 2 | 17 | 2.86° | -92 | 60 | -0.57° |
| 0 |  | 1 | 3 | 69 | 1.143 | 0 |  | 1 | 3 | 14 | 4.29 | -66 | 87 | -0.86 |
| 0 |  | 1 | 4 | 65 | 1.525 | 0 |  | 1 | 4 | 10 | 5.72 | -42 | 112 | -1.13 |
| 0 |  | 1 | 5 | 60 | 1.91 | 0 |  | 1 | 5 | 5 | 7.12 | -20 | 135 |  |
| 0 |  | 1 | 6 | 54 | 2.29 |  |  |  |  |  |  | 0 |  | -0.24 |
| 0 |  | 1 | 7 | 47 | 2.675 | 0 |  | 1 | 6 | -1 | 8.53 | -135 | 22 | -0.50 |
| 0 |  | 1 | 8 | 39 | 3.06 | 1 | 39 | 0 |  | 38 | 8.85 | -116 | 42 | +0.30 |
| 0 |  | 1 | 9 | 30 | 3.43 | 0 |  | 1 | 7 | 31 | 10.17 | -93 | 66 | +0.13 |
| 0 |  | 1 | 10 | 20 | 3.82 | 0 |  | 1 | 8 | 23 | 11.59 | -72 | 88 | -0.13 |
| 0 |  | 1 | 11 | 9 | 4.20 | 0 |  | 1 | 9 | 14 | 13.00 | -53 | 108 | -0.40 |
| 0 |  | 1 | 12 | -3 | 4.58 | 0 |  | 1 | 10 | 4 | 14.38 | -36 | 126 | -0.63 |
| 1 | 149 | 0 |  | 146 | 4.61 | 0 |  | 1 | 11 | -7 | 15.75 | -21 | 140 | -1.82 |
| 0 |  | 1 | 13 | 133 | 4.99 | 1 | 38 | 0 |  | 31 | 16.15 | -10 | 152 |  |
| 0 |  | 1 | 14 | 119 | 5.38 |  |  |  |  |  |  | 5 |  | -0.01 |
| 0 |  | 1 | 15 | 104 | 5.75 | 0 |  | 1 | 12 | 19 | 17.50 | -142 | 22 | -0.25 |
| 0 |  | 1 | 16 | 88 | 6.30 | 0 |  | 1 | 13 | 6 | 18.85 | -128 | 37 | +0.05 |
| 0 |  | 1 | 17 | 71 | 6.50 | 0 |  | 1 | 14 | -8 | 20.20 | -116 | 50 | -0.70 |
| 0 |  | 1 | 18 | 53 | 6.88 | 1 | 37 | 0 |  | 29 | 20.70 | -106 | 61 | -0.06 |
| 0 |  | 1 | 19 | 34 | 7.25 | 0 |  | 1 | 15 | 14 | 22.05 | -92 | 76 | -0.30 |
| 0 |  | 1 | 20 | 14 | 7.64 | 0 |  | 1 | 16 | -2 | 23.38 | -80 | 89 | -0.46 |
| 0 |  | 1 | 21 | -7 | 8.01 | 1 | 36 | 0 |  | 34 | 23.95 | -70 | 100 | +0.08 |
| 1 | 148 | 0 |  | 141 | 8.07 | 0 |  | 1 | 17 | 17 | 25.27 | -56 | 113 | -1.06 |
| 0 |  | 1 | 22 | 119 | 8.45 | 0 |  | 1 | 18 | -1 | 26.55 | -46 | 124 | -1.20 |
| 0 |  | 1 | 23 | 96 | 8.82 | 1 | 35 | 0 |  | 34 | 27.20 | -38 | 133 | -0.74 |
| 0 |  | 1 | 24 | 72 | 9.20 | 0 |  | 1 | 19 | 15 | 28.50 | -26 | 146 | -0.90 |
| 0 |  | 1 | 25 | 47 | 9.57 | 0 |  | 1 | 20 | -5 | 29.70 | -16 | 157 | -0.99 |
| 0 |  | 1 | 26 | 21 | 9.95 | 1 | 34 | 0 |  | 29 | 30.41 | -8 | 166 |  |
| 0 |  | 1 | 27 | -6 | 10.31 |  |  |  |  |  |  | 4 |  | +0.52 |
| 1 | 147 | 0 |  | 141 | 10.40 | 0 |  | 1 | 21 | 8 | 31.70 | -158 | 16 | -0.50 |
| 0 |  | 1 | 28 | 113 | 10.78 | 0 |  | 1 | 22 | -14 | 32.90 | -149 | 26 | -0.56 |
| 0 |  | 1 | 29 | 84 | 11.15 | 1 | 33 | 0 |  | 19 | 33.70 | -142 | 34 | -0.25 |
| 0 |  | 1 | 30 | 54 | 11.50 | 0 |  | 1 | 23 | -4 | 34.83 | -131 | 46 | -0.33 |
| 0 |  | 1 | 31 | 23 | 11.90 | 1 | 32 | 0 |  | 28 | 35.70 | -122 | 56 | 0 |
| 0 |  | 1 | 32 | -9 | 12.25 | 0 |  | 1 | 24 | 4 | 36.40 | -109 | 70 | -0.05 |
| 1 | 146 | 0 |  | 137 | 12.37 | 0 |  | 1 | 25 | -21 | 38.00 | -98 | 80 | -0.89 |
| 0 |  | 1 | 33 | 104 | 12.71 | 1 | 31 | 0 |  | 10 | 38.82 | -91 | 88 | -0.69 |
| 0 |  | 1 | 34 | 70 | 13.10 | 0 |  | 1 | 26 | -16 | 39.96 | -80 | 100 | -0.65 |
| 0 |  | 1 | 35 | 35 | 13.46 | 1 | 30 | 0 |  | 14 | 40.90 | -71 | 110 | -0.52 |
| 0 |  | 1 | 36 | -1 | 13.85 | 0 |  | 1 | 27 | -13 | 42.00 | -58 | 124 | -0.45 |
| 1 | 145 | 0 |  | 144 | 13.92 | 1 | 29 | 0 |  | 16 | 42.93 | -47 | 134 | -1.17 |
| 0 |  | 1 | 37 | 107 | 14.30 | 0 |  | 1 | 28 | -12 | 44.00 | -34 | 148 | -1.10 |
| 0 |  | 1 | 38 | 69 | 14.66 | 1 | 28 | 0 |  | 16 | 45.00 | -23 | 160 | -0.96 |

Table I—Continued

| Δx₁ | x₁ | Δy₁ | Y₁ | E₁ | α₁° | Δx₂ | x₂ | Δy₂ | Y₂ | E₂ | α₂° | Eα₁ | Eα₂ | 3α₁-α₂ |
|---|---|---|---|---|---|---|---|---|---|---|---|---|---|---|
| 0 |   |   | 1 | 39 | 30 | 15.05 | 0 |   | 1 | 29 | -13 | 46.60 | -8 | 176 |
| 0 |   |   | 1 | 40 | -10 | 15.40 |   |   |   |   |   |   | 5 | +0.20 |
| 1 | 144 | 0 |   | 134 | 15.50 | 1 | 27 | 0 |   | 14 | 47.07 | -146 | 18 | +0.43 |
| 0 |   |   | 1 | 41 | 93 | 15.90 | 0 |   | 1 | 30 | -16 | 48.05 | -150 | 35 | -0.35 |
| 0 |   |   | 1 | 42 | 51 | 16.23 | 1 | 26 | 0 |   | 10 | 49.10 | -136 | 50 | -0.41 |
| 0 |   |   | 1 | 43 | 8 | 16.60 | 0 |   | 1 | 31 | -21 | 50.05 | -118 | 69 | -0.25 |
| 0 |   |   | 1 | 44 | -36 | 17.00 | 1 | 25 | 0 |   | 4 | 51.10 | -102 | 86 | -0.10 |
| 1 | 143 | 0 |   | 107 | 17.10 | 0 |   | 1 | 32 | -28 | 52.0 | -82 | 105 | -0.70 |
| 0 |   |   | 1 | 45 | 62 | 17.43 | 1 | 24 | 0 |   | -4 | 53.2 | -66 | 122 | -0.91 |
| 0 |   |   | 1 | 46 | 16 | 17.80 | 1 | 23 | 0 |   | 19 | 54.3 | -46 | 143 | -0.90 |
| 0 |   |   | 1 | 47 | -31 | 18.19 | 0 |   | 1 | 33 | -14 | 55.18 | -22 | 168 | -0.61 |
| 1 | 142 | 0 |   | 111 | 18.30 |   |   |   |   |   |   |   | 0 |   |
| 0 |   |   | 1 | 48 | 63 | 18.65 | 1 | 22 | 0 |   | 8 | 56.3 | -168 | 22 | -0.35 |
| 0 |   |   | 1 | 49 | 14 | 19.00 | 0 |   | 1 | 34 | -26 | 57.1 | -143 | 48 | -0.10 |
| 0 |   |   | 1 | 50 | -36 | 19.40 | 1 | 21 | 0 |   | -5 | 58.3 | -120 | 72 | -0.10 |
| 1 | 141 | 0 |   | 105 | 19.50 | 1 | 20 | 0 |   | 15 | 59.57 | -93 | 98 | -1.07 |
| 0 |   |   | 1 | 51 | 54 | 19.85 | 0 |   | 1 | 35 | -20 | 60.25 | -64 | 128 | -0.70 |
| 0 |   |   | 1 | 52 | 2 | 20.2 | 1 | 19 | 0 |   | -1 | 61.5 | -37 | 156 | -0.90 |
| 0 |   |   | 1 | 53 | -51 | 20.55 | 1 | 18 | 0 |   | 17 | 62.8 | -6 | 188 |   |
| 1 | 140 | 0 |   | 89 | 20.70 |   |   |   |   |   |   |   | 29 | -0.70 |
| 0 |   |   | 1 | 54 | 35 | 21.05 | 0 |   | 1 | 36 | -19 | 63.45 | -130 | 64 | -0.30 |
| 0 |   |   | 1 | 55 | -20 | 21.40 | 1 | 17 | 0 |   | -2 | 64.73 | -98 | 97 | -0.33 |
| 1 | 139 | 0 |   | 119 | 21.60 | 1 | 16 | 0 |   | 14 | 66.04 | -62 | 132 | -1.24 |
| 0 |   |   | 1 | 56 | 63 | 21.90 | 0 |   | 1 | 37 | -23 | 66.65 | -24 | 171 |   |
| 0 |   |   | 1 | 57 | 6 | 22.20 |   |   |   |   |   |   | 12 | +0.19 |
| 0 |   |   | 1 | 58 | -52 | 22.60 | 1 | 15 | 0 |   | -8 | 67.95 | -147 | 50 | -0.15 |
| 1 | 138 | 0 |   | 86 | 22.80 | 1 | 14 | 0 |   | 6 | 69.30 | -106 | 90 | -0.90 |
| 0 |   |   | 1 | 59 | 27 | 23.10 | 0 |   | 1 | 38 | -32 | 69.80 | -63 | 134 | -0.50 |
| 0 |   |   | 1 | 60 | -33 | 23.45 | 1 | 13 | 0 |   | -19 | 71.13 | -22 | 176 |   |
| 1 | 137 | 0 |   | 104 | 23.63 |   |   |   |   |   |   |   | 23 | -0.24 |
| 0 |   |   | 1 | 61 | 43 | 23.95 | 1 | 12 | 0 |   | -7 | 72.50 | -130 | 68 | -0.65 |
| 0 |   |   | 1 | 62 | -19 | 24.31 | 1 | 11 | 0 |   | 4 | 73.85 | -82 | 117 | -0.92 |
| 1 | 136 | 0 |   | 117 | 24.50 | 0 |   | 1 | 39 | -35 | 74.30 | -30 | 168 |   |
| 0 |   |   | 1 | 63 | 54 | 24.62 |   |   |   |   |   |   | 18 | +0.16 |
| 0 |   |   | 1 | 64 | -10 | 25.19 | 1 | 10 | 0 |   | -25 | 76.63 | -132 | 68 | -1.06 |
| 1 | 135 | 0 |   | 125 | 25.31 | 1 | 9 | 0 |   | -16 | 76.96 | -79 | 120 | -0.97 |
| 0 |   |   | 1 | 65 | 60 | 25.68 | 1 | 8 | 0 |   | -8 | 78.41 | -24 | 176 |   |
| 0 |   |   | 1 | 66 | -6 | 26.05 |   |   |   |   |   |   | 35 | -0.26 |
| 1 | 134 | 0 |   | 128 | 26.21 | 1 | 7 | 0 |   | -1 | 79.83 | -106 | 94 | -1.20 |
| 0 |   |   | 1 | 67 | 61 | 26.55 | 1 | 6 | 0 |   | 5 | 81.15 | -44 | 157 |   |
| 0 |   |   | 1 | 68 | -7 | 26.90 |   |   |   |   |   |   | 22 | -0.45 |
| 1 | 133 | 0 |   | 126 | 27.05 | 0 |   | 1 | 40 | -35 | 81.47 | -113 | 88 | -0.32 |
| 0 |   |   | 1 | 69 | 57 | 27.4 | 1 | 5 | 0 |   | -30 | 82.88 | -50 | 152 |   |
| 0 |   |   | 1 | 70 | -13 | 27.7 |   |   |   |   |   |   | 17 | +0.22 |
| 1 | 132 | 0 |   | 119 | 27.92 | 1 | 4 | 0 |   | -26 | 84.28 | -118 | 84 | -0.52 |
| 0 |   |   | 1 | 71 | 48 | 28.28 | 1 | 3 | 0 |   | -23 | 85.71 | -48 | 155 |   |
| 0 |   |   | 1 | 72 | -24 | 28.60 |   |   |   |   |   |   | 26 | +0.09 |

Table I – Continued

| $\Delta x_1$ | $x_1$ | $\Delta y_1$ | $Y_1$ | $E_1$ | $\alpha_1^o$ | $\Delta x_2$ | $x_2$ | $\Delta y_2$ | $Y_2$ | $E_2$ | $\alpha_2^o$ | $E_{\alpha_1}$ | $E_{\alpha_2}$ | $3\alpha_1^o - \alpha_2^o$ |
|---|---|---|---|---|---|---|---|---|---|---|---|---|---|---|
| 1 | 131 | 0 | | 107 | 28.80 | 1 | 2 | 0 | | -21 | 87.14 | -153 | 100 | -0.74 |
| 0 | | 1 | 73 | 34 | 29.1 | 1 | 1 | 0 | | -20 | 88.57 | -26 | 178 | |
| 0 | | 1 | 74 | -40 | 29.45 | | | | | | | 55 | | -0.22 |
| 1 | 130 | 0 | | 90 | 29.60 | 1 | 0 | 0 | | -20 | 90.00 | -68 | 136 | |
| 0 | | 1 | 75 | 15 | 29.96 | | | | | | | 16 | | -0.12 |
| 0 | | 1 | 76 | -61 | 30.30 | 1 | 1 | 0 | | -19 | 91.43 | -109 | 102 | -0.53 |
| 1 | 129 | 0 | | 68 | 30.5 | 1 | 2 | 0 | | -17 | 92.86 | -21 | 194 | |
| 0 | | 1 | 77 | -9 | 30.80 | | | | | | | 58 | | -0.46 |
| 1 | 128 | 0 | | 119 | 31.00 | 1 | 3 | 0 | | -14 | 94.29 | -68 | 137 | |
| 0 | | 1 | 78 | 41 | 31.30 | | | | | | | 5 | | -0.37 |
| 0 | | 1 | 79 | -30 | 31.65 | 1 | 4 | 0 | | -10 | 95.72 | -121 | 86 | -0.77 |
| 1 | 127 | 0 | | 89 | 31.92 | 1 | 5 | 0 | | -5 | 97.12 | -46 | 160 | |
| 0 | | 1 | 80 | 9 | 32.20 | | | | | | | 25 | | -0.52 |
| 0 | | 1 | 81 | -72 | 32.50 | 1 | 6 | 0 | | 1 | 98.53 | -110 | 98 | -1.03 |
| 1 | 126 | 0 | | 54 | 32.70 | 0 | | 1 | 39 | -38 | 98.85 | -40 | 167 | |
| 0 | | 1 | 82 | -26 | 33.00 | | | | | | | 32 | | +0.15 |
| 1 | 125 | 0 | | 97 | 33.22 | 1 | 7 | 0 | | -31 | 100.17 | -103 | 104 | -0.51 |
| 0 | | 1 | 83 | 14 | 33.50 | 1 | 8 | 0 | | -23 | 101.59 | -34 | 174 | |
| 0 | | 1 | 84 | -70 | 33.90 | | | | | | | 33 | | +0.11 |
| 1 | 124 | 0 | | 54 | 34.10 | 1 | 9 | 0 | | -14 | 103.00 | -108 | 100 | -0.7 |
| 0 | | 1 | 85 | -31 | 34.40 | 1 | 10 | 0 | | -4 | 104.38 | -44 | 165 | |
| 1 | 123 | 0 | | 92 | 34.60 | | | | | | | 18 | | -0.58 |
| 0 | | 1 | 86 | 6 | 34.90 | 1 | 11 | 0 | | 7 | 105.75 | -129 | 80 | -1.05 |
| 0 | | 1 | 87 | -81 | 35.21 | 0 | | 1 | 38 | -31 | 106.15 | -70 | 140 | -0.52 |
| 1 | 122 | 0 | | 41 | 35.45 | 1 | 12 | 0 | | -19 | 107.50 | -7 | 202 | |
| 0 | | 1 | 88 | -47 | 35.80 | | | | | | | 52 | | -0.10 |
| 1 | 121 | 0 | | 74 | 36.00 | 1 | 13 | 0 | | -6 | 108.85 | -98 | 111 | -0.85 |
| 0 | | 1 | 89 | -15 | 36.30 | 1 | 14 | 0 | | 8 | 110.2 | -42 | 166 | |
| 1 | 120 | 0 | | 105 | 36.58 | | | | | | | 12 | | -0.56 |
| 0 | | 1 | 90 | 15 | 36.85 | 0 | | 1 | 37 | -29 | 110.7 | -144 | 66 | -0.12 |
| 0 | | 1 | 91 | -76 | 37.15 | 1 | 15 | 0 | | -14 | 112.05 | -87 | 124 | -0.60 |
| 1 | 119 | 0 | | 43 | 37.40 | 1 | 16 | 0 | | 2 | 113.38 | -32 | 178 | |
| 0 | | 1 | 92 | -49 | 37.70 | | | | | | | 19 | | -0.28 |
| 1 | 118 | 0 | | 69 | 37.90 | 0 | | 1 | 36 | -34 | 113.95 | -140 | 70 | -0.25 |
| 0 | | 1 | 93 | -24 | 38.20 | 1 | 17 | 0 | | -17 | 115.27 | -86 | 125 | -0.67 |
| 1 | 117 | 0 | | 93 | 38.42 | 1 | 18 | 0 | | 1 | 116.55 | -34 | 176 | |
| 0 | | 1 | 94 | -1 | 38.78 | | | | | | | 14 | | -0.21 |
| 1 | 116 | 0 | | 115 | 39.00 | 0 | | 1 | 35 | -34 | 117.20 | -146 | 62 | -0.20 |
| 0 | | 1 | 95 | 20 | 39.30 | 1 | 19 | 0 | | -15 | 118.50 | -97 | 114 | -0.60 |
| 0 | | 1 | 96 | -76 | 39.60 | 1 | 20 | 0 | | 5 | 119.80 | -48 | 164 | -1.00 |
| 1 | 115 | 0 | | 39 | 39.82 | 0 | | 1 | 34 | -29 | 120.45 | -1 | 210 | |
| 0 | | 1 | 97 | -58 | 40.10 | | | | | | | 48 | | -0.15 |
| 1 | 114 | 0 | | 56 | 40.40 | 1 | 21 | 0 | | -8 | 121.70 | -114 | 97 | -0.50 |
| 0 | | 1 | 98 | -42 | 40.65 | 1 | 22 | 0 | | 14 | 122.90 | -68 | 144 | -0.95 |
| 1 | 113 | 0 | | 71 | 40.90 | 0 | | 1 | 33 | -19 | 123.10 | -24 | 187 | |
| 0 | | 1 | 99 | -28 | 41.20 | | | | | | | 22 | | -0.10 |
| 1 | 112 | 0 | | 84 | 41.45 | 1 | 23 | 0 | | 4 | 124.83 | -143 | 68 | -0.48 |

Table II—Continued

| $\Delta x_1$ | $x_1$ | $\Delta Y_1$ | $Y_1$ | $E_1$ | $\alpha_1^o$ | $\Delta x_2$ | $x_2$ | $\Delta Y_2$ | $Y_2$ | $E_2$ | $\alpha_2^o$ | $E_{\alpha_1}$ | $E_{\alpha_2}$ | $3x_1^o - \alpha_2^o$ |
|---|---|---|---|---|---|---|---|---|---|---|---|---|---|---|
| 0 | | 1 | 100 | -16 | 41.75 | 0 | | 1 | 32 | -28 | 125.70 | -100 | 112 | -0.45 |
| 1 | 111 | 0 | | 95 | 42.00 | 1 | 24 | 0 | | -4 | 126.80 | -53 | 158 | -0.80 |
| 0 | | 1 | 101 | -6 | 42.30 | 1 | 25 | 0 | | 21 | 128.0 | -10 | 202 | |
| 1 | 110 | 0 | | 104 | 42.50 | | | | | | | 31 | | -0.50 |
| 0 | | 1 | 102 | 2 | 42.80 | 0 | | 1 | 31 | -10 | 128.82 | -140 | 72 | -0.42 |
| 0 | | 1 | 103 | -101 | 43.10 | 1 | 26 | 0 | | 16 | 129.95 | -96 | 117 | -0.65 |
| 1 | 109 | 0 | | 8 | 43.35 | | | 1 | 30 | -14 | 130.90 | -54 | 158 | -0.85 |
| 0 | | 1 | 104 | -96 | 43.65 | 1 | 27 | 0 | | 13 | 132.00 | -10 | 203 | |
| 1 | 108 | 0 | | 12 | 43.90 | | | | | | | 32 | | -0.30 |
| 0 | | 1 | 105 | -93 | 44.20 | 0 | | 1 | 29 | -16 | 132.93 | -139 | 74 | -0.33 |
| 1 | 107 | 0 | | 14 | 44.42 | 1 | 28 | 0 | | 12 | 134.00 | -94 | 118 | -0.74 |
| 0 | | 1 | 106 | -92 | 44.70 | 0 | | 1 | 28 | -16 | 135.00 | -53 | 160 | -0.90 |
| 1 | 106 | 0 | | 14 | 45.00 | 1 | 29 | 0 | | 13 | 136.00 | -8 | 204 | |
| 0 | | 1 | 107 | -93 | 45.30 | | | | | | | 33 | | -0.10 |
| 1 | 105 | 0 | | 12 | 45.55 | 0 | | 1 | 27 | -14 | 137.07 | -138 | 74 | -0.42 |
| 0 | | 1 | 108 | -96 | 45.80 | 1 | 30 | 0 | | 16 | 138.05 | -94 | 119 | -0.65 |
| 1 | 104 | 0 | | 8 | 46.10 | 0 | | 1 | 26 | -10 | 139.10 | -52 | 160 | -0.80 |
| 0 | | 1 | 109 | -101 | 46.40 | 1 | 31 | 0 | | 21 | 140.05 | -8 | 205 | |
| 1 | 103 | 0 | | 2 | 46.65 | | | | | | | 34 | | -0.10 |
| 0 | | 1 | 110 | -108 | 46.90 | 0 | | 1 | 25 | -4 | 141.1 | -137 | 76 | -0.40 |
| 1 | 102 | 0 | | -6 | 47.20 | 1 | 32 | 0 | | 28 | 142.0 | -92 | 120 | -0.70 |
| 1 | 101 | 0 | | 95 | 47.45 | 0 | | 1 | 24 | 4 | 143.2 | -51 | 160 | -0.85 |
| 0 | | 1 | 111 | -16 | 47.70 | 0 | | 1 | 23 | -19 | 144.3 | -8 | 204 | |
| 1 | 100 | 0 | | 84 | 48.00 | | | | | | | 39 | | -0.30 |
| 0 | | 1 | 112 | -28 | 48.22 | 1 | 33 | 0 | | 14 | 145.18 | -126 | 86 | -0.52 |
| 1 | 99 | 0 | | 71 | 48.50 | 0 | | 1 | 22 | -8 | 146.3 | -82 | 129 | -0.80 |
| 0 | | 1 | 113 | -42 | 48.80 | 1 | 34 | 0 | | 26 | 147.1 | -36 | 176 | |
| 1 | 98 | 0 | | 56 | 49.10 | | | | | | | 8 | | +0.20 |
| 0 | | 1 | 114 | -58 | 49.35 | 0 | | 1 | 21 | 5 | 148.3 | -160 | 52 | -0.25 |
| 1 | 97 | 0 | | 39 | 49.60 | 0 | | 1 | 20 | -15 | 149.57 | -113 | 98 | -0.77 |
| 0 | | 1 | 115 | -76 | 49.90 | 1 | 35 | 0 | | 20 | 150.25 | -64 | 148 | -0.55 |
| 1 | 96 | 0 | | 20 | 50.15 | 0 | | 1 | 19 | 1 | 151.5 | -17 | 199 | |
| 0 | | 1 | 116 | -96 | 50.40 | | | | | | | 32 | | -0.30 |
| 1 | 95 | 0 | | -1 | 50.70 | 0 | | 1 | 18 | -17 | 152.8 | -130 | 81 | -0.70 |
| 1 | 94 | 0 | | 93 | 51.00 | 1 | 36 | 0 | | 19 | 153.45 | -78 | 132 | -0.45 |
| 0 | | 1 | 117 | 24 | 51.2 | 0 | | 1 | 17 | 2 | 154.75 | -30 | 181 | |
| 1 | 93 | 0 | | 69 | 51.5 | | | | | | | 22 | | -0.23 |
| 0 | | 1 | 118 | -49 | 51.8 | 0 | | 1 | 16 | -14 | 156.05 | -137 | 74 | -0.65 |
| 1 | 92 | 0 | | 43 | 52.05 | 1 | 37 | 0 | | 23 | 156.65 | -82 | 128 | -0.50 |
| 0 | | 1 | 119 | -76 | 52.30 | 0 | | 1 | 15 | 8 | 157.95 | -31 | 180 | |
| 1 | 91 | | | 15 | 52.60 | | | | | | | 24 | | -0.15 |
| 0 | | 1 | 120 | -105 | 52.85 | 0 | | 1 | 14 | -6 | 159.3 | -132 | 79 | -0.75 |
| 1 | 90 | 0 | | -15 | 53.15 | 1 | 38 | 0 | | 32 | 159.8 | -74 | 136 | -0.35 |
| 1 | 89 | 0 | | 74 | 53.45 | 0 | | 1 | 13 | 19 | 161.13 | -20 | 189 | |
| 0 | | 1 | 121 | -17 | 53.70 | | | | | | | 36 | | -0.03 |
| 1 | 88 | 0 | | 41 | 54.00 | 0 | | 1 | 12 | 7 | 162.5 | -117 | 92 | -0.5 |
| 0 | | 1 | 122 | -81 | 54.20 | 0 | | 1 | 11 | -4 | 163.85 | -58 | 152 | |

Table I—Continued

| ΔX₁ | X₁ | ΔY₁ | Y₁ | E₁ | α₁° | ΔX₂ | X₂ | ΔY₂ | Y₂ | E₂ | α₂° | E_{α₁} | E_{α₂} | 3α₁°−α₂° |
|---|---|---|---|---|---|---|---|---|---|---|---|---|---|---|
| 1 | 87 | 0 |  | 6 | 54.50 |  |  |  |  |  |  | 5 |  | −0.35 |
| 0 |  | 1 | 123 | −117 | 54.75 | 1 | 39 | 0 |  | 35 | 164.3 | −142 | 68 | −0.05 |
| 1 | 86 | 0 |  | −31 | 55.05 | 0 |  | 1 | 10 | 25 | 166.63 | −82 | 127 | −0.48 |
| 1 | 85 | 0 |  | 54 | 55.40 | 0 |  | 1 | 9 | 16 | 166.90 | −20 | 188 |  |
| 0 |  | 1 | 124 | −70 | 55.60 |  |  |  |  |  |  | 44 |  | −0.10 |
| 1 | 84 | 0 |  | 14 | 55.90 | 0 |  | 1 | 8 | 8 | 168.41 | −100 | 100 | −0.71 |
| 0 |  | 1 | 125 | −111 | 56.1 | 0 |  | 1 | 7 | 1 | 169.83 | −33 | 176 |  |
| 1 | 83 | 0 |  | −28 | 56.45 |  |  |  |  |  |  | 38 |  | −0.46 |
| 1 | 82 | 0 |  | 54 | 56.75 | 0 |  | 1 | 6 | −5 | 171.15 | −100 | 107 | −0.90 |
| 0 |  | 1 | 126 | −72 | 56.95 | 1 | 40 | 0 |  | 35 | 171.47 | −28 | 180 |  |
| 1 | 81 | 0 |  | 9 | 57.3 |  |  |  |  |  |  | 42 |  | +0.43 |
| 0 |  | 1 | 127 | −118 | 57.5 | 0 |  | 1 | 5 | 30 | 172.88 | −96 | 112 | −0.38 |
| 1 | 80 | 0 |  | −38 | 57.8 | 0 |  | 1 | 4 | 26 | 174.28 | −23 | 184 |  |
| 1 | 79 | 0 |  | 41 | 58.15 |  |  |  |  |  |  | 52 |  | +0.17 |
| 0 |  | 1 | 128 | −87 | 58.35 | 0 |  | 1 | 3 | 23 | 175.71 | −80 | 127 | −0.66 |
| 1 | 78 | 0 |  | −9 | 58.70 | 0 |  | 1 | 2 | 21 | 177.14 | −2 | 204 |  |
| 1 | 77 | 0 |  | 68 | 59.0 |  |  |  |  |  |  | 78 |  | −0.14 |
| 0 |  | 1 | 129 | −61 | 59.2 | 0 |  | 1 | 1 | 20 | 178.57 | −48 | 156 |  |
| 1 | 76 | 0 |  | 15 | 59.5 |  |  |  |  |  |  | 35 |  | −0.07 |
| 0 |  | 1 | 130 | −115 | 59.7 | 0 |  | 1 | 0 | 20 | 180.00 | −88 | 118 | −0.90 |
| 1 | 75 | 0 |  | −40 | 60.05 | 0 |  | 1 | 1 | 19 | 181.43 | −2 | 203 |  |
| 1 | 74 | 0 |  | 34 | 60.28 |  |  |  |  |  |  | 80 |  | +0.39 |
| 0 |  | 1 | 131 | −97 | 60.55 | 0 |  | 1 | 2 | 17 | 182.86 | −43 | 162 |  |
| 1 | 73 | 0 |  | −24 | 60.98 |  |  |  |  |  |  | 38 |  | −0.22 |
| 1 | 72 | 0 |  | 48 | 61.20 | 0 |  | 1 | 3 | 14 | 184.29 | −90 | 113 | −0.69 |
| 0 |  | 1 | 132 | −84 | 61.40 | 0 |  | 1 | 4 | 10 | 185.72 | −16 | 188 |  |
| 1 | 71 | 0 |  | −13 | 61.72 |  |  |  |  |  |  | 56 |  | −0.56 |
| 1 | 70 | 0 |  | 57 | 62.08 | 0 |  | 1 | 5 | 5 | 187.12 | −76 | 126 | −0.88 |
| 0 |  | 1 | 133 | −76 | 62.25 | 0 |  | 1 | 6 | −1 | 188.53 | −9 | 194 |  |
| 1 | 69 | 0 |  | −7 | 62.60 |  |  |  |  |  |  | 56 |  | −0.73 |
| 1 | 68 | 0 |  | 61 | 62.93 | 1 | 39 | 0 |  | 36 | 188.85 | −82 | 119 | −0.06 |
| 0 |  | 1 | 134 | −73 | 63.10 | 0 |  | 1 | 7 | 31 | 190.17 | −16 | 186 |  |
| 1 | 67 | 0 |  | −6 | 63.45 |  |  |  |  |  |  | 48 |  | +0.18 |
| 1 | 66 | 0 |  | 60 | 63.79 | 0 |  | 1 | 8 | 23 | 191.59 | −90 | 110 | −0.22 |
| 0 |  | 1 | 135 | −75 | 63.95 | 0 |  | 1 | 9 | 14 | 193.00 | −31 | 170 |  |
| 1 | 65 | 0 |  | −10 | 64.30 |  |  |  |  |  |  | 26 | − | −0.10 |
| 1 | 64 | 0 |  | 54 | 64.67 | 0 |  | 1 | 10 | 4 | 194.38 | −118 | 51 | −0.37 |
| 0 |  | 1 | 136 | −82 | 64.81 | 0 |  | 1 | 11 | −7 | 195.75 | −66 | 134 | −1.34 |
| 1 | 63 | 0 |  | −19 | 65.15 | 1 | 38 | 0 |  | 31 | 196.15 | −16 | 183 |  |
| 1 | 62 | 0 |  | 43 | 65.50 |  |  |  |  |  |  | 36 |  | +0.35 |
| 0 |  | 1 | 137 | −94 | 65.67 | 0 |  | 1 | 12 | 19 | 197.50 | −111 | 88 | −0.49 |
| 1 | 61 | 0 |  | −33 | 66.0 | 0 |  | 1 | 13 | 6 | 198.82 | −62 | 136 | −0.85 |
| 1 | 60 | 0 |  | 27 | 66.37 | 0 |  | 1 | 14 | −8 | 200.2 | −17 | 180 |  |
| 0 |  | 1 | 138 | −111 | 66.5 |  |  |  |  |  |  | 24 |  | −0.70 |
| 1 | 59 | 0 |  | −52 | 66.87 | 1 | 37 | 0 |  | 29 | 200.7 | −132 | 65 | −0.09 |
| 1 | 58 | 0 |  | 6 | 67.2 | 0 |  | 1 | 15 | 14 | 202.05 | −88 | 103 | −0.45 |

Table I—Continued

| $\Delta X_1$ | $X_1$ | $\Delta Y_1$ | $Y_1$ | $E_1$ | $\alpha_1^o$ | $\Delta X_2$ | $X_2$ | $\Delta Y_2$ | $Y_2$ | $E_2$ | $\alpha_2^o$ | $E_{\alpha_1}$ | $E_{\alpha_2}$ | $3\alpha_1^o-\alpha_2^o$ |
|---|---|---|---|---|---|---|---|---|---|---|---|---|---|---|
| 0 |  | 1 | 139 | -193 | 67.35 | 0 |  | 1 | 16 | -2 | 203.38 | -48 | 149 | -1.33 |
| 1 | 57 | 0 |  | -76 | 67.72 | 1 | 36 | 0 |  | 34 | 203.95 | -10 | 186 |  |
| 1 | 56 | 0 |  | -20 | 68.09 |  |  |  |  |  |  | 30 |  | +0.32 |
| 1 | 55 | 0 |  | 35 | 68.40 | 0 |  | 1 | 17 | 17 | 205.27 | -126 | 68 | -0.07 |
| 0 |  | 1 | 140 | -105 | 68.55 | 0 |  | 1 | 18 | -1 | 206.55 | -91 | 104 | -0.90 |
| 1 | 54 | 0 |  | -51 | 68.90 | 1 | 35 | 0 |  | 34 | 207.20 | -58 | 136 | -0.50 |
| 1 | 53 | 0 |  | 2 | 69.30 | 0 |  | 1 | 19 | 15 | 208.60 | -23 | 170 |  |
| 0 |  | 1 | 141 | -139 | 69.40 |  |  |  |  |  |  | 8 |  | -0.30 |
| 1 | 52 | 0 |  | -87 | 69.77 | 0 |  | 1 | 20 | -5 | 209.80 | -154 | 39 | -0.49 |
| 1 | 51 | 0 |  | -36 | 70.12 | 1 | 34 | 0 |  | 29 | 210.43 | -126 | 66 | -0.07 |
| 1 | 50 | 0 |  | 14 | 70.50 | 0 |  | 1 | 21 | 8 | 211.70 | -96 | 95 | -0.20 |
| 0 |  | 1 | 142 | -128 | 70.61 | 0 |  | 1 | 22 | -14 | 212.90 | -70 | 122 | -0.07 |
| 1 | 49 | 0 |  | -79 | 70.98 | 1 | 33 | 0 |  | 19 | 213.7 | -46 | 145 | -0.76 |
| 1 | 48 | 0 |  | -31 | 71.32 | 0 |  | 1 | 23 | -4 | 214.83 | -20 | 170 |  |
| 1 | 47 | 0 |  | 16 | 71.69 |  |  |  |  |  |  | 2 |  | +0.24 |
| 0 |  | 1 | 143 | -127 | 71.81 | 1 | 32 | 0 |  | 28 | 215.70 | -166 | 24 | -0.27 |
| 1 | 46 | 0 |  | -61 | 72.18 | 0 |  | 1 | 24 | 4 | 216.80 | -141 | 48 | -0.26 |
| 1 | 45 | 0 |  | -36 | 72.55 | 0 |  | 1 | 25 | -21 | 218.00 | -120 | 68 | -0.35 |
| 1 | 44 | 0 |  | 8 | 72.90 | 1 | 31 | 0 |  | 10 | 216.82 | -103 | 94 | -0.12 |
| 0 |  | 1 | 144 | -136 | 73.0 | 0 |  | 1 | 26 | -16 | 219.95 | -84 | 104 | -0.95 |
| 1 | 43 | 0 |  | -93 | 73.39 | 1 | 30 | 0 |  | 14 | 220.90 | -67 | 130 | -0.73 |
| 1 | 42 | 0 |  | -51 | 73.75 | 0 |  | 1 | 27 | -13 | 222.00 | -48 | 138 | -0.75 |
| 1 | 41 | 0 |  | -10 | 74.10 | 1 | 29 | 0 |  | 16 | 222.93 | -33 | 152 | -0.63 |
| 1 | 40 | 0 |  | 30 | 74.50 | 0 |  | 1 | 28 | -12 | 224.00 | -16 | 168 | -0.5 |
| 0 |  | 1 | 145 | -115 | 74.60 | 1 | 28 | 0 |  | 16 | 225.00 | -3 | 182 |  |
| 1 | 39 | 0 |  | -76 | 74.95 |  |  |  |  |  |  | 14 |  | -0.15 |
| 1 | 38 | 0 |  | -38 | 75.33 | 0 |  | 1 | 29 | -13 | 226.00 | -154 | 29 | -0.01 |
| 1 | 37 | 0 |  | -1 | 75.70 | 1 | 27 | 0 |  | 14 | 227.07 | -142 | 40 | +0.03 |
| 1 | 36 | 0 |  | 35 | 76.08 | 0 |  | 1 | 30 | -16 | 228.05 | -128 | 53 | +0.19 |
| 0 |  | 1 | 146 | -111 | 76.16 | 1 | 26 | 0 |  | 10 | 229.10 | -118 | 64 | -0.38 |
| 1 | 35 | 0 |  | -76 | 76.52 | 0 |  | 1 | 31 | -21 | 230.05 | -104 | 77 | -0.49 |
| 1 | 34 | 0 |  | -42 | 76.90 | 1 | 25 | 0 |  | 4 | 231.1 | -94 | 86 | -0.40 |
| 1 | 33 | 0 |  | -9 | 77.29 | 0 |  | 1 | 32 | -28 | 232.0 | -82 | 97 | -0.13 |
| 1 | 32 | 0 |  | 23 | 77.63 | 1 | 24 | 0 |  | -4 | 233.2 | -74 | 104 | -0.31 |
| 0 |  | 1 | 147 | -124 | 77.72 | 1 | 23 | 0 |  | 19 | 234.3 | -64 | 115 | -1.14 |
| 1 | 31 | 0 |  | -93 | 78.10 | 0 |  | 1 | 33 | -14 | 235.18 | -50 | 128 | -0.88 |
| 1 | 30 | 0 |  | -63 | 78.49 | 1 | 22 | 0 |  | 8 | 236.3 | -40 | 137 | -0.83 |
| 1 | 29 | 0 |  | -34 | 78.85 | 0 |  | 1 | 34 | -26 | 237.1 | -28 | 148 | -0.55 |
| 1 | 28 | 0 |  | -6 | 79.22 | 1 | 21 | 0 |  | -5 | 238.3 | -20 | 155 | -0.61 |
| 1 | 27 | 0 |  | 21 | 79.60 | 1 | 20 | 0 |  | 15 | 239.37 | -10 | 164 |  |
| 0 |  | 1 | 148 | -137 | 79.67 |  |  |  |  |  |  | 2 |  | -0.56 |
| 1 | 26 | 0 |  | -101 | 80.05 | 0 |  | 1 | 35 | -20 | 240.25 | -160 | 14 | -0.10 |
| 1 | 25 | 0 |  | -76 | 80.42 | 1 | 19 | 0 |  | -1 | 241.5 | -151 | 22 | -0.24 |
| 1 | 24 | 0 |  | -52 | 80.80 | 1 | 18 | 0 |  | 17 | 242.8 | -140 | 32 | -0.4 |
| 1 | 23 | 0 |  | -29 | 81.18 | 0 |  | 1 | 36 | -19 | 243.45 | -127 | 44 | +0.09 |
| 1 | 22 | 0 |  | -7 | 81.55 | 1 | 17 | 0 |  | -2 | 244.73 | -118 | 52 | -0.06 |
| 1 | 21 | 0 |  | 14 | 81.93 | 1 | 16 | 0 |  | 17 | 246.55 | -107 | 62 | -0.38 |

Table I—Continued

| ΔX₁ | X₁ | ΔY₁ | Y₁ | E₁ | α₁° | ΔX₂ | X₂ | ΔY₂ | Y₂ | E₂ | α₂° | E_{x1} | E_{x2} | 3α₁°-α₂° |
|---|---|---|---|---|---|---|---|---|---|---|---|---|---|---|
| 0 | | 1 | 149 | -135 | 81.98 | 0 | | 1 | 37 | -23 | 246.65 | -94 | 76 | -0.71 |
| 1 | 20 | 0 | | -115 | 82.36 | 1 | 15 | 0 | | -8 | 247.95 | -83 | 86 | -0.87 |
| 1 | 19 | 0 | | -96 | 82.74 | 1 | 14 | 0 | | 6 | 249.30 | -70 | 98 | -1.08 |
| 1 | 18 | 0 | | -78 | 83.12 | 0 | | 1 | 38 | -32 | 249.80 | -55 | 112 | -0.44 |
| 1 | 17 | 0 | | -61 | 83.50 | 1 | 13 | 0 | | -19 | 251.13 | -44 | 122 | -0.63 |
| 1 | 16 | 0 | | -45 | 83.70 | 1 | 12 | 0 | | -7 | 252.5 | -31 | 134 | -1.4 |
| 1 | 15 | 0 | | -30 | 84.25 | 1 | 11 | 0 | | 4 | 253.85 | -16 | 148 | |
| 1 | 14 | 0 | | -16 | 84.62 | | | | | | | 1 | | +0.01 |
| 1 | 13 | 0 | | -3 | 85.01 | 0 | | 1 | 39 | -35 | 254.30 | -146 | 16 | +0.73 |
| 1 | 12 | 0 | | 9 | 85.39 | 1 | 10 | 0 | | -25 | 256.63 | -134 | 27 | -0.56 |
| 0 | | 1 | 150 | -141 | 85.42 | 1 | 9 | 0 | | -16 | 256.90 | -120 | 42 | -0.64 |
| 1 | 11 | 0 | | -130 | 85.80 | 1 | 8 | 0 | | -8 | 258.41 | -102 | 59 | -1.01 |
| 1 | 10 | 0 | | -120 | 86.18 | 1 | 7 | 0 | | -1 | 259.83 | -82 | 78 | -1.29 |
| 1 | 9 | 0 | | -111 | 86.57 | 1 | 6 | 0 | | 5 | 261.15 | -60 | 99 | -1.45 |
| 1 | 8 | 0 | | -103 | 86.95 | 0 | | 1 | 40 | -35 | 261.47 | -36 | 122 | -0.62 |
| 1 | 7 | 0 | | -96 | 87.33 | 1 | 5 | 0 | | -30 | 262.88 | -16 | 141 | |
| 1 | 6 | 0 | | -90 | 87.71 | | | | | | | 6 | | +0.23 |
| 1 | 5 | 0 | | -85 | 88.09 | 1 | 4 | 0 | | -26 | 264.28 | -129 | 26 | -0.01 |
| 1 | 4 | 0 | | -81 | 88.47 | 1 | 3 | 0 | | -23 | 265.71 | -106 | 43 | +0.70 |
| 1 | 3 | 0 | | -78 | 88.86 | 1 | 2 | 0 | | -21 | 267.14 | -81 | 72 | -0.57 |
| 1 | 2 | 0 | | -76 | 89.24 | 1 | 1 | 0 | | -20 | 268.57 | -54 | 98 | -0.66 |
| 1 | 1 | 0 | | -75 | 89.62 | 1 | 0 | 0 | | -20 | 270.00 | -25 | 126 | |
| 1 | 0 | 0 | | -75 | 90.00° | | | | | | | 6 | | 0.00 |

TABLE II

NUMERICAL EXAMPLE OF THE GENERATION OF A TWO-LOBED EPITROCHOID FOR FIRST QUADRANT GENERATION $$\Delta X_s = -\Delta X_1 + S_x \Delta X_2$$
$$\Delta Y_s = +\Delta Y_1 + S_y \Delta Y_2$$
$$X_s = X_0 + \Sigma \Delta X_s$$
$$Y_s = Y_0 + \Sigma \Delta Y_s$$

$X_0 = R_1 - R_2$
$Y_0 = 0$
$R_1 = 150$
$R_2 = 40$

| CASE | CIRCLE 2 ANGLE | $S_x$ | $S_y$ |
|---|---|---|---|
| 1 | ⌐ | (+) | (−) |
| 2 | ⌐ | (+) | (+) |
| 3 | ⌐ | (−) | (+) |

COMPUTED SURFACE
$$X_s = R_1 \cos\alpha_1 - R_2 \cos 3\alpha_1$$
$$Y_s = R_1 \sin\alpha_1 - R_2 \sin 3\alpha_1$$

| REF α₁ | R₁ CIRCLE | | R₂ CIRCLE | | GENERATED | | COMPUTED | | ERROR | | |
|---|---|---|---|---|---|---|---|---|---|---|---|
| | ΔX₁ | ΔY₁ | ΔX₂ | ΔY₂ | X_s | Y_s | X_s | Y_s | E_x | E_y | |
| 0° | | | | | 110 | 0 | 110 | 0 | 0 | 0 | ① |
| 0.382° | 0 | 1 | 0 | -1 | | | 110.005 | 0.200 | 0.005 | 0.200 | |
| 0.764° | 0 | 1 | 0 | -1 | | | 110.019 | 0.400 | 0.019 | 0.400 | |
| 1.143° | 0 | 1 | 0 | -1 | | | 110.042 | 0.600 | 0.042 | 0.600 | |
| 1.525° | 0 | 1 | 0 | -1 | | | 110.074 | 0.801 | 0.074 | 0.801 | |
| 1.91° | 0 | 1 | 0 | -1 | | | 110.117 | 1.006 | 0.117 | 1.006 | |
| 2.29° | 0 | 1 | | | | 1 | 110.167 | 1.209 | 0.167 | 0.209 | |
| 2.675° | 0 | 1 | 0 | -1 | | | 110.228 | 1.416 | 0.228 | 0.416 | |
| 3.05° | 0 | 1 | 1 | 0 | 111 | 2 | 110.297 | 1.620 | -0.703 | -0.380 | |

① START CASE-1

Table VII—Continued

| REF $\alpha_1$ | R, Circle $\Delta X_1$ | $\Delta Y_1$ | R, Line $\Delta X_2$ | $\Delta Y_2$ | GENERATED $X_5$ | $Y_5$ | COMPUTED $X_8$ | $Y_8$ | ERROR $\epsilon_x$ | $\epsilon_y$ | |
|---|---|---|---|---|---|---|---|---|---|---|---|
| 3.43° | 0 | 1 | 0 | -1 | | | 110.375 | 1.829 | -0.625 | -0.171 | |
| 3.82° | 0 | 1 | 0 | -1 | | | 110.464 | 2.046 | -0.536 | 0.046 | |
| 4.20° | 0 | 1 | 0 | -1 | | | 110.561 | 2.260 | -0.439 | 0.260 | |
| 4.58° | 0 | 1 | 0 | -1 | | | 110.666 | 2.477 | -0.334 | 0.477 | |
| 4.61° | -1 | 0 | 0 | -1 | 110 | 1 | | | | | ④ |
| 4.99° | 0 | 1 | 1 | 0 | 111 | 2 | 110.789 | 2.715 | -0.211 | 0.715 | |
| 5.38° | 0 | 1 | | | | 3 | 110.916 | 2.945 | -0.084 | -0.055 | |
| 5.75° | 0 | 1 | 0 | -1 | | | 111.044 | 3.167 | 0.044 | 0.167 | |
| 6.30° | 0 | 1 | 0 | -1 | | | 111.251 | 3.503 | 0.251 | 0.503 | |
| 6.50° | 0 | 1 | 0 | -1 | | | 111.330 | 3.628 | 0.330 | 0.628 | |
| 6.88° | 0 | 1 | 1 | 0 | 112 | 4 | 111.487 | 3.869 | -0.513 | -0.131 | |
| 7.25° | 0 | 1 | 0 | -1 | | | 111.648 | 4.108 | -0.352 | 0.108 | |
| 7.64° | 0 | 1 | 0 | -1 | | | 111.826 | 4.364 | -0.174 | 0.364 | |
| 8.01° | 0 | 1 | 1 | 0 | 113 | 5 | 112.003 | 4.613 | -0.917 | -0.387 | |
| 8.07° | -1 | 0 | 0 | -1 | 112 | 4 | | | | | ④ |
| 8.45° | 0 | 1 | 0 | -1 | | | | | | | |
| 8.82° | 0 | 1 | 1 | 0 | 113 | 5 | 112.416 | 5.177 | -0.584 | 0.177 | |
| 9.20° | 0 | 1 | 0 | -1 | | | 112.623 | 5.450 | -0.378 | 0.450 | |
| 9.57° | 0 | 1 | 0 | -1 | | | 112.830 | 5.723 | -0.170 | 0.723 | |
| 9.95° | 0 | 1 | 1 | 0 | 114 | 6 | 113.051 | 6.009 | -0.949 | 0.009 | |
| 10.31° | 0 | 1 | | | | 7 | 113.266 | 6.286 | -0.734 | 0.286 | |
| 10.40° | -1 | 0 | 0 | -1 | 113 | 6 | | | | | ④ |
| 10.78° | 0 | 1 | 0 | -1 | | | | | | | |
| 11.15° | 0 | 1 | 1 | 0 | 114 | 7 | 113.794 | 6.958 | -0.206 | -0.042 | |
| 11.50° | 0 | 1 | 0 | -1 | | | 114.024 | 7.249 | 0.024 | 0.249 | |
| 11.90° | 0 | 1 | 1 | 0 | 115 | 8 | 114.293 | 7.589 | -0.707 | -0.411 | |
| 12.25° | 0 | 1 | 0 | -1 | | | 114.535 | 7.894 | -0.465 | -0.106 | |
| 12.37° | -1 | 0 | 0 | -1 | 114 | 7 | | | | | ④ |
| 12.71° | 0 | 1 | 1 | 0 | 115 | 8 | 114.860 | 8.305 | -0.140 | 0.305 | |
| 13.10 | 0 | 1 | 0 | -1 | | | 115.143 | 8.662 | 0.143 | 0.662 | |
| 13.46 | 0 | 1 | 1 | 0 | 116 | 9 | 115.409 | 9.001 | -0.591 | 0.001 | |
| 13.85 | 0 | 1 | 0 | -1 | | | 115.565 | 9.376 | -0.435 | 0.376 | |
| 13.92 | -1 | 0 | 1 | 0 | | | 115.757 | 9.445 | -0.243 | 0.445 | |
| 14.30 | 0 | 1 | 0 | -1 | | | 116.051 | 9.821 | 0.051 | 0.821 | |
| 14.68 | 0 | 1 | 1 | 0 | 117 | 10 | 116.349 | 10.207 | -0.651 | 0.207 | |
| 15.05 | 0 | 1 | 0 | -1 | | | 116.645 | 10.591 | -0.355 | 0.591 | |
| 15.40 | 0 | 1 | | | | 11 | 116.929 | 10.963 | -0.071 | -0.037 | |
| 15.50 | -1 | 0 | 1 | 0 | | | 117.010 | 11.071 | 0.010 | 0.071 | |
| 15.90 | 0 | 1 | 0 | -1 | | | 117.341 | 11.509 | 0.341 | 0.509 | |
| 16.23 | 0 | 1 | 1 | 0 | 118 | 12 | 117.617 | 11.878 | -0.383 | -0.122 | |
| 16.60 | 0 | 1 | 0 | -1 | | | 117.930 | 12.301 | -0.070 | 0.301 | |
| 17.00 | 0 | 1 | 1 | 0 | 119 | 13 | 118.273 | 12.770 | -0.727 | -0.230 | |
| 17.10 | -1 | 0 | 0 | -1 | 118 | 12 | | | | | ④ |
| 17.43 | 0 | 1 | 1 | 0 | 119 | 13 | 118.646 | 13.286 | -0.354 | 0.286 | |
| 17.80 | 0 | 1 | 1 | 0 | 120 | 14 | 118.970 | 13.742 | -1.030 | -0.258 | |
| 18.19 | 0 | 1 | 0 | -1 | | | 119.316 | 14.232 | -0.684 | 0.232 | |

Table II—Continued

| REF α₁ | Q, CIRCLE/LINE ΔX₁ | ΔY₁ | ΔX₂ | ΔY₂ | GENERATED Xs | Ys | COMPUTED Xs | Ys | ERROR εₓ | εy | |
|---|---|---|---|---|---|---|---|---|---|---|---|
| 18.30 | -1 | 0 | | | 119 | | | | | | ④ |
| 18.65 | 0 | 1 | 1 | 0 | 120 | 15 | 119.727 | 14.826 | -0.273 | -0.174 | |
| 19.00° | 0 | 1 | 0 | -1 | | | 120.042 | 15.288 | 0.042 | 0.288 | |
| 19.40° | 0 | 1 | 1 | 0 | 121 | 16 | 120.405 | 15.828 | -0.595 | -0.172 | |
| 19.50° | -1 | 0 | 1 | 0 | | | 120.496 | 15.965 | -0.504 | -0.035 | |
| 19.85° | 0 | 1 | 0 | -1 | | | 120.816 | 16.451 | -0.184 | 0.451 | |
| 20.2° | 0 | 1 | 1 | 0 | 122 | 17 | 121.138 | 16.946 | -0.862 | -0.054 | |
| 20.55° | 0 | 1 | 1 | 0 | 123 | 18 | 121.461 | 17.451 | -1.539 | -0.549 | |
| 20.70° | -1 | 0 | | | 122 | | | | | | ④ |
| 21.05° | 0 | 1 | 0 | -1 | | | | | | | |
| 21.40° | 0 | 1 | 1 | 0 | 123 | 19 | 122.249 | 18.719 | -0.751 | -0.281 | |
| 21.60 | -1 | 0 | 1 | 0 | | | | | | | |
| 21.90 | 0 | 1 | 0 | -1 | | | | | | | |
| 22.28 | 0 | 1 | | | | 20 | 123.069 | 20.094 | 0.069 | 0.094 | |
| 22.60 | 0 | 1 | 1 | 0 | 124 | 21 | 123.368 | 20.609 | -0.632 | -0.391 | |
| 22.80 | -1 | 0 | 1 | 0 | | | | | | | |
| 23.10 | 0 | 1 | 0 | -1 | | | | | | | |
| 23.45 | 0 | 1 | 1 | 0 | 125 | 22 | 124.160 | 22.022 | -0.840 | 0.022 | |
| 23.63 | -1 | 0 | | | 124 | | | | | | ③ |
| 23.95 | 0 | 1 | 1 | 0 | 125 | 23 | 124.625 | 22.881 | -0.375 | -0.119 | |
| 24.31 | 0 | 1 | 1 | 0 | 126 | 24 | 124.958 | 23.513 | -1.042 | -0.487 | |
| 24.50 | -1 | 0 | 0 | -1 | 125 | 23 | | | | | ⑤ |
| 24.82 | 0 | 1 | | | | 24 | 125.428 | 24.428 | -0.572 | 0.428 | |
| 25.19 | 0 | 1 | 1 | 0 | 126 | 25 | 125.767 | 25.105 | -0.233 | 0.105 | |
| 25.31 | -1 | 0 | 1 | 0 | | | | | | | |
| 25.68 | 0 | 1 | 1 | 0 | 127 | 26 | 126.213 | 26.021 | -0.787 | 0.021 | |
| 26.05 | 0 | 1 | | | | 27 | 126.548 | 26.726 | -0.452 | -0.274 | |
| 26.21 | -1 | 0 | 1 | 0 | | | | | | | |
| 26.55 | 0 | 1 | 1 | 0 | 128 | 28 | 126.995 | 27.698 | -1.005 | -0.302 | |
| 26.90 | 0 | 1 | | | | 29 | 127.305 | 28.391 | -0.695 | -0.609 | |
| 27.05 | -1 | 0 | 0 | -1 | 127 | 28 | | | | | ⑤ |
| 27.4 | 0 | 1 | 1 | 0 | 128 | 29 | 127.744 | 29.400 | -0.256 | 0.400 | |
| 27.7 | 0 | 1 | | | | 30 | 128.004 | 30.016 | 0.004 | 0.016 | |
| 27.92 | -1 | 0 | 1 | 0 | | | | | | | |
| 28.28 | 0 | 1 | 1 | 0 | 129 | 31 | 128.499 | 31.229 | -0.501 | 0.229 | |
| 28.60° | 0 | 1 | | | | 32 | 128.768 | 31.911 | -0.232 | -0.089 | |
| 28.80° | -1 | 0 | 1 | 0 | | | | | | | |
| 29.10° | 0 | 1 | 1 | 0 | 130 | 33 | 129.182 | 32.995 | -0.818 | -0.005 | |
| 29.45 | 0 | 1 | | | | 34 | 129.466 | 33.766 | -0.534 | -0.234 | |
| 29.6° | -1 | 0 | 1 | 0 | | | | | | | ② |
| 29.96° | 0 | 1 | | | | 35 | 129.872 | 34.909 | -0.128 | -0.091 | |
| 30.30° | 0 | 1 | 1 | 0 | 131 | 36 | 130.153 | 35.684 | -0.847 | -0.316 | |
| 30.5° | -1 | 0 | 1 | 0 | | | | | | | |
| 30.80° | 0 | 1 | | | | 37 | 130.519 | 36.842 | -0.481 | -0.158 | |
| 31.00° | -1 | 0 | 1 | 0 | | | | | | | |
| 31.30° | 0 | 1 | | | | 38 | 130.889 | 38.020 | -0.111 | 0.020 | |

② START CASE-2

Table II—Continued

| REF | R, Circle | | R, Circle | | GENERATED | | COMPUTED | | ERROR | |
|---|---|---|---|---|---|---|---|---|---|---|
| $\alpha_1$ | $\Delta X_1$ | $\Delta Y_1$ | $\Delta X_2$ | $\Delta Y_2$ | $X_s$ | $Y_s$ | $X_s$ | $Y_s$ | $\varepsilon_x$ | $\varepsilon_y$ |
| 31.65° | 0 | 1 | 1 | 0 | 132 | 39 | 131.142 | 38.859 | -0.858 | -0.141 |
| 31.82° | -1 | 0 | 1 | 0 | | | | | | |
| 32.20° | 0 | 1 | | | | 40 | 131.526 | 40.197 | -0.474 | 0.197 |
| 32.50° | 0 | 1 | 1 | 0 | 133 | 41 | 131.730 | 40.937 | -1.270 | -0.063 |
| 32.70° | -1 | 0 | 0 | 1 | 132 ④ | 42 | | | | |
| 33.00° | 0 | 1 | | | | 43 | 132.058 | 42.188 | 0.058 | -0.812 |
| 33.22° | -1 | 0 | 1 | 0 | | | | | | |
| 33.50° | 0 | 1 | 1 | 0 | 133 | 44 | 132.372 | 43.460 | -0.628 | -0.540 |
| 33.90° | 0 | 1 | | | | 45 | 132.613 | 44.493 | -0.387 | -0.507 |
| 34.10° | -1 | 0 | 1 | 0 | | | | | | |
| 34.40° | 0 | 1 | 1 | 0 | 134 | 46 | 132.901 | 45.802 | -1.099 | -0.198 |
| 34.60° | -1 | 0 | | | 133 ④ | | | | | |
| 34.90° | 0 | 1 | 1 | 0 | 134 | 47 | 133.173 | 47.131 | -0.827 | 0.131 |
| 35.21° | 0 | 1 | 0 | 1 | | 49 | 133.334 | 47.965 | -0.666 | -1.035 |
| 35.45° | -1 | 0 | 1 | 0 | | | | | | |
| 35.80° | 0 | 1 | | | | 50 | 133.621 | 49.574 | -0.379 | -0.426 |
| 36.00° | -1 | 0 | 1 | 0 | | | | | | |
| 36.30° | 0 | 1 | 1 | 0 | 135 | 51 | 133.846 | 50.958 | -1.154 | -0.042 |
| 36.58° | -1 | 0 | | | 134 ④ | | | | | |
| 36.85° | 0 | 1 | 0 | 1 | | 53 | 134.072 | 52.504 | 0.072 | -0.496 |
| 37.15° | 0 | 1 | 1 | 0 | 135 | 54 | 134.186 | 53.356 | -0.814 | -0.644 |
| 37.40° | -1 | 0 | 1 | 0 | | | | | | |
| 37.70° | 0 | 1 | | | | 55 | 134.377 | 54.936 | -0.623 | -0.064 |
| 37.90° | -1 | 0 | 0 | 1 | 134 ④ | 56 | | | | |
| 38.20° | 0 | 1 | 1 | 0 | 135 | 57 | 134.530 | 56.392 | -0.470 | -0.608 |
| 38.42° | -1 | 0 | 1 | 0 | | | | | | |
| 38.78° | 0 | 1 | | | | 58 | 134.681 | 58.103 | -0.319 | 0.103 |
| 39.00° | -1 | 0 | 0 | 1 | 134 ④ | 59 | | | | |
| 39.30° | 0 | 1 | 1 | 0 | 135 | 60 | 134.793 | 59.657 | -0.207 | -0.343 |
| 39.60° | 0 | 1 | 1 | 0 | 136 | 61 | 134.847 | 60.561 | -1.153 | -0.439 |
| 39.82° | -1 | 0 | 0 | 1 | 135 ④ | 62 | | | | |
| 40.10° | 0 | 1 | | | | 63 | 134.919 | 62.083 | -0.081 | -0.917 |
| 40.40° | -1 | 0 | 1 | 0 | | | | | | |
| 40.65° | 0 | 1 | 1 | 0 | 136 | 64 | 134.973 | 63.775 | -1.027 | -0.225 |
| 40.90° | -1 | 0 | 0 | 1 | 135 ④ | 65 | | | | |
| 41.20° | 0 | 1 | | | | 66 | 134.998 | 65.487 | -0.002 | -0.513 |
| 41.45° | -1 | 0 | 1 | 0 | | | | | | |
| 41.75° | 0 | 1 | 0 | 1 | | 68 | 134.994 | 67.217 | -0.006 | -0.783 |
| 42.00° | -1 | 0 | 1 | 0 | | | | | | |
| 42.30° | 0 | 1 | 1 | 0 | 136 | 69 | 134.961 | 68.964 | -1.039 | -0.036 |
| 42.50° | -1 | 0 | | | 135 | | 134.942 | 69.604 | -0.058 | 0.604 |
| 42.80° | 0 | 1 | 0 | 1 | | 71 | 134.905 | 70.568 | -0.095 | -0.432 |
| 43.10° | 0 | 1 | 1 | 0 | 136 ④ | 72 | | | | |
| 43.35° | -1 | 0 | 0 | 1 | 135 | 73 | 134.814 | 72.349 | -0.186 | -0.651 |
| 43.65° | 0 | 1 | 1 | 0 | 136 ④ | 74 | | | | |
| 43.90° | -1 | 0 | | | 135 | | 134.692 | 74.145 | -0.308 | 0.145 |

Table II – Continued

| REF | R₁ CIRCLE | | R₂ CIRCLE | | GENERATED | | COMPUTED | | ERROR | |
|---|---|---|---|---|---|---|---|---|---|---|
| α₁ | ΔX₁ | ΔY₁ | ΔX₂ | ΔY₂ | X₅ | Y₅ | X₅ | Y₅ | εₓ | εᵧ |
| 44.20° | 0 | 1 | 0 | 1 |  | 76 | 134.612 | 75.131 | -0.388 | 0.131 |
| 44.42° | -1 | 0 | 1 | 0 |  |  |  |  |  |  |
| 44.70° | 0 | 1 | 0 | 1 |  | 78 | 134.456 | 76.784 | -0.544 | -1.216 |
| 45.00° | -1 | 0 | 1 | 0 |  |  |  |  |  |  |
| 45.30° | 0 | 1 |  |  |  | 79 | 134.234 | 78.783 | -0.766 | -0.217 |
| 45.55° | -1 | 0 | 0 | 1 | 134 | 80 | 134.130 | 79.621 | 0.130 | -0.379 |
| 45.80° | 0 | 1 | 1 | 0 | 135 ⓐ | 81 |  |  |  |  |
| 46.10 | -1 | 0 | 0 | 1 | 134 | 82 | 133.876 | 81.473 | -0.124 | -0.527 |
| 46.40 | 0 | 1 | 1 | 0 | 135 ⓐ | 83 |  |  |  |  |
| 46.65 | -1 | 0 |  |  | 134 |  | 133.587 | 83.338 | -0.413 | 0.338 |
| 46.90 | 0 | 1 | 0 | 1 |  | 85 | 133.445 | 84.189 | -0.555 | -0.811 |
| 47.20 | -1 | 0 | 1 | 0 |  |  |  |  |  |  |
| 47.45 | -1 | 0 | 0 | 1 | 133 | 86 | 133.105 | 86.070 | 0.105 | 0.070 |
| 47.70 | 0 | 1 | 0 | 1 |  | 88 | 132.939 | 86.928 | -0.061 | -1.072 |
| 48.00 | -1 | 0 |  |  | 132 |  | 132.730 | 87.960 | 0.730 | -0.040 |
| 48.22 | 0 | 1 | 1 | 0 | 133 ⓐ | 89 |  |  |  |  |
| 48.50 | -1 | 0 | 0 | 1 | 132 | 90 | 132.358 | 89.687 | 0.358 | -0.313 |
| 48.80 | 0 | 1 | 1 | 0 | 133 ⓐ | 91 |  |  |  |  |
| 49.10 | -1 | 0 |  |  | 132 |  | 131.872 | 91.768 | -0.128 | 0.768 |
| 49.35 | 0 | 1 | 0 | 1 |  | 93 | 131.656 | 92.638 | -0.344 | -0.362 |
| 49.60 | -1 | 0 | 0 | 1 | 131 | 94 | 131.433 | 93.510 | 0.433 | -0.490 |
| 49.90 | 0 | 1 | 1 | 0 | 132 ⓐ | 95 |  |  |  |  |
| 50.15 | -1 | 0 | 0 | 1 | 131 | 96 | 130.914 | 95.431 | -0.086 | -0.569 |
| 50.40 | 0 | 1 |  |  |  | 97 | 130.666 | 96.307 | -0.334 | -0.693 |
| 50.70 | -1 | 0 | 0 | 1 | 130 | 98 | 130.358 | 97.359 | 0.358 | -0.641 |
| 51.00 | -1 | 0 | 1 | 0 |  |  |  |  |  |  |
| 51.2° | 0 | 1 | 0 | 1 |  | 100 | 129.819 | 99.115 | -0.181 | -0.885 |
| 51.5 | -1 | 0 |  |  | 129 |  | 129.481 | 100.171 | 0.481 | 0.171 |
| 51.8 | 0 | 1 | 0 | 1 |  | 102 | 129.131 | 101.227 | 0.131 | -0.773 |
| 52.05 | -1 | 0 | 1 | 0 |  |  |  |  |  |  |
| 52.30 | 0 | 1 | 0 | 1 |  | 104 | 128.522 | 102.990 | -0.478 | -1.010 |
| 52.60 | -1 | 0 |  |  | 128 |  | 128.141 | 104.049 | 0.141 | 0.049 |
| 52.85 | 0 | 1 | 0 | 1 |  | 106 | 127.815 | 104.931 | -0.185 | -1.069 |
| 53.15 | -1 | 0 | 1 | 0 |  |  |  |  |  |  |
| 53.45 | -1 | 0 | 0 | 1 | 127 | 107 | 126.999 | 107.050 | -0.001 | 0.050 |
| 53.70 | 0 | 1 |  |  |  | 108 | 126.645 | 107.933 | -0.355 | -0.067 |
| 54.00 | -1 | 0 | 0 | 1 | 126 | 109 | 126.210 | 108.992 | 0.210 | -0.008 |
| 54.20 | 0 | 1 | 0 | 1 |  | 111 | 125.913 | 109.698 | -0.087 | -1.302 |
| 54.50 | -1 | 0 |  |  | 125 |  | 125.458 | 110.757 | 0.458 | -0.243 |
| 54.75 | 0 | 1 | 1 | 0 | 126 ⓐ | 112 |  |  |  |  |
| 55.05 | -1 | 0 | 0 | 1 | 125 | 113 | 124.593 | 112.696 | -0.407 | -0.304 |
| 55.40 | -1 | 0 | 0 | 1 | 124 | 114 | 124.022 | 113.929 | 0.022 | -0.071 |
| 55.60 | 0 | 1 |  |  |  | 115 | 123.688 | 114.633 | -0.312 | -0.367 |
| 55.90 | -1 | 0 | 0 | 1 | 123 | 116 | 123.178 | 115.688 | 0.178 | -0.312 |
| 56.1 | 0 | 1 | 0 | 1 |  | 118 | 122.831 | 116.390 | -0.169 | -1.610 |
| 56.45 | -1 | 0 |  |  | 122 |  | 122.211 | 117.618 | 0.211 | -0.382 |
| 56.75 | -1 | 0 | 0 | 1 | 121 | 119 | 121.666 | 118.699 | 0.666 | -0.301 |

Table II—Continued

| REF $\alpha_1$ | R, CIRCLE $\Delta X_1$ | $\Delta Y_1$ | $\Delta X_2$ | $\Delta Y_2$ | GENERATED $X_g$ | $Y_g$ | $X_s$ | $Y_s$ | ERROR $\epsilon_x$ | $\epsilon_y$ |
|---|---|---|---|---|---|---|---|---|---|---|
| 56.98 | 0 | 1 | 1 | 0 | 122 | 120 | | | | |
| 57.3 | -1 | 0 | | | 121 | | 120.637 | 120.591 | -0.363 | 0.591 |
| 57.5 | 0 | 1 | 0 | 1 | | 122 | 120.253 | 121.288 | -0.747 | -0.712 |
| 57.8 | -1 | 0 | 0 | 1 | 120 | 123 | 119.666 | 122.331 | -0.334 | -0.669 |
| 58.15 | -1 | 0 | | | 119 | | 118.967 | 123.546 | -0.033 | 0.546 |
| 58.35 | 0 | 1 | 0 | 1 | | 125 | 118.560 | 124.239 | -0.440 | -0.761 |
| 58.70 | -1 | 0 | 0 | 1 | 118 | 126 | 117.835 | 125.448 | -0.165 | -0.552 |
| 59.0 | -1 | 0 | | | 117 | | 117.201 | 126.482 | 0.201 | 0.482 |
| 59.2 | 0 | 1 | 0 | 1 | | 128 | 116.771 | 127.169 | -0.229 | -0.831 |
| 59.5 | -1 | 0 | | | 116 | | 116.117 | 128.197 | 0.117 | 0.197 |
| 59.7 | 0 | 1 | 0 | 1 | | 130 | 115.674 | 128.881 | -0.326 | -1.119 |
| 60.5 | -1 | 0 | 0 | 1 | 115 | 131 | 114.886 | 130.074 | -0.114 | -0.926 |
| 60.25 | -1 | 0 | | | 114 | | 114.360 | 130.855 | 0.360 | -0.145 |
| 60.55 | 0 | 1 | 0 | 1 | | 133 | 113.733 | 131.770 | -0.267 | -1.230 |
| 60.88 | -1 | 0 | | | 113 | | 112.954 | 132.883 | -0.046 | -0.117 |
| 61.20 | -1 | 0 | 0 | 1 | 112 | 134 | 112.184 | 133.958 | 0.184 | -0.042 |
| 61.40 | 0 | 1 | 0 | 1 | | 136 | 111.696 | 134.627 | -0.304 | -1.373 |
| 61.72 | -1 | 0 | | | 111 | | 110.905 | 135.694 | -0.095 | -0.306 |
| 62.08 | -1 | 0 | 0 | 1 | 110 | 137 | 109.999 | 136.888 | -0.001 | -0.112 |
| 62.25 | 0 | 1 | 0 | 1 | | 139 | 109.565 | 137.450 | -0.435 | -1.550 |
| 62.60 | -1 | 0 | | | 109 | | 108.660 | 138.601 | -0.340 | -0.399 |
| 62.93 | -1 | 0 | -1 | 0 | 107 | | 107.792 | 139.680 | 0.792 | 0.680 |
| 63.10 | 0 | 1 | 0 | 1 | | 141 | 107.339 | 140.234 | 0.339 | -0.766 |
| 63.45 | -1 | 0 | | | 106 | | 106.396 | 141.368 | 0.396 | 0.368 |
| 63.79 | -1 | 0 | 0 | 1 | 105 | 142 | 105.464 | 142.463 | 0.464 | 0.463 |
| 63.95 | 0 | 1 | 0 | 1 | | 144 | 105.021 | 142.976 | 0.021 | -1.024 |
| 64.30 | -1 | 0 | | | 104 | | 104.039 | 144.092 | 0.039 | 0.092 |
| 64.67 | -1 | 0 | 0 | 1 | 103 | 145 | 102.985 | 145.262 | -0.015 | 0.262 |
| 64.81 | 0 | 1 | 0 | 1 | | 147 | 102.581 | 145.703 | -0.419 | -1.297 |
| 65.15 | -1 | 0 | -1 | 0 | 101 | | 101.591 | 146.768 | 0.591 | -0.232 |
| 65.50 | -1 | 0 | | | 100 | | 100.557 | 147.855 | 0.557 | 0.855 |
| 65.67 | 0 | 1 | 0 | 1 | | 149 | 100.049 | 148.380 | 0.049 | -0.620 |
| 66.0 | -1 | 0 | 0 | 1 | 99 | 150 | 99.053 | 149.392 | 0.053 | -0.628 |
| 66.37 | -1 | 0 | 0 | 1 | 98 | 151 | 97.920 | 150.518 | -0.080 | -0.482 |
| 66.5 | 0 | 1 | | | | 152 | 97.518 | 150.911 | -0.482 | -1.089 |
| 66.87 | -1 | 0 | -1 | 0 | 96 | | 96.363 | 152.023 | 0.363 | 0.023 |
| 67.2 | -1 | 0 | 0 | 1 | 95 | 153 | 95.318 | 153.004 | 0.318 | 0.004 |
| 67.35 | 0 | 1 | 0 | 1 | | 155 | 94.839 | 153.448 | -0.161 | -1.552 |
| 67.72 | -1 | 0 | -1 | 0 | 93 | | 93.646 | 154.533 | 0.646 | -0.467 |
| 68.09 | -1 | 0 | | | 92 | | 92.437 | 155.607 | 0.437 | 0.607 |
| 68.40 | -1 | 0 | 0 | 1 | 91 | 156 | 91.412 | 156.498 | 0.412 | 0.498 |
| 68.55 | 0 | 1 | 0 | 1 | | 158 | 90.912 | 156.925 | -0.088 | -1.075 |
| 68.90 | -1 | 0 | -1 | 0 | 89 | | 89.734 | 157.916 | 0.734 | -1.084 |
| 69.30 | -1 | 0 | 0 | 1 | 88 | 159 | 88.372 | 159.034 | 0.372 | 0.034 |
| 69.40 | 0 | 1 | | | | 160 | 88.028 | 159.311 | 0.028 | -0.689 |
| 69.77 | -1 | 0 | 0 | 1 | 87 | 161 | 86.748 | 160.328 | -0.252 | -0.672 |

③ START CASE-3

Table II—Continued

| REF α₁ | R, CIRCLE ΔX₁ | ΔY₁ | ΔX₂ | ΔY₂ | GENERATED Xs | Ys | COMPUTED Xs | Ys | ERROR εx | εy |
|---|---|---|---|---|---|---|---|---|---|---|
| 70.12 | -1 | 0 | -1 | 0 | 85 |  | 85.522 | 161.278 | 0.522 | 0.278 |
| 70.50 | -1 | 0 | 0 | 1 | 84 | 162 | 84.177 | 162.296 | 0.177 | 0.296 |
| 70.61 | 0 | 1 | 0 | 1 |  | 164 | 83.784 | 162.588 | -0.216 | -1.412 |
| 70.98 | -1 | 0 | -1 | 0 | 82 |  | 82.454 | 163.561 | 0.454 | -0.546 |
| 71.32 | -1 | 0 | 0 | 1 | 81 | 165 | 81.219 | 164.443 | 0.219 | -0.557 |
| 71.69 | -1 | 0 |  |  | 80 |  | 79.862 | 165.309 | -0.138 | 0.309 |
| 71.81 | 0 | 1 | -1 | 0 | 79 | 166 | 79.418 | 165.692 | 0.418 | -0.308 |
| 72.18 | -1 | 0 | 0 | 1 | 78 | 167 | 78.042 | 166.619 | 0.042 | -0.381 |
| 72.55 | -1 | 0 | 0 | 1 | 77 | 168 | 76.651 | 167.530 | -0.349 | -0.470 |
| 72.90 | -1 | 0 | -1 | 0 | 75 |  | 75.323 | 168.379 | 0.323 | 0.379 |
| 73.00 | 0 | 1 | 0 | 1 |  | 170 | 74.942 | 168.618 | -0.058 | -1.382 |
| 73.39 | -1 | 0 | -1 | 0 | 73 |  | 73.444 | 169.543 | 0.444 | -0.457 |
| 73.75 | -1 | 0 | 0 | 1 | 72 | 171 | 72.048 | 170.381 | 0.048 | -0.619 |
| 74.10 | -1 | 0 | -1 | 0 | 70 |  | 70.679 | 171.182 | 0.679 | 0.182 |
| 74.50 | -1 | 0 | 0 | 1 | 69 | 172 | 69.101 | 172.079 | 0.101 | 0.079 |
| 74.60 | 0 | 1 | -1 | 0 | 68 | 173 | 68.704 | 172.300 | 0.704 | 0.300 |
| 74.95 | -1 | 0 |  |  | 67 |  | 67.308 | 173.065 | 0.308 | 0.065 |
| 75.33 | -1 | 0 | 0 | 1 | 66 | 174 | 66.756 | 173.879 | 0.756 | -0.121 |
| 75.70 | -1 | 0 | -1 | 0 | 64 |  | 64.279 | 174.654 | 0.279 | 0.654 |
| 76.00 | -1 | 0 | 0 | 1 | 63 | 175 | 62.726 | 175.433 | -0.274 | 0.433 |
| 76.16 | 0 | 1 | -1 | 0 | 62 | 176 | 62.397 | 175.594 | 0.397 | -0.406 |
| 76.52 | -1 | 0 | 0 | 1 | 61 | 177 | 60.912 | 176.311 | -0.088 | -0.689 |
| 76.90 | -1 | 0 | -1 | 0 | 59 |  | 59.333 | 177.050 | 0.333 | 0.050 |
| 77.29 | -1 | 0 | 0 | 1 | 58 | 178 | 57.700 | 177.789 | -0.300 | -0.211 |
| 77.63 | -1 | 0 | -1 | 0 | 56 |  | 56.267 | 178.417 | 0.267 | 0.417 |
| 77.72 | 0 | 1 | -1 | 0 | 55 | 179 | 55.887 | 178.581 | 0.887 | -0.419 |
| 78.10 | -1 | 0 | 0 | 1 | 54 | 180 | 54.272 | 179.260 | 0.272 | -0.740 |
| 78.49 | -1 | 0 | -1 | 0 | 52 |  | 52.604 | 179.937 | 0.604 | -0.063 |
| 78.85 | -1 | 0 | 0 | 1 | 51 | 181 | 51.055 | 180.543 | 0.055 | -0.457 |
| 79.22 | -1 | 0 | -1 | 0 | 49 |  | 49.453 | 181.148 | 0.453 | 0.148 |
| 79.60 | -1 | 0 | -1 | 0 | 47 |  | 47.799 | 181.750 | 0.799 | 0.750 |
| 79.67 | 0 | 1 |  |  |  | 182 | 47.493 | 181.859 | 0.493 | -0.141 |
| 80.05 | -1 | 0 | 0 | 1 | 46 | 183 | 45.828 | 182.437 | -0.172 | -0.563 |
| 80.42 | -1 | 0 | -1 | 0 | 44 |  | 44.197 | 182.191 | 0.197 | -0.809 |
| 80.80 | -1 | 0 | -1 | 0 | 42 |  | 42.514 | 183.519 | 0.514 | 0.519 |
| 81.18 | -1 | 0 | 0 | 1 | 41 | 184 | 40.823 | 184.036 | -0.177 | 0.036 |
| 81.55 | -1 | 0 | -1 | 0 | 39 |  | 39.168 | 184.520 | 0.168 | 0.520 |
| 81.93 | -1 | 0 | -1 | 0 | 37 |  | 37.461 | 184.997 | 0.461 | 0.997 |
| 81.98 | 0 | 1 | 0 | 1 |  | 186 | 37.236 | 185.058 | 0.236 | -0.942 |
| 82.36 | -1 | 0 | -1 | 0 | 35 |  | 35.520 | 185.510 | 0.520 | -0.490 |
| 82.74 | -1 | 0 | -1 | 0 | 33 |  | 33.798 | 185.942 | 0.798 | -0.058 |
| 83.12 | -1 | 0 | 0 | 1 | 32 | 187 | 32.068 | 186.352 | 0.068 | -0.648 |
| 83.50 | -1 | 0 | -1 | 0 | 30 |  | 30.333 | 186.741 | 0.333 | -0.259 |
| 83.70 | -1 | 0 | -1 | 0 | 28 |  | 29.417 | 186.938 | 1.417 | -0.062 |
| 84.25 | -1 | 0 | -1 | 0 | 26 |  | 26.890 | 187.446 | 0.890 | 0.446 |
| 84.62 | -1 | 0 |  |  | 25 |  | 25.184 | 187.763 | 0.184 | 0.763 |

Table II—Continued

| REF $\alpha_1$ | R. CIRCLE $\Delta X_1$ | $\Delta Y_1$ | R. LINE $\Delta X_2$ | $\Delta Y_2$ | GENERATED $X_3$ | $Y_3$ | COMPUTED $X_3$ | $Y_3$ | ERROR $E_X$ | $E_Y$ |
|---|---|---|---|---|---|---|---|---|---|---|
| 85.01 | -1 | 0 | 0 | 1 | 24 | 188 | 23.380 | 188.074 | -0.620 | 0.074 |
| 85.31 | -1 | 0 | -1 | 0 | 22 |  | 21.618 | 188.355 | -0.382 | 0.355 |
| 85.80 | -1 | 0 | -1 | 0 | 19 |  | 19.711 | 188.634 | 0.711 | 0.634 |
| 86.18 | -1 | 0 | -1 | 0 | 17 |  | 17.941 | 188.869 | 0.941 | 0.869 |
| 86.565 | -1 | 0 | -1 | 0 | 15 |  | 16.143 | 189.085 | 1.141 | 1.085 |
| 86.95 | -1 | 0 | 0 | 1 | 14 | 190 | 14.348 | 189.279 | 0.342 | -0.721 |
| 87.33 | -1 | 0 | -1 | 0 | 12 |  | 12.561 | 189.447 | 0.561 | -0.553 |
| 87.71 | -1 | 0 |  |  | 11 |  | 10.778 | 189.593 | -0.222 | -0.407 |
| 82.09 | -1 | 0 | -1 | 0 | 9 |  | 8.993 | 189.717 | -0.007 | -0.283 |
| 88.47 | -1 | 0 | -1 | 0 | 7 |  | 7.206 | 189.818 | 0.206 | -0.182 |
| 88.855 | -1 | 0 | -1 | 0 | 5 |  | 5.394 | 189.898 | 0.394 | -0.102 |
| 89.236 | -1 | 0 | -1 | 0 | 3 |  | 3.600 | 189.955 | 0.600 | -0.045 |
| 89.618 | -1 | 0 | -1 | 0 | 1 |  | 1.800 | 189.989 | 0.800 | -0.011 |
| 90.000 | -1 | 0 | 0 | 0 | 0 |  | 0 | 190.000 | 0 | 0 |

ⓐ PULSES $\Delta X_3$ OR $\Delta Y_3$ NOT SUPPLIED TO VELOCITY CONTROL DIRECTLY

TABLE III
CIRCLE COORDINATOR ($\alpha_3 = \alpha_T$) OPERATION
$R_1 = 150$, $R_2 = 40$, $R_3 = 50$

| (REF) $\alpha_1$ | $\Delta X_T$ | $X_T$ | $\Delta Y_T$ | $Y_T$ | $\alpha_T$ | $E_T$ | $\Delta X_3$ | $X_3$ | $\Delta Y_3$ | $Y_3$ | $E_3$ | $\alpha_3$ | $E_{T_3}$ | $\alpha_3 - \alpha_T$ |
|---|---|---|---|---|---|---|---|---|---|---|---|---|---|---|
| 0 |  | 30 |  | 0 | 0° | 0 |  | 50 |  | 25 | 0° | 0 | 0 | ① |
| 0.382 |  | -2 |  | -2 | 3.815° | -100 | 0 |  | 1 | 24 |  |  | -70 |  |
|  |  |  |  |  |  |  | 0 |  | 1 | 22 |  |  | -40 |  |
|  |  |  |  |  |  |  | 0 |  | 1 | 19 |  |  | -10 |  |
|  |  |  |  |  |  |  | 0 |  | 1 | 15 | 4.58° | +20 | 0.76° |
| 0.764° |  | -2 |  | -4 | 7.60° | -80 | 0 |  | 1 | 10 |  |  | -50 |  |
|  |  |  |  |  |  |  | 0 |  | 1 | 6 | 4 |  | -20 |  |
|  |  |  |  |  |  |  | 0 |  | 1 | 7 | -3 | 7.96° | +10 | 0.36° |
| 1.143° |  | -2 |  | -6 | 11.30° | -90 | 1 | 49 | 0 | 46 |  |  | -84 |  |
|  |  |  |  |  |  |  | 0 |  | 1 | 8 | 38 |  | -54 |  |
|  |  |  |  |  |  |  | 0 |  | 1 | 9 | 29 |  | -24 |  |
|  |  |  |  |  |  |  | 0 |  | 1 | 10 | 19 | 11.51° | +6 | 0.21° |
| 1.525 |  | -2 |  | -8 | 14.91° | -92 | 0 |  | 1 | 11 | 8 |  | -62 |  |
|  |  |  |  |  |  |  | 0 |  | 1 | 12 | -4 |  | -32 |  |
|  |  |  |  |  |  |  | 1 | 48 | 0 | 44 |  |  | -24 |  |
|  |  |  |  |  |  |  | 0 |  | 1 | 13 | 31. | 15.12° | +6 | 0.21° |
| 1.91° |  | -2 |  | -10 | 18.40° | -90 | 0 |  | 1 | 14 | 17 |  | -60 |  |
|  |  |  |  |  |  |  | 0 |  | 1 | 15 | 2 |  | -30 |  |
|  |  |  |  |  |  |  | 0 |  | 1 | 16 | -14 | 18.42° | 0 | 0.02° |
| 2.29 |  | +1 |  | -9 | 16.70° | +48 |  |  |  |  |  |  |  |  |
| 2.675 |  | -2 |  | -11 | 20.10° | -48 | 1 | 47 | 0 | 33 |  |  | -37 |  |
|  |  |  |  |  |  |  | 0 |  | 1 | 17 | 16 |  | -7 |  |
|  |  |  |  |  |  |  | 0 |  | 1 | 18 | -2 | 20.92 | +23 | 0.82° |
| 3.05° | 3 | 33 | 1 | -10 | 16.85° | +124 |  |  |  |  |  |  |  |  |
| 3.43° |  | -2 |  | -12 | 19.95° | +30 |  |  |  |  |  |  |  |  |
| 3.82° |  | -2 |  | -14 | 23.00° | -64 | 1 | 46 | 0 | 44 |  |  | -50 |  |
|  |  |  |  |  |  |  | 0 |  | 1 | 19 | 25 |  | -17 |  |
|  |  |  |  |  |  |  | 0 |  | 1 | 20 | 5 | 23.49 | +16 | 0.49° |

① START STAGE-1

Table III—Continued

| REF $\alpha_1$ | $\Delta X_T$ | $X_T$ | $\Delta Y_T$ | $Y_T$ | $\alpha_T$ | $E_T$ | $\Delta X_3$ | $X_3$ | $\Delta Y_3$ | $Y_3$ | $E_3$ | $\alpha_3$ | $E_{T_3}$ | $\alpha_3 - \alpha_T$ |
|---|---|---|---|---|---|---|---|---|---|---|---|---|---|---|
| 4.20° | | | -2 | -16 | 25.85° | -76 | 0 | | 1 | 21 | -16 | | -43 | |
| | | | | | | | 1 | 45 | 0 | | 29 | | -27 | |
| | | | | | | | 0 | | 1 | 22 | 7 | 26.05° | +6 | 0.21° |
| 4.58° | | | -2 | -18 | 28.60° | -84 | 0 | | 1 | 23 | -16 | | -51 | |
| | | | | | | | 1 | 44 | 0 | | 28 | | -33 | |
| | | | | | | | 0 | | 1 | 24 | 4 | 28.60 | 0 | 0.00° |
| 4.61° | -1 | 32 | -3 | -21 | 33.25° | -156 | 0 | | 1 | 25 | -21 | | -124 | |
| | | | | | | | 1 | 43 | 0 | | 22 | | -103 | |
| | | | | | | | 0 | | 1 | 26 | -4 | | -71 | |
| | | | | | | | 1 | 42 | 0 | | 38 | | -50 | |
| | | | | | | | 0 | | 1 | 27 | 11 | | -18 | |
| | | | | | | | 0 | | 1 | 28 | -17 | 33.70 | +14 | 0.45° |
| 4.99° | +3 | 35 | 1 | -20 | 29.72° | +140 | | | | | | | | |
| 5.38° | | | 1 | -19 | 28.47° | +182 | | | | | | | | |
| 5.75° | | | -2 | -21 | 30.95° | +98 | | | | | | | | |
| 6.30° | | | -2 | -23 | 33.30° | +14 | | | | | | | | |
| 6.60° | | | -2 | -25 | 35.05° | -70 | 1 | 41 | 0 | | 24 | | -45 | |
| | | | | | | | 0 | | 1 | 29 | -5 | | -10 | |
| | | | | | | | 1 | 40 | 0 | | 35 | 35.90° | +15 | |
| 6.88° | 3 | 38 | 1 | -24 | 32.25 | +142 | | | | | | | | |
| 7.25° | | | -2 | -26 | 34.40 | +62 | | | | | | | | |
| 7.64° | | | -2 | -28 | 36.40° | -18 | 0 | | 1 | 30 | 5 | 36.82 | +20 | 0.42° |
| 8.01° | 3 | 41 | 1 | -27 | 33.35 | +150 | | | | | | | | |
| 8.07° | -1 | 40 | -3 | -30 | 36.85° | 0 | | | | | | | | |
| 8.45° | | | -2 | -32 | 38.62 | -80 | 0 | | 1 | 31 | -26 | | -40 | |
| | | | | | | | 1 | 39 | 0 | | 13 | | -8 | |
| | | | | | | | 0 | | 1 | 32 | -19 | 39.40° | +32 | 0.78 |
| 8.82° | 3 | 43 | 1 | -31 | 35.78 | +167 | | | | | | | | |
| 9.20° | | | -2 | -33 | 37.50° | +89 | | | | | | | | |
| 9.57° | | | -2 | -35 | 39.10 | +11 | | | | | | | | |
| 9.95° | 3 | 46 | 1 | -34 | 36.45° | +146 | | | | | | | | |
| 10.31 | | | 1 | -33 | 35.61° | 185 | | | | | | | | |
| 10.40 | -1 | 45 | -3 | -36 | 38.62 | 36 | | | | | | | | |
| 10.78 | | | -2 | -38 | 40.20 | -42 | 1 | 38 | 0 | | 19 | | -4 | |
| | | | | | | | 0 | | 1 | 33 | -14 | 40.97° | 41 | 0.77° |
| 11.15 | 3 | 48 | 1 | -37 | 37.60 | 178 | | | | | | | | |
| 11.50 | | | -2 | -39 | 39.10 | 102 | | | | | | | | |
| 11.90 | 3 | 51 | 1 | -38 | 36.50 | 239 | | | | | | | | |
| 12.25 | | | -2 | -40 | 38.10 | 163 | | | | | | | | |
| | | | | | | | 0 | | 1 | 32 | +18 | | 112 | |
| | | | | | | | 1 | 39 | 0 | | -21 | | 72 | |
| | | | | | | | 0 | | 1 | 31 | 10 | | 21 | |
| | | | | | | | 1 | 40 | 0 | | -30 | 37.75° | -19 | -0.35° |
| 12.37° | -1 | 50 | -3 | -43 | 40.70 | -170 | | | | | | | | |
| 12.71 | 3 | 53 | 1 | -42 | 38.40 | -37 | | | | | | | | |
| 13.10 | | | -2 | -44 | 39.70° | -117 | | | | | | | | |
| 13.46° | 3 | 56 | 1 | -43 | 37.50° | 16 | 0 | | 1 | 30 | 0 | 36.85 | -40 | -0.65 |
| 13.85° | | | -2 | -45 | 38.75° | -120 | | | | | | | | |
| 13.92° | 2 | 58 | | | 37.80° | -60 | | | | | | | | |
| 14.30° | | | -2 | -47 | 39.00 | -140 | | | | | | | | |
| 14.68° | 3 | 61 | 1 | -46 | 37.00 | -10 | | | | | | | | |
| 15.05° | | | -2 | -48 | 38.20 | -90 | | | | | | | | |
| 15.40° | | | 1 | -47 | 37.60 | -50 | | | | | | | | |
| 15.50° | 2 | 63 | | | 36.70° | 10 | 0 | | 1 | 29 | 29 | 35.90° | -53 | -0.80 |
| 15.90° | | | -2 | -49 | 37.85° | -133 | | | | | | | | |
| 16.23° | 3 | 66 | 1 | -48 | 36.00° | -6 | | | | | | | | |
| 16.60° | | | -2 | -50 | 37.10° | -86 | | | | | | | | |

Ⓔ HERE $Y_3$ = PROG $Y_I$, START STAGE 2

Table III—Continued

| REF α₁ | ΔX_T | X_T | ΔY_T | Y_T | α_T | E_T | ΔX₃ | X₃ | ΔY₃ | Y₃ | E₃ | α₃ | E_T₃ | α₃-α_T |
|---|---|---|---|---|---|---|---|---|---|---|---|---|---|---|
| 17.00 | 3 | 69 | 1 | -49 | 35.38 | 41 | 1 | 41 | 0 |  | -12 | 35.21° | -8 | -0.27 |
| 17.10 | -1 | 68 | -3 | -52 | 37.40 | -160 |  |  |  |  |  |  |  |  |
| 17.43 | 3 | 71 | 1 | -51 | 35.65 | -32 |  |  |  |  |  |  |  |  |
| 17.80 | 3 | 74 | 1 | -50 | 34.00° | 96 | 0 |  | 1 | 28 | 16 |  | 22 |  |
|  |  |  |  |  |  |  | 1 | 42 | 0 |  | -26 | 33.70 | -28 | -0.30° |
| 18.19° |  |  | -2 | -52 | 35.10° | -112 |  |  |  |  |  |  |  |  |
| 18.30° | -1 | 73 |  |  | 35.45° | -140 |  |  |  |  |  |  |  |  |
| 18.65° | 3 | 76 | 1 | -51 | 33.84 | -14 |  |  |  |  |  |  |  |  |
| 19.00° |  |  | -2 | -53 | 34.90° | -98 |  |  |  |  |  |  |  |  |
| 19.40° | 3 | 79 | 1 | -52 | 33.35° | 28 | 0 |  | 1 | 27 | 1 | 32.70 | -51 | -0.65 |
| 19.50° | 2 | 81 |  |  | 32.70° | 3 | 1 | 43 | 0 |  | -42 | 32.10 | -49 | -0.6° |
| 19.85° |  |  | -2 | -54 | 33.70° | -135 |  |  |  |  |  |  |  |  |
| 20.2° | 3 | 84 | 1 | -53 | 32.22° | -11 |  |  |  |  |  |  |  |  |
| 20.55° | 3 | 87 | 1 | -52 | 30.85 | 113 | 0 |  | 1 | 26 | -16 |  | 26 |  |
|  |  |  |  |  |  |  | 0 |  | 1 | 25 | 9 | 30.17° | -61 | -0.68° |
| 20.70° | -1 | 86 |  |  | 31.20° | -86 |  |  |  |  |  |  |  |  |
| 21.05 |  |  | -2 | -54 | 32.10° | -172 |  |  |  |  |  |  |  |  |
| 21.40 | 3 | 89 | 1 | -53 | 30.78° | -54 |  |  |  |  |  |  |  |  |
| 21.60 | 2 | 91 |  |  | 30.20 | -4 |  |  |  |  |  |  |  |  |
| 21.90 |  |  | -2 | -55 | 31.15 | -90 |  |  |  |  |  |  |  |  |
| 22.28 |  |  | 1 | -54 | 30.70 | -47 |  |  |  |  |  |  |  |  |
| 22.60° | 3 | 94 | 1 | -53 | 29.45° | 71 | 1 | 44 | 0 |  | -35 |  | 18 |  |
|  |  |  |  |  |  |  | 0 |  | 1 | 24 | -11 | 28.60° | -76 | -0.85° |
| 22.80° | 2 | 96 |  |  | 28.90 | -28 |  |  |  |  |  |  |  |  |
| 23.10° |  |  | -2 | -55 | 29.80 | -116 |  |  |  |  |  |  |  |  |
| 23.45 | 3 | 99 | 1 | -54 | 28.60 | 0 |  |  |  |  |  |  |  |  |
| 23.63° | -1 | 98 |  |  | 28.85 | -24 |  |  |  |  |  |  |  |  |
| 23.95 | 3 | 101 | 1 | -53 | 27.69° | 92 | 0 |  | 1 | 23 | 12 | 27.58° | -9 | -0.11° |
| 24.31 | 3 | 104 | 1 | -52 | 26.55° | 104 | 1 | 45 | 0 |  | -33 |  | 52 |  |
|  |  |  |  |  |  |  | 0 |  | 1 | 22 | -11 | 26.03° | -52 | -0.52° |
| 24.50 | -1 | 103 | -3 | -55 | 28.10 | -209 |  |  |  |  |  |  |  |  |
| 24.82° |  |  | 1 | -54 | 27.65 | -164 |  |  |  |  |  |  |  |  |
| 25.19° | 3 | 106 | 1 | -53 | 26.55° | -53 |  |  |  |  |  |  |  |  |
| 25.31° | 2 | 108 |  |  | 26.13° | -9 |  |  |  |  |  |  |  |  |
| 25.68° | 3 | 111 | 1 | -52 | 25.10° | 102 | 0 |  | 1 | 21 | 10 | 25.00° | -9 | -0.10 |
| 26.05° |  |  | 1 | -51 | 24.65° | 36 | 1 | 46 | 0 |  | -36 | 24.50 | -15 | -0.15° |
| 26.21° | 2 | 113 |  |  | 24.30° | 27 | 0 |  | 1 | 20 | -16 | 23.50° | -86 | -0.80° |
| 26.55° | 3 | 116 | 1 | -50 | 23.30 | 20 | 0 |  | 1 | 19 | 3 | 22.41° | -96 | -0.89° |
| 26.90° |  |  | 1 | -49 | 22.88 | -50 |  |  |  |  |  |  |  |  |
| 27.05° | -1 | 115 | -3 | -52 | 24.32° | -207 |  |  |  |  |  |  |  |  |
| 27.4° | 3 | 118 | 1 | -51 | 23.36° | -104 |  |  |  |  |  |  |  |  |
| 27.7° |  |  | 1 | -50 | 22.95° | -58 |  |  |  |  |  |  |  |  |
| 27.92° | 2 | 120 |  |  | 22.60 | -20 |  |  |  |  |  |  |  |  |
| 28.28° | 3 | 123 | 1 | -49 | 21.71° | 83 | 1 | 47 | 0 |  | -44 |  | 34 |  |
|  |  |  |  |  |  |  | 0 |  | 1 | 18 | -26 | 20.92° | -89 | -0.79° |
| 28.60° |  |  | 1 | -48 | 21.30° | -42 |  |  |  |  |  |  |  |  |
| 28.8° | 2 | 125 |  |  | 21.00° | -6 |  |  |  |  |  |  |  |  |
| 29.1° | 3 | 128 | 1 | -47 | 20.15° | 95 | 0 |  | 1 | 17 | -9 | 19.85° | -33 | -0.30° |
| 29.45 |  |  | 1 | -46 | 19.75° | 14 | 0 |  | 1 | 16 | 7 | 18.80° | -114 | -0.45° |
| 29.6° | 2 | 130 |  |  | 19.48° | -82 |  |  |  |  |  |  |  |  |
| 29.96° |  |  | 1 | -45 | 19.08° | -35 |  |  |  |  |  |  |  |  |
| 30.30° | 3 | 133 | 1 | -44 | 18.30 | 60 | 1 | 48 | 0 |  | -41 |  | 16 |  |
|  |  |  |  |  |  |  | 0 |  | 1 | 15 | -26 | 17.35° | -117 | -0.95° |
| 30.5° | 2 | 135 |  |  | 18.05° | -87 |  |  |  |  |  |  |  |  |
| 30.80 |  |  | 1 | -43 | 17.65° | -39 |  |  |  |  |  |  |  |  |
| 31.00° | 2 | 137 |  |  | 17.41° | -9 |  |  |  |  |  |  |  |  |
| 31.30 |  |  | 1 | -42 | 17.05 | 39 | 0 |  | 1 | 14 | -12 | 16.25° | -78 | -0.80° |
| 31.65° | 3 | 140 | 1 | -41 | 16.32° | -8 |  |  |  |  |  |  |  |  |

③ CIRCLE R_Z AXIS CROSSING

Table III—Continued

| $d_1$ | $\Delta X_T$ | $X_T$ | $\Delta Y_T$ | $Y_T$ | $d_T$ | $E_T$ | $\Delta X_3$ | $X_3$ | $\Delta Y_3$ | $Y_3$ | $E_3$ | $d_3$ | $E_{T_3}$ | $d_3-d_T$ |
|---|---|---|---|---|---|---|---|---|---|---|---|---|---|---|
| 31.02° | 2 | 142 | | | 16.10 | 20 | 0 | | 1 | 13 | 1 | 15.15° | -122 | -0.95° |
| 32.20° | | | 1 | -40 | 15.72 | -74 | | | | | | | | |
| 32.50° | 3 | 145 | 1 | -39 | 15.05 | 13 | 1 | 49 | 0 | | -48 | 14.85° | -26 | -0.20° |
| 32.70° | -1 | 144 | 3 | -36 | 14.03 | 108 | 0 | | 1 | 12 | -36 | 13.73° | -36 | -0.30° |
| 33.00° | | | 1 | -35 | 13.65 | 13 | 0 | | 1 | 11 | -25 | 12.65° | -131 | -1.00° |
| 33.22 | 2 | 146 | | | 13.48 | -109 | | | | | | | | |
| 33.50° | 3 | 149 | 1 | -34 | 12.85° | -27 | | | | | | | | |
| 33.90° | | | 1 | -33 | 12.44° | 22 | 0 | | 1 | 10 | -15 | 11.52° | -127 | -0.97° |
| 34.10° | 2 | 151 | | | 12.31° | -107 | | | | | | | | |
| 34.4° | 3 | 154 | 1 | -32 | 11.73° | -28 | | | | | | | | |
| 34.6° | -1 | 153 | | | 11.81° | -38 | | | | | | | | |
| 34.9° | 3 | 156 | 1 | -31 | 11.22° | 41 | 0 | | 1 | 9 | -6 | 10.40° | -115 | -0.85° |
| 35.21° | | | 4 | -27 | 9.80° | 81 | 0 | | 1 | 8 | 2 | 9.26° | -75 | -0.54° |
| 35.45° | 2 | 158 | | | 9.69° | -59 | | | | | | | | |
| 35.80° | | | 1 | -26 | 9.34° | -10 | | | | | | | | |
| 36.00° | 2 | 160 | | | 9.22° | 6 | 1 | 50 | 0 | | -48 | 9.09° | -20 | -0.13° |
| 36.30° | 3 | 163 | 1 | -25 | 8.71° | 54 | 0 | | 1 | 7 | -41 | 7.96° | -109 | -0.75° |
| 36.65° | -1 | 162 | | | 8.77° | -116 | | | | | | | | |
| 36.85° | | | 4 | -21 | 7.38° | +84 | 0 | | 1 | 6 | -35 | 6.84° | -78 | -0.54° |
| 37.15° | 3 | 165 | 1 | -20 | 6.90° | -10 | | | | | | | | |
| 37.40° | 2 | 167 | | | 6.85° | 2 | 0 | | 1 | 5 | -30 | 5.78° | -165 | -1.11° |
| 37.70° | | | 1 | -19 | 6.49° | -115 | | | | | | | | |
| 37.90° | -1 | 166 | 3 | -16 | 5.52° | 30 | 0 | | 1 | 4 | -26 | 4.58° | -136 | -0.94° |
| 38.20 | 3 | 169 | 1 | -15 | 5.07° | -74 | | | | | | | | |
| 38.42° | 2 | 171 | | | 5.02° | -66 | | | | | | | | |
| 38.76° | | | 1 | -14 | 4.69° | -16 | | | | | | | | |
| 39.00° | -1 | 170 | 3 | -11 | 3.705° | 130 | 0 | | 1 | 3 | -26 | 3.435° | -40 | -0.27° |
| 39.30° | 3 | 173 | 1 | -10 | 3.310° | 19 | 0 | | 1 | 2 | -21 | 2.180° | -154 | -0.13° |
| 39.60° | 3 | 176 | 1 | -9 | 2.925° | -98 | | | | | | | | |
| 39.82° | -1 | 175 | 3 | -6 | 1.962° | 50 | 0 | | 1 | 1 | -20 | 1.145° | -125 | -0.817° |
| 40.10° | | | 1 | -5 | 1.638° | -75 | | | | | | | | |
| 40.4° | 2 | 177 | | | 1.619° | -73 | | | | | | | | |
| 40.65° | 3 | 180 | 1 | -4 | 1.27° | -20 | | | | | | | | |
| 40.90° | -1 | 179 | 3 | -1 | 0.320° | 129 | 0 | | 1 | 0 | -20 | 0.00° | -50 | -0.32° |
| 41.20° | | | 1 | 0 | 0.00° | 0 | | | | | | | | |
| | | | | | | | | | | | 25 | | | ④ |
| 41.45° | 2 | 181 | 0 | | 0.00° | 0 | | | | | | | | |
| 41.75° | | | 4 | 4 | 1.365° | -200 | 0 | | 1 | 1 | 24 | | -19 | |
| | | | | | | | 0 | | 1 | 2 | 22 | 2.29° | 162 | +1.025° |
| 42.00° | 2 | 183 | | | 1.250° | 166 | | | | | | | | |
| 42.30° | 3 | 186 | 1 | 5 | 1.540° | 122 | | | | | | | | |
| 42.50° | -1 | 185 | | | 1.545° | 120 | | | | | | | | |
| 42.80° | | | 4 | 9 | 2.785° | -80 | 0 | | 1 | 3 | 19 | 3.43° | 105 | +0.64° |
| 43.10° | 3 | 188 | 1 | 10 | 3.045° | 64 | | | | | | | | |
| 43.35° | -1 | 187 | 3 | 13 | 3.98° | -89 | 0 | | 1 | 4 | 15 | 4.58° | 98 | 0.60° |
| 43.65° | 3 | 190 | 1 | 14 | 4.22° | 60 | | | | | | | | |
| 43.90° | -1 | 189 | | | 4.24° | 56 | | | | | | | | |
| 44.20 | | | 4 | 18 | 5.445 | -144 | 0 | | 1 | 5 | 10 | 5.72° | 45 | 0.27° |
| 44.42 | 2 | 191 | | | 5.39° | 55 | | | | | | | | |
| 44.70 | | | 4 | 22 | 6.57° | -145 | 0 | | 1 | 6 | 4 | 6.84° | 46 | 0.27° |
| 45.00° | 2 | 193 | | | 6.50° | 58 | | | | | | | | |
| 45.30° | | | 1 | 23 | 6.80° | 8 | | | | | | | | |
| 45.55° | -1 | 192 | 3 | 26 | 7.71° | -148 | 0 | | 1 | 7 | -3 | 7.96° | 44 | 0.25° |
| 45.80° | 3 | 195 | 1 | 27 | 7.88° | 15 | | | | | | | | |
| 46.10° | -1 | 194 | 3 | 30 | 8.00° | -142 | 1 | 49 | 0 | | 46 | | -112 | |
| | | | | | | | 0 | | 1 | 8 | 38 | 9.26° | 82 | 0.46° |
| 46.40° | 3 | 197 | 1 | 31 | 8.94 | 57 | | | | | | | | |
| 46.65° | -1 | 196 | | | 8.98° | 49 | | | | | | | | |

④ HERE $Y_T=0$, START STAGE-3

Table III — Continued

| REF α₁ | ΔX_T | X_T | ΔY_T | Y_T | d_T | θ_T | | X_η | | η | e_η | d_η | θ_η | d_η-d_T |
|---|---|---|---|---|---|---|---|---|---|---|---|---|---|---|
| 46.90° | | | 4 | 35 | 10.12° | -147 | 0 | | 1 | 9 | 89 | 10.08 | 29 | 0.23° |
| 47.30° | 2 | 198 | | | 10.05° | 67 | | | | | | | | |
| 47.45° | -1 | 197 | 3 | 38 | 10.91° | -89 | 0 | | 1 | 10 | 19 | 11.81° | 108 | 0.02° |
| 47.70° | | | 4 | 42 | 12.10° | -68 | 0 | | 1 | 11 | 8 | 12.65° | 109 | 0.50° |
| 48.0° | -1 | 196 | | | 12.05° | 98 | | | | | | | | |
| 48.22° | 3 | 199 | 1 | 48 | 12.19° | 62 | | | | | | | | |
| 48.60° | -1 | 198 | 3 | 46 | 12.85° | -76 | 0 | | 1 | 12 | -4 | 13.75° | 122 | 0.30° |
| 48.85° | 3 | 201 | 1 | 47 | 13.14° | 109 | | | | | | | | |
| 49.10° | -1 | 200 | | | 13.81° | 97 | | | | | | | | |
| 49.35° | | | 4 | 51 | 14.30° | -99 | 1 | 48 | 0 | | 44 | | | -26 | |
| | | | | | | | 0 | | 1 | 13 | 31 | 16.0° | 152 | 0.22° |
| 49.60° | -1 | 199 | 3 | 54 | 15.10° | -5 | 0 | | 1 | 14 | 17 | 16.25° | 194 | 1.17° |
| 49.90° | 3 | 202 | 1 | 55 | 15.22° | 108 | | | | | | | | |
| 50.15 | -1 | 201 | 3 | 58 | 16.10° | 30 | | | | | | | | |
| 50.40 | | | 1 | 59 | 16.35° | -18 | 0 | | 1 | 15 | 8 | 17.85° | 168 | 0.50° |
| 50.70 | -1 | 200 | 3 | 62 | 17.25° | 84 | | | | | | | | |
| 51.00 | 2 | 202 | | | 17.05° | 84 | | | | | | | | |
| 51.20 | | | 4 | 66 | 18.10° | -130 | 0 | | 1 | 16 | -14 | 18.42° | 64 | 0.32° |
| 51.5 | -1 | 201 | | | 18.18° | 48 | | | | | | | | |
| 51.8 | | | 4 | 70 | 19.20° | -144 | 1 | 47 | 0 | | 33 | | | -74 | |
| | | | | | | | 0 | | 1 | 17 | 16 | 19.91 | 127 | 0.71° |
| 52.05 | 2 | 203 | | | 19.00 | 161 | | | | | | | | |
| 52.30 | | | 4 | 74 | 20.01 | -27 | 0 | | 1 | 18 | -2 | 20.95 | 176 | 0.94° |
| 52.60 | -1 | 202 | | | 20.12 | 158 | | | | | | | | |
| 52.85 | | | 4 | 78 | 21.10 | -30 | 1 | 46 | 0 | | 44 | 21.35 | 48 | 0.25° |
| 53.15 | 2 | 204 | | | 20.90 | 84 | | | | | | | | |
| 53.45° | -1 | 203 | 3 | 81 | 21.75° | -72 | 0 | | 1 | 19 | 25 | 22.42 | 131 | 0.67° |
| 53.70° | | | 1 | 82 | 22.00 | 85 | | | | | | | | |
| 54.00° | -1 | 202 | 3 | 85 | 22.81 | -72 | 0 | | 1 | 20 | 5 | 23.49 | 190 | 0.68° |
| 54.20 | | | 4 | 89 | 23.76 | -54 | 0 | | 1 | 21 | -16 | 24.55 | 198 | 0.77° |
| 54.50° | -1 | 201 | | | 23.80 | 127 | | | | | | | | |
| 54.75° | 3 | 204 | 1 | 90 | 23.80 | 144 | | | | | | | | |
| 55.05° | -1 | 203 | 3 | 93 | 24.60 | -15 | 1 | 45 | 0 | | 29 | 25.00 | 78 | 0.40° |
| 55.40° | -1 | 202 | 3 | 96 | 25.41 | -78 | 0 | | 1 | 22 | 7 | 26.05 | 134 | 0.64° |
| 55.60 | | | 1 | 97 | 25.63 | 79 | | | | | | | | |
| 55.90° | -1 | 201 | 3 | 100 | 26.40 | -78 | 0 | | 1 | 23 | -16 | 27.05 | 123 | 0.75° |
| 56.1° | | | 4 | 104 | 27.35 | -57 | 1 | 44 | 0 | | 28 | 27.59 | 47 | 0.24° |
| 56.45° | -1 | 200 | | | 27.46 | 84 | | | | | | | | |
| 56.75° | -1 | 199 | 3 | 107 | 28.25° | -131 | 0 | | 1 | 24 | 4 | 28.60 | 68 | 0.35° |
| 56.95° | 3 | 202 | 1 | 108 | 28.11° | 96 | | | | | | | | |
| 57.3° | -1 | 201 | | | 28.21° | 72 | | | | | | | | |
| 57.5° | | | 4 | 112 | 29.10° | -104 | 0 | | 1 | 25 | -21 | 29.59 | 97 | 0.49° |
| 57.8° | -1 | 200 | 3 | 115 | 29.85° | -60 | 1 | 43 | 0 | | 22 | 30.2° | 55 | 0.32° |
| 58.15° | -1 | 199 | | | 30.00° | 30 | | | | | | | | |
| 58.35° | | | 4 | 119 | 30.84 | -142 | 0 | | 1 | 26 | -4 | 31.1° | 57 | 0.26° |
| 58.70° | -1 | 198 | 3 | 122 | 31.61° | -98 | 1 | 42 | 0 | | 38 | 31.72° | 24 | 0.11° |
| 59.0° | -1 | 197 | | | 31.78 | -2 | 0 | | 1 | 27 | 11 | 32.70° | 195 | 0.92° |
| 59.2° | | | 4 | 126 | 32.60 | 27 | | | | | | | | |
| 59.5° | -1 | 196 | | | 32.70 | 0 | | | | | | | | |
| 59.70 | | | 4 | 130 | 33.50° | -168 | 0 | | 1 | 28 | -17 | 33.65 | 28 | 0.15° |
| 60.05 | -1 | 195 | 3 | 133 | 34.25° | -126 | 1 | 41 | 0 | | 24 | 34.30 | 7 | 0.05° |
| 60.35 | -1 | 194 | | | 34.40 | -21 | 0 | | 1 | 29 | -5 | 35.25° | 173 | 0.85° |
| 60.55 | | | 4 | 137 | 35.20 | 9 | | | | | | | | |
| 60.85 | -1 | 193 | | | 35.33° | -20 | 1 | 40 | 0 | | 35 | 35.92 | 117 | 0.59° |
| 61.20° | -1 | 192 | 3 | 140 | 36.10° | -32 | 0 | | 1 | 30 | 5 | 36.81° | 160 | 0.71° |
| 61.40 | | | 4 | 144 | 36.81° | 0 | | | | | | | | |
| 61.72° | -1 | 191 | | | 37.00° | -30 | 0 | | 1 | 31 | -26 | 37.80 | 161 | 0.80° |
| 62.05° | -1 | 190 | 3 | 147 | 37.70° | 10 | | | | | | | | |

⑤ CIRCLE R₂ AXIS CROSSING

Table III – Continued

| REF $d_1$ | $\Delta X_T$ | $X_T$ | $\Delta Y_T$ | $Y_T$ | $d_T$ | $E_T$ | $\Delta X_3$ | $X_3$ | $\Delta Y_3$ | $Y_3$ | $d_3$ | $E_{T3}$ | $d_3-d_T$ |
|---|---|---|---|---|---|---|---|---|---|---|---|---|---|
| 62.25° | | | 4 | 151 | 38.45° | -150 | 1 | 39 | 0 | | 13 | 38.45° | 1 | 0.00° |
| 62.60° | -1 | 189 | | | 38.65° | -30 | 0 | | 1 | 32 | -19 | 39.35° | 159 | 0.74° |
| 62.98° | -4 | 185 | | | 39.20° | 31 | | | | | | | | |
| 63.10° | | | 4 | 155 | 39.90° | -125 | 1 | 38 | 0 | | 19 | 40.05° | 30 | 0.15° |
| 63.45° | -1 | 184 | | | 40.10° | -2 | 0 | | 1 | 33 | -14 | 40.97° | 182 | 0.87° |
| 63.79° | -1 | 183 | | | 40.80° | 35 | | | | | | | | |
| 63.95° | | | 4 | 162 | 41.50° | -117 | 1 | 37 | 0 | | 23 | 41.70° | 45 | 0.20° |
| 64.30° | -1 | 182 | | | 41.65° | 12 | | | | | | | | |
| 64.67° | -1 | 181 | 3 | 165 | 42.30° | -132 | 0 | | 1 | 34 | -11 | 42.58° | 49 | 0.28° |
| 64.81° | | | 4 | 169 | 43.02° | -99 | 1 | 36 | 0 | | 25 | 43.36° | 70 | 0.34° |
| 65.15° | -4 | 177 | | | 43.65° | -66 | 0 | | 1 | 35 | -10 | 44.19 | 111 | 0.54° |
| 65.50° | -1 | 176 | | | 43.80 | 76 | | | | | | | | |
| 65.67° | | | 4 | 173 | 44.50 | -68 | 1 | 35 | 0 | | 25 | 45.00° | 105 | 0.50° |
| 66.0° | -1 | 175 | 3 | 176 | 45.20° | -35 | 0 | | 1 | 36 | -11 | 45.81 | 140 | 0.61° |
| 66.37° | -1 | 174 | 3 | 179 | 45.81° | -1 | 1 | 34 | 0 | | 23 | 46.64° | 178 | 0.83° |
| 66.5° | | | 1 | 180 | 46.00° | 144 | | | | | | | | |
| 66.87° | -4 | 170 | | | 46.64 | 0 | | | | | | | | |
| 67.2° | -1 | 169 | 3 | 183 | 47.30° | -138 | 0 | | 1 | 37 | -14 | 47.42° | 31 | 0.12° |
| 67.35° | | | 4 | 187 | 47.90° | -105 | 1 | 33 | 0 | | 19 | 48.27° | 82 | 0.63° |
| 67.72° | -4 | 165 | | | 48.60° | -66 | 0 | | 1 | 38 | -19 | 49.05° | 99 | 0.45° |
| 68.09° | -1 | 164 | | | 48.80 | 61 | | | | | | | | |
| 68.40° | -1 | 163 | 3 | 190 | 49.40 | -76 | 1 | 32 | 0 | | 13 | 49.90° | 114 | 0.50° |
| 68.55° | | | 4 | 194 | 50.00° | -14 | 0 | | 1 | 39 | -26 | 50.63° | 149 | 0.63° |
| 68.90° | -4 | 159 | | | 50.70° | -7 | 1 | 31 | 0 | | 5 | 51.52° | 187 | 0.82° |
| 69.30° | -1 | 158 | 3 | 197 | 51.30° | 55 | | | | | | | | |
| 69.40 | | | 1 | 198 | 51.42° | 24 | | | | | | | | |
| 69.77° | -1 | 157 | 3 | 201 | 52.01° | -108 | 0 | | 1 | 40 | -35 | 52.22° | 49 | 0.21° |
| 70.12° | -4 | 153 | | | 52.70 | -111 | 1 | 30 | 0 | | -5 | 53.13° | 90 | 0.43° |
| 70.50° | -1 | 152 | 3 | 204 | 53.3° | -40 | 1 | 29 | 0 | | 24 | 54.06° | 164 | 0.76° |
| 70.61° | | | 4 | 208 | 53.83° | 48 | | | | | | | | |
| 70.98° | -4 | 148 | | | 54.59° | -112 | 0 | | 1 | 41 | -17 | 54.73° | 36 | 0.14° |
| 71.32° | -1 | 147 | 3 | 211 | 55.20° | -92 | 1 | 28 | 0 | | 11 | 55.67° | 119 | 0.47° |
| 71.69° | -1 | 146 | | | 55.35° | 78 | | | | | | | | |
| 71.81° | -3 | 143 | 1 | 212 | 56.00° | -73 | 0 | | 1 | 42 | -31 | 56.31° | 70 | 0.31° |
| 72.18° | -1 | 142 | 3 | 215 | 56.60 | -56 | 1 | 27 | 0 | | -4 | 57.27° | 159 | 0.67° |
| 72.55° | -1 | 141 | 3 | 218 | 57.10 | 36 | | | | | | | | |
| 72.90° | -4 | 137 | | | 57.90° | -132 | 1 | 26 | 0 | | 22 | 58.24° | 86 | 0.34° |
| 73.0° | | | 4 | 222 | 58.38° | -18 | 0 | | 1 | 43 | -21 | 58.84° | 119 | 0.46° |
| 73.39° | -4 | 133 | | | 59.10° | -53 | 1 | 25 | 0 | | 4 | 59.83° | 169 | 0.73° |
| 73.75° | -1 | 132 | 3 | 225 | 59.60 | 51 | | | | | | | | |
| 74.10° | -4 | 128 | | | 60.37° | -121 | 0 | | 1 | 44 | -40 | 60.40° | 7 | 0.03° |
| 74.50° | -1 | 127 | 3 | 228 | 60.90° | -112 | 1 | 24 | 0 | | -16 | 61.39° | 116 | 0.49° |
| 74.60° | -3 | 124 | 1 | 229 | 61.60° | -40 | 1 | 23 | 0 | | 7 | 62.40 | 189 | 0.80° |
| 74.95° | -1 | 123 | | | 61.80 | 145 | | | | | | | | |
| 75.33° | -1 | 122 | 3 | 232 | 62.29 | 32 | | | | | | | | |
| 75.70° | -4 | 118 | | | 63.05° | -144 | 0 | | 1 | 45 | -38 | | -26 | |
| | | | | | | | 1 | 22 | 0 | | -16 | 63.95° | 206 | 0.90° |
| 76.08° | -1 | 117 | 3 | 235 | 63.55° | 35 | | | | | | | | |
| 76.16° | -3 | 114 | 1 | 236 | 64.25° | -62 | 1 | 21 | 0 | | 5 | 64.98° | 174 | 0.73° |
| 76.52° | -1 | 113 | 3 | 239 | 64.71° | 66 | | | | | | | | |
| 76.90° | -4 | 109 | | | 65.52° | -114 | 0 | | 1 | 46 | -41 | | -5 | |
| | | | | | | | 1 | 20 | 0 | | -21 | 66.50° | 234 | 0.98° |
| 77.29° | -1 | 108 | 3 | 242 | 65.99° | 128 | | | | | | | | |
| 77.63° | -4 | 104 | | | 66.75° | -56 | 1 | 19 | 0 | | -2 | 67.56° | 186 | 0.81° |
| 77.72° | -3 | 101 | 1 | 243 | 67.35° | 29 | | | | | | | | |
| 78.10° | -1 | 100 | 3 | 246 | 67.89° | -74 | 1 | 18 | 0 | | 16 | | 172 | |
| 78.49° | -4 | 96 | | | 68.70 | -12 | 0 | | 1 | 47 | -31 | 69.04° | 64 | 0.34° |
| 78.85° | -1 | 95 | 3 | 249 | 69.12° | -17 | 1 | 17 | 0 | | -14 | 70.12° | 232 | 1.00° |

Table III – Continued

| REF $\alpha_1$ | $\Delta X_T$ | $X_T$ | $\Delta Y_T$ | $Y_T$ | $\alpha_T$ | $\epsilon_T$ | $\Delta X_3$ | $X_3$ | $\Delta Y_3$ | $Y_3$ | $\epsilon_3$ | $\alpha_3$ | $\epsilon_{T_3}$ | $\alpha_3 - \alpha_T$ |
|---|---|---|---|---|---|---|---|---|---|---|---|---|---|---|
| 79.60° | -4 | 87 | | | 70.78 | -144 | 1 | 16 | 0 | | 2 | 71.20° | 105 | 0.42° |
| 79.67° | | | 1 | 250 | 70.83° | 89 | | | | | | | | |
| 80.05 | -1 | 86 | 3 | 253 | 71.25 | -6 | 0 | | 1 | 48 | -46 | 71.57° | 80 | 0.32° |
| 80.42° | -4 | 82 | | | 72.05° | -112 | 1 | 15 | 0 | | -31 | | 141 | |
| 80.80° | -4 | 78 | | | 72.89° | -51 | 1 | 14 | 0 | | -17 | 73.74° | 202 | 0.85° |
| 81.18° | -1 | 77 | 3 | 256 | 73.29° | 112 | | | | | | | | |
| 81.55° | -4 | 73 | | | 74.10° | -80 | 1 | 13 | 0 | | -4 | 74.85° | 176 | 0.75° |
| 81.93° | -4 | 69 | | | 74.92° | -16 | 1 | 12 | 0 | | 8 | 75.96 | 240 | 1.04° |
| 81.98° | | | 4 | 260 | 75.15° | 192 | | | | | | | | |
| 82.36° | -4 | 65 | | | 75.97° | 0 | | | | | | | | |
| 82.74° | -4 | 61 | | | 76.80° | -192 | 0 | | 1 | 49 | -41 | | -131 | |
| | | | | | | | 1 | 11 | 0 | | -30 | 77.35° | 129 | 0.55° |
| 83.12° | -1 | 60 | 3 | 263 | 77.17° | 47 | | | | | | | | |
| 83.50° | -4 | 56 | | | 77.99° | -149 | 1 | 10 | 0 | | -20 | | 114 | |
| 83.78° | -4 | 52 | | | 78.83° | -82 | 1 | 9 | 0 | | -11 | | 181 | |
| 84.25° | -4 | 48 | | | 79.66° | -15 | 1 | 8 | 0 | | -3 | | 248 | |
| 84.62° | -1 | 47 | | | 79.86° | 199 | | | | | | | | |
| 85.00° | -1 | 46 | 3 | 266 | 80.17° | 126 | | | | | | | | |
| 85.39° | -4 | 42 | | | 81.04° | -70 | 1 | 7 | 0 | | 4 | 81.87° | 196 | 0.83° |
| 85.42° | -3 | 39 | 1 | 267 | 81.69° | 42 | | | | | | | | |
| 85.80° | -4 | 35 | | | 82.54° | -154 | 0 | | 1 | 50 | -46 | | -119 | |
| | | | | | | | 1 | 6 | 0 | | -40 | 83.16 | 140 | 0.85° |
| 86.18° | -4 | 31 | | | 83.36° | -52 | 1 | 5 | 0 | | -35 | | 215 | |
| 86.56° | -4 | 27 | | | 84.24° | 15 | | | | | | | | |
| 86.95° | -1 | 26 | 3 | 270 | 84.49° | -50 | 1 | 4 | 0 | | -31 | 85.48° | 220 | 0.99° |
| 87.33° | -4 | 22 | | | 85.35° | 20 | | | | | | | | |
| 87.71° | -1 | 21 | | | 85.55° | -30 | 1 | 3 | 0 | | -28 | 86.57° | 240 | 1.08° |
| 88.09° | -4 | 17 | | | 86.40° | 40 | | | | | | | | |
| 88.47° | -4 | 13 | | | 87.24° | -160 | 1 | 2 | 0 | | -26 | 87.71° | 110 | 0.47° |
| 88.85° | -4 | 9 | | | 88.09° | -90 | 1 | 1 | 0 | | -25 | 88.85° | 180 | 0.76° |
| 89.23° | -4 | 5 | | | 88.94° | -20 | 1 | 0 | 0 | | -25 | 90.00° | 250 | 1.06° |
| 89.61° | -4 | 1 | | | 89.47° | 50 | | | | | | | | |
| 90.00° | -1 | 0 | | | 90.00 | 0 | | | | | | | | 0.00° |

TABLE IV

| REF $\alpha_1$ | GENERATED | | | | | | COMPUTED | | | | | | | ERROR | |
|---|---|---|---|---|---|---|---|---|---|---|---|---|---|---|---|
| | $X_S$ | $X_3$ | $X_C$ | $Y_S$ | $Y_3$ | $Y_C$ | $\alpha_T$ | $X_S$ | $X_3$ | $X_C$ | $Y_S$ | $Y_3$ | $Y_C$ | $\epsilon_X$ | $\epsilon_Y$ |
| 0° | 110 | 50 | 60 | 0 | 0 | 0 | (-) | | | | | | | 0 | 0 |
| 0.38° | | | | 4 | 4 | | 2.6639° | 110.005 | 49.946 | 60.059 | 0.200 | 2.329 | 2.529 | 0.06 | -1.47 |
| 0.76° | | | | 7 | 7 | | 5.3158° | 110.019 | 49.785 | 60.234 | 0.400 | 4.632 | 5.032 | 0.23 | -1.97 |
| 1.143 | | 49 | 61 | 10 | 10 | | 7.8939 | 110.042 | 49.526 | 60.516 | 0.600 | 6.867 | 7.467 | -0.48 | -2.58 |
| 1.525 | | 48 | 62 | 13 | 13 | | 10.4242 | 110.074 | 49.175 | 60.899 | 0.801 | 9.047 | 9.848 | -1.10 | -3.15 |
| 1.91° | | | | | 16 | 16 | 12.0863 | 110.117 | 48.741 | 61.376 | 1.006 | 11.151 | 12.157 | -0.62 | -3.84 |
| 2.29° | | | | 1 | | 17 | 15.2140° | 110.167 | 48.248 | 61.919 | 1.209 | 13.121 | 14.330 | -0.08 | -3.93 |
| 2.675 | | 47 | 63 | | 18 | 19 | 17.4612° | 110.228 | 47.696 | 62.532 | 1.416 | 15.003 | 16.419 | -0.47 | -2.58 |
| 3.05 | 111 | | 64 | 2 | | 21 | 19.5199 | 110.297 | 47.263 | 63.034 | 1.620 | 16.707 | 18.327 | -0.97 | -2.67 |
| 3.43 | | | | | | | | | | | | | | | |
| 3.82 | | 46 | 65 | | 20 | 22 | 23.3631° | 110.444 | 45.901 | 64.563 | 2.046 | 19.828 | 21.874 | -0.44 | -0.18 |
| 4.20 | | 45 | 66 | | 22 | 24 | 25.0615° | 110.561 | 45.293 | 65.268 | 2.260 | 21.180 | 23.440 | -0.73 | 1.44 |
| 4.58 | | 44 | 67 | | 24 | 26 | 26.6301° | 110.666 | 44.696 | 65.970 | 2.477 | 22.411 | 24.888 | -1.03 | -1.11 |
| 4.61 | | | | | | | | | | | | | | | |

Table IV – Continued

| REF | GENERATED | | | | | | COMPUTED | | | | | | | ERROR | |
|---|---|---|---|---|---|---|---|---|---|---|---|---|---|---|---|
| $\alpha_i$ | $X_S$ | $X_3$ | $X_C$ | $Y_S$ | $Y_3$ | $Y_C$ | $\alpha_T$ | $X_S$ | $X_3$ | $X_C$ | $Y_S$ | $Y_3$ | $Y_C$ | $E_X$ | $E_Y$ |
| 4.99 | 42 | 69 | | 28 | 30 | 28.1008 | 110.787 | 44.073 | 66.716 | 2.715 | 23.613 | 26.328 | -2.28 | -3.67 |
| 5.38 | | | 3 | | 31 | 29.5240 | 110.916 | 43.507 | 67.409 | 2.945 | 24.639 | 27.584 | -1.59 | -3.48 |
| 5.15 | | | | | | | | | | | | | | | |
| 6.30 | | | | | | | | | | | | | | | |
| 6.50 | 40 | 71 | | 29 | 32 | 32.7191 | 111.330 | 42.067 | 69.263 | 3.628 | 27.026 | 30.654 | -1.74 | -1.35 |
| 6.88 | 112 | 72 | 4 | | 33 | 33.5990 | 111.507 | 41.697 | 69.840 | 3.869 | 27.669 | 31.538 | -2.16 | -1.46 |
| 7.25 | | | | | | | | | | | | | | | |
| 7.64 | | | | 30 | 34 | 35.0041 | 111.826 | 40.915 | 70.911 | 4.364 | 28.789 | 33.103 | -1.09 | -0.90 |
| 8.04 | 113 | 73 | 5 | | 35 | 35.6667 | 112.003 | 40.621 | 71.388 | 4.613 | 29.163 | 33.766 | -1.62 | -1.23 |
| 8.07 | | | | | | | | | | | | | | | |
| 8.45 | | | | | | | | | | | | | | | |
| 8.82 | 39 | 74 | | 32 | 37 | 36.7543 | 112.416 | 40.060 | 72.356 | 5.177 | 29.919 | 35.096 | -1.64 | -1.90 |
| 9.20 | | | | | | | | | | | | | | | |
| 9.57 | | | | | | | | | | | | | | | |
| 9.95 | 114 | 75 | 6 | | 38 | 37.7509 | 113.051 | 39.534 | 73.517 | 6.009 | 30.611 | 36.620 | -1.48 | -1.38 |
| 10.31 | | | 7 | | 39 | 37.9635 | 113.266 | 39.420 | 73.846 | 6.286 | 30.758 | 37.044 | -1.15 | -1.96 |
| 10.40 | | | | | | | | | | | | | | | |
| 10.78 | | | | | | | | | | | | | | | -2.04 |
| 11.15 | 38 | 76 | | 33 | 40 | 38.2006 | 113.794 | 39.245 | 74.549 | 6.958 | 30.981 | 37.939 | -1.45 | |
| 11.50 | | | | | | | | | | | | | | | |
| 11.90 | 115 | 77 | 8 | | 41 | 38.3263 | 114.293 | 39.186 | 75.108 | 7.589 | 31.057 | 38.646 | -1.89 | -2.35 |
| 12.25 | 40 | 75 | | 31 | 39 | 38.3991 | 114.535 | 39.186 | 75.350 | 7.894 | 31.057 | 38.951 | 0.35 | -0.05 |
| 12.37 | | | | | | | | | | | | | | | |
| 12.71 | | | | | | | | | | | | | | | |
| 13.10 | | | | | | | | | | | | | | | |
| 13.46 | 116 | | 76 | 9 | 30 | 39 | 38.1775 | 115.409 | 39.305 | 76.104 | 9.001 | 30.905 | 39.906 | 0.10 | 0.91 |
| 13.86 | | | | | | | | | | | | | | | |
| 13.92 | | | | | | | | | | | | | | | |
| 14.30 | | | | | | | | | | | | | | | 0.75 |
| 14.68 | 117 | 77 | 10 | | 40 | 37.6566 | 116.349 | 39.584 | 76.765 | 10.207 | 30.546 | 40.753 | -0.24 | |
| 15.05 | | | | | | | | | | | | | | | |
| 15.40 | | | | 11 | | 41 | 37.2515 | 116.929 | 39.810 | 77.119 | 10.963 | 30.252 | 41.215 | 0.12 | 0.22 |
| 15.50 | | | | | 29 | 40 | 37.1663 | 117.010 | 39.844 | 77.166 | 11.071 | 30.207 | 41.378 | 0.17 | 1.20 |
| 15.90 | | | | | | | | | | | | | | | |
| 16.23 | 118 | 78 | 12 | | 41 | 36.6481 | 117.647 | 40.116 | 77.501 | 11.878 | 29.846 | 41.723 | -0.60 | 0.72 |
| 16.60 | | | | | | | | | | | | | | | |
| 17.00 | 119 | 41 | 78 | 13 | | 42 | 36.0274 | 118.273 | 40.437 | 77.836 | 12.770 | 29.409 | 42.179 | -0.16 | 0.18 |
| 17.10 | | | | | | | | | | | | | | | |
| 17.43 | | | | | | | | | | | | | | | |
| 17.80 | 120 | 42 | 78 | 14 | 28 | 42 | 35.3108 | 118.970 | 40.801 | 78.169 | 13.742 | 28.901 | 42.643 | 0.17 | 0.64 |
| 18.17 | | | | | | | | | | | | | | | |
| 18.30 | | | | | | | | | | | | | | | |
| 18.65 | | | | 15 | | 43 | 34.4780 | 119.727 | 41.217 | 78.510 | 14.826 | 28.304 | 43.130 | 0.51 | 0.13 |
| 19.00 | | | | | | | | | | | | | | | 0.50 |
| 19.40 | 121 | | 79 | 16 | 27 | 43 | 33.6882 | 120.405 | 41.603 | 78.802 | 15.828 | 27.734 | 43.562 | -0.20 | |
| 19.50 | 43 | 78 | | | | 33.5798 | 120.496 | 41.656 | 78.840 | 15.965 | 27.655 | 43.626 | 0.84 | 0.62 |
| 19.85 | | | | | | | | | | | | | | | |
| 20.20 | 122 | | 79 | 17 | | 44 | 32.7962 | 121.138 | 42.030 | 79.108 | 16.946 | 27.083 | 44.029 | 0.11 | 0.03 |
| 20.55 | 123 | 80 | 18 | 25 | 43 | 32.3906 | 121.461 | 42.221 | 79.240 | 17.451 | 26.784 | 44.235 | -0.76 | 1.24 |
| 20.70 | | | | | | | | | | | | | | | |
| 21.05 | | | | | | | | | | | | | | | |
| 21.40 | | | | | | | | | | | | | | | |
| 21.60 | | | | | | | | | | | | | | | |
| 21.90 | | | | | | | | | | | | | | | 0.20 |
| 22.28 | | | | 20 | | 45 | 30.2671 | 123.069 | 43.184 | 79.885 | 20.094 | 25.202 | 45.296 | -0.12 | |
| 22.60 | 124 | 44 | 80 | 21 | 24 | 45 | 29.8546 | 123.368 | 43.365 | 80.003 | 20.609 | 24.890 | 45.499 | 0 | |
| 22.80 | | | | | | | | | | | | | | | 0.50 |
| 23.10 | | | | | | | | | | | | | | | |
| 23.45 | 125 | | 81 | 22 | | 46 | 28.7327 | 124.160 | 43.844 | 80.346 | 22.022 | 24.026 | 46.058 | -0.68 | 0.06 |
| 23.63 | | | | | | | | | | | | | | | |
| 23.95 | | | | 23 | 23 | 46 | 28.0558 | 124.625 | 44.124 | 80.501 | 22.801 | 23.517 | 46.328 | -0.50 | 0.40 |

Table IV – Continued

| REF | GENERATED | | | | | | COMPUTED | | | | | | | ERROR | |
|---|---|---|---|---|---|---|---|---|---|---|---|---|---|---|---|
| $\alpha_1$ | $X_s$ | $X_3$ | $X_c$ | $Y_s$ | $Y_3$ | $Y_c$ | $\alpha_T$ | $X_s$ | $X_3$ | $X_c$ | $Y_s$ | $Y_3$ | $Y_c$ | $E_x$ | $E_y$ |
| 24.31 | | | | | | | | | | | | | | | |
| 24.50 | | | | | | | | | | | | | | | |
| 24.82 | | | | | | | | | | | | | | | |
| 25.19° | 126 | 45 | 81 | 25 | 22 | 47 | 26.8387 | 125.767 | 44.813 | 80.756 | 25.105 | 22.176 | 47.281 | -0.05 | 0.28 |
| 25.31 | | | | | | | | | | | | | | | |
| 25.68 | 127 | | 82 | 26 | 21 | 47 | 25.6386 | 126.313 | 45.081 | 81.132 | 26.021 | 21.627 | 47.648 | -0.87 | 0.65 |
| 26.05 | | 46 | 81 | 27 | | 48 | 26.0938 | 126.548 | 45.281 | 81.267 | 26.726 | 21.205 | 47.931 | 0.27 | -0.07 |
| 26.21 | | | | | | | | | | | | | | | |
| 26.85 | 128 | | 82 | 28 | 19 | 47 | 24.9832 | 126.995 | 45.547 | 81.498 | 27.690 | 20.626 | 48.324 | -0.55 | 1.32 |
| 26.90 | | | | 29 | | 48 | 23.0066 | 127.305 | 45.732 | 81.021 | 28.391 | 20.214 | 48.605 | -0.98 | 0.61 |
| 27.05 | | | | | | | | | | | | | | | |
| 27.4 | | | | | | | | | | | | | | | |
| 27.7 | | | | 30 | | 49 | 22.6505 | 128.004 | 46.144 | 81.860 | 30.016 | 19.255 | 49.271 | -0.14 | 0.27 |
| 27.92 | | | | | | | | | | | | | | | |
| 28.28 | 129 | 47 | 82 | 31 | 18 | 49 | 21.7709 | 128.999 | 46.434 | 82.065 | 31.229 | 18.505 | 49.774 | 0.07 | 0.77 |
| 28.60 | | | | 32 | | 50 | 21.2813 | 128.768 | 46.590 | 83.178 | 31.911 | 18.147 | 50.058 | 0.18 | 0.06 |
| 28.80 | | | | | | | | | | | | | | | |
| 29.10 | 130 | | 83 | 33 | 17 | 50 | 20.6706 | 129.182 | 46.830 | 82.352 | 32.995 | 17.519 | 50.514 | -0.65 | 0.51 |
| 29.45 | | | | 34 | 16 | 60 | 19.9671 | 129.466 | 46.774 | 82.472 | 33.766 | 17.074 | 50.840 | -0.53 | 0.04 |
| 29.6 | | | | | | | | | | | | | | | |
| 29.96 | | | | 35 | | 51 | 19.1694 | 129.872 | 47.228 | 82.644 | 34.909 | 16.418 | 51.327 | -0.36 | 0.22 |
| 30.30 | 131 | 48 | 83 | 36 | 15 | 51 | 18.6341 | 130.153 | 47.379 | 82.774 | 35.684 | 15.976 | 51.660 | -0.85 | 0.66 |
| 30.5 | | | | | | | | | | | | | | | |
| 30.8 | | | | 37 | | 52 | 17.8418 | 130.319 | 47.595 | 82.924 | 36.842 | 15.313 | 52.161 | -0.08 | 0.16 |
| 31.00 | | | | | | | | | | | | | | | |
| 31.3 | | | | 38 | 14 | 52 | 17.0437 | 130.859 | 47.804 | 83.085 | 38.020 | 14.665 | 52.675 | 0.09 | 0.68 |
| 31.65 | 132 | | 84 | 39 | | 53 | 16.1818 | 131.192 | 47.945 | 83.197 | 38.859 | 14.186 | 52.845 | -0.80 | 0.05 |
| 31.82 | | | | | | | | | | | | | | | |
| 32.30 | | | | 40 | 13 | 53 | 15.9936 | 131.526 | 48.160 | 83.366 | 40.197 | 13.441 | 53.638 | -0.63 | 0.69 |
| 32.60 | 133 | 49 | 84 | 41 | | 54 | 15.1066 | 131.730 | 48.272 | 83.458 | 40.987 | 13.031 | 53.968 | -0.54 | -0.03 |
| 32.70 | | | | | | | | | | | | | | | |
| 33.00 | | | | 43 | 11 | 54 | 14.2709 | 132.058 | 48.453 | 83.605 | 42.188 | 12.342 | 54.530 | 0.61 | 0.53 |
| 33.22 | | | | | | | | | | | | | | | |
| 33.50 | 133 | | 84 | 44 | | 55 | 13.4706 | 132.372 | 48.624 | 83.748 | 43.460 | 11.647 | 55.107 | -0.25 | 0.11 |
| 33.70 | | | | 45 | 10 | 55 | 12.8111° | 132.613 | 48.755 | 83.858 | 44.493 | 11.087 | 55.580 | -0.14 | 0.58 |
| 34.1 | | | | | | | | | | | | | | | |
| 34.4 | 134 | | 85 | 46 | | 56 | 11.9628 | 132.901 | 48.911 | 83.990 | 45.802 | 10.381 | 56.183 | -1.01 | 0.18 |
| 34.6 | | | | | | | | | | | | | | | |
| 34.9 | | | | 47 | 9 | 56 | 11.1503 | 133.173 | 49.056 | 84.117 | 47.131 | 9.669 | 56.800 | -0.88 | 0.80 |
| 35.21 | | | | 49 | 8 | 57 | 10.6321 | 133.334 | 49.142 | 84.192 | 47.965 | 9.225 | 57.190 | -0.81 | 0.19 |
| 35.45 | | | | | | | | | | | | | | | |
| 35.80 | | | | 50 | | 58 | 9.6419 | 133.621 | 49.294 | 84.327 | 49.574 | 8.374 | 57.948 | -0.67 | -0.05 |
| 36.00 | | | | | | | | | | | | | | | |
| 36.30 | 135 | 50 | 85 | 51 | 7 | 58 | 8.7987° | 133.046 | 49.412 | 84.434 | 50.958 | 7.648 | 58.606 | -0.57 | 0.61 |
| 36.50 | | | | | | | | | | | | | | | |
| 36.85 | | | | 53 | 6 | 59 | 7.8670° | 134.078 | 49.529 | 84.543 | 52.504 | 6.843 | 59.347 | 0.54 | 0.35 |
| 37.15 | | | | 54 | | 60 | 7.3571 | 134.106 | 49.588 | 84.598 | 53.356 | 6.403 | 59.759 | -0.40 | 0.27 |
| 37.40 | | | | | | | | | | | | | | | |
| 37.70 | | | | 55 | 5 | 60 | 6.4192 | 134.377 | 49.687 | 84.690 | 54.936 | 5.590 | 60.526 | -0.31 | 0.53 |
| 37.90 | | | | | | | | | | | | | | | |
| 38.20 | | | | 57 | 4 | 61 | 5.5631° | 134.530 | 49.764 | 84.762 | 56.392 | 4.847 | 61.259 | -0.23 | 0.24 |
| 38.42 | | | | | | | | | | | | | | | |
| 38.78 | | | | 58 | | 62 | 4.5663° | 134.661 | 49.841 | 84.846 | 58.103 | 3.981 | 62.004 | -0.16 | 0.08 |
| 39.00 | | | | | | | | | | | | | | | |
| 39.30 | | | | 60 | 2 | 62 | 3.6693 | 134.793 | 49.898 | 84.895 | 59.657 | 3.200 | 62.857 | -0.11 | 0.86 |
| 39.60 | 136 | | 86 | 61 | | 63 | 3.1504° | 134.847 | 49.924 | 84.923 | 60.561 | 2.748 | 63.309 | -1.08 | 0.31 |
| 39.82 | | | | | | | | | | | | | | | |
| 40.10 | | | | 63 | 1 | 64 | 2.7033 | 134.919 | 49.960 | 84.959 | 62.083 | 1.992 | 64.075 | -0.04 | 0.08 |
| 40.4 | | | | | | | | | | | | | | | |
| 40.65 | | | | 64 | | 65 | 1.3265 | 134.973 | 49.987 | 84.986 | 63.775 | 1.157 | 64.932 | -1.01 | -0.07 |
| 40.90 | | | | | | | | | | | | | | | | -0.19 |

Table IV – Continued

| REF | GENERATED | | | | | | COMPUTED | | | | | | ERROR | |
|---|---|---|---|---|---|---|---|---|---|---|---|---|---|---|
| $\alpha_I$ | $X_S$ | $X_3$ | $X_C$ | $Y_S$ | $Y_3$ | $Y_C$ | $\alpha_T$ | $X_S$ | $X_3$ | $X_C$ | $Y_S$ | $Y_3$ | $Y_C$ | $\epsilon_X$ | $\epsilon_Y$ |
| 41.2 | | | 66 | 0 | 66 | 0.3666° | 134.998 | 49.999 | 84.999 | 65.487 | 0.320 | 65.807 | 0 | |
| 41.45 | | | | | | (+) | | | | | (-) | | | | |
| 41.75 | | | 68 | 2 | 66 | 0.5162l° | 134.994 | 49.997 | 84.997 | 67.217 | 0.520 | 66.697 | 0 | 0.70 |
| 42.00 | | | | | | | | | | | | | | |
| 42.30 | | | 69 | | 67 | 1.5619° | 134.981 | 49.981 | 84.960 | 68.964 | 1.363 | 67.601 | -1.02 | 0.60 |
| 42.50 | 135 | | 85 | | | 1.9137° | 134.942 | 49.972 | 84.970 | 69.604 | 1.670 | 67.934 | -0.03 | 0.93 |
| 42.80 | | | 71 | 3 | 68 | 2.4422° | 134.905 | 49.955 | 84.950 | 70.568 | 2.131 | 68.437 | -0.05 | 0.44 |
| 43.10 | | | | | | | | | | | | | | |
| 43.35 | | | 73 | 4 | 69 | 3.4130° | 134.814 | 49.911 | 84.903 | 72.349 | 2.977 | 69.372 | -0.10 | 0.37 |
| 43.65 | | | | | | | | | | | | | | |
| 43.90 | | | | | | | | | | | | | | -0.16 |
| 44.20 | | | 76 | 5 | 71 | 4.9186° | 134.612 | 49.816 | 84.796 | 75.131 | 4.287 | 70.844 | -0.20 | |
| 44.42 | | | | | | | | | | | | | | |
| 44.70 | | | 78 | 6 | 72 | 5.5034 | 134.456 | 49.743 | 84.713 | 76.184 | 5.058 | 71.726 | -0.29 | -0.27 |
| 45.00 | | | | | | | | | | | | | | |
| 45.30 | | | 79 | | 73 | 6.0747 | 134.234 | 49.641 | 84.593 | 78.783 | 5.985 | 72.798 | -0.41 | -0.20 |
| 45.55 | 134 | | 84 | 80 | 7 | 73 | 7.3206 | 134.130 | 49.592 | 84.538 | 79.621 | 6.371 | 73.048 | 0.54 | 0.05 |
| 45.80 | | | | | | | | | | | | | | |
| 46.10 | 134 | 49 | 85 | 82 | 8 | 74 | 8.3081° | 133.876 | 49.476 | 84.400 | 81.473 | 7.221 | 74.252 | -0.60 | 0.25 |
| 46.40 | | | | | | | | | | | | | | |
| 46.65 | | | | | | | | | | | | | | |
| 46.90 | | | 85 | 9 | 76 | 9.7361° | 133.445 | 49.280 | 84.165 | 84.189 | 8.455 | 75.734 | -0.81 | -0.27 |
| 47.20 | | | | | | | | | | | | | | |
| 47.45 | 133 | | 84 | 86 | 10 | 76 | 10.7236° | 133.185 | 49.127 | 83.978 | 86.070 | 9.304 | 76.766 | -0.02 | 0.77 |
| 47.70 | | | | 88 | 11 | 77 | 11.1732° | 132.939 | 49.052 | 83.887 | 86.928 | 9.689 | 77.239 | -0.11 | 0.24 |
| 48.00 | 132 | | 83 | | | | 11.7131° | 132.730 | 48.959 | 83.771 | 87.960 | 10.151 | 77.809 | 0.77 | 0.81 |
| 48.22 | | | | | | | | | | | | | | |
| 48.50 | | | | 90 | 12 | 78 | 12.6143 | 132.358 | 48.793 | 83.565 | 89.687 | 10.919 | 78.768 | 0.57 | 0.77 |
| 48.80 | | | | | | | | | | | | | | |
| 49.10 | | | | | | | | | | | | | | |
| 49.35 | | 48 | 84 | 93 | 13 | 80 | 14.1496 | 131.656 | 48.483 | 83.173 | 92.638 | 12.223 | 80.415 | -0.83 | 0.42 |
| 49.60 | 131 | | 83 | 94 | 14 | 80 | 14.6020 | 131.433 | 48.385 | 83.048 | 93.510 | 12.605 | 80.905 | 0.05 | 0.91 |
| 49.90 | | | | | | | | | | | | | | |
| 50.15 | | | | 96 | | 82 | 15.5984 | 130.914 | 48.159 | 82.755 | 95.431 | 13.445 | 81.786 | -0.25 | -0.01 |
| 50.40 | | | | 97 | 15 | 82 | 16.0518 | 130.666 | 48.051 | 82.615 | 96.307 | 13.825 | 82.402 | -0.39 | 0.48 |
| 50.70 | 130 | | 82 | 98 | | 83 | 16.5964 | 130.358 | 47.917 | 82.444 | 97.359 | 14.281 | 83.078 | 0.44 | 0.08 |
| 51.00 | | | | | | | | | | | | | | 0.08 |
| 51.2 | | | | 100 | 16 | 84 | 17.5650 | 129.819 | 47.685 | 82.134 | 99.115 | 15.039 | 84.076 | 0.13 | |
| 51.5 | 129 | | 81 | | | | 18.0508 | 129.981 | 47.539 | 81.942 | 100.171 | 15.493 | 84.678 | 0.94 | 0.68 |
| 51.8 | | | | | | | | | | | | | | |
| 52.05 | | | | | | | | | | | | | | |
| 52.30 | | | | 104 | 18 | 86 | 19.5083 | 128.582 | 47.130 | 81.392 | 102.990 | 16.697 | 86.293 | -0.61 | 0.29 |
| 52.60 | | | | | | | | | | | | | | |
| 52.85 | | | | | | | | | | | | | | |
| 53.15 | | | | | | | | | | | | | | |
| 53.45 | 127 | 46 | 81 | 107 | 19 | 88 | 21.6087 | 126.999 | 46.486 | 80.513 | 107.09 | 18.413 | 88.837 | -0.19 | 0.64 |
| 53.70 | | | | 108 | | 89 | 22.0661 | 126.645 | 46.358 | 80.307 | 107.933 | 18.784 | 89.149 | -0.69 | 0.15 |
| 54.0 | 126 | | 80 | 109 | 20 | 89 | 22.6153 | 126.210 | 46.155 | 80.055 | 108.992 | 19.227 | 89.765 | 0.06 | 0.77 |
| 54.2 | | | | 111 | 21 | 90 | 22.9017 | 125.913 | 46.031 | 79.882 | 109.698 | 19.522 | 90.176 | -0.16 | 0.18 |
| 54.5 | 125 | | 79 | | | | 23.5315 | 125.458 | 45.842 | 79.616 | 110.757 | 19.963 | 90.794 | 0.62 | 0.79 |
| 54.75 | | | | | | | | | | | | | | |
| 55.05 | | | | | | | | | | | | | | 0.65 |
| 55.40 | 124 | 45 | 79 | 114 | 22 | 92 | 25.1832 | 124.022 | 45.248 | 78.774 | 113.929 | 21.276 | 92.653 | -0.23 | |
| 55.60 | | | | 115 | | 93 | 25.5507 | 123.620 | 45.110 | 78.578 | 114.683 | 21.565 | 93.068 | -0.48 | |
| 55.90 | 123 | | 78 | 116 | 23 | 93 | 26.1021 | 123.178 | 44.901 | 78.277 | 115.688 | 21.999 | 93.689 | 0.28 | 0.69 |
| 56.1 | | | | 118 | | 95 | 26.4100° | 122.831 | 44.758 | 78.073 | 116.390 | 22.286 | 94.104 | -0.93 | -0.90 |
| 56.45 | | | | | | | | | | | | | | |
| 56.75 | 121 | 44 | 77 | 119 | 24 | 95 | 27.2665 | 121.666 | 44.283 | 77.383 | 118.699 | 23.216 | 95.483 | 0.38 | 0.48 |
| 56.95 | | | | | | | | | | | | | | |
| 57.3 | | | | | | | | | | | | | | |
| 57.5 | | | | 122 | 25 | 97 | 29.0996 | 120.253 | 43.710 | 76.543 | 121.286 | 24.278 | 97.010 | -0.46 | 0.01 |
| 57.8 | 120 | 43 | 77 | | | 26 | 29.6025 | 119.666 | 43.474 | 76.192 | 122.331 | 24.699 | 97.632 | -0.81 | -0.37 |

Table IV — Continued

| REF | GENERATED | | | | | | COMPUTED | | | | | | | ERROR | |
|---|---|---|---|---|---|---|---|---|---|---|---|---|---|---|---|
| $\alpha_1$ | $X_S$ | $X_3$ | $X_C$ | $Y_S$ | $Y_3$ | $Y_C$ | $\alpha_T$ | $X_S$ | $X_3$ | $X_C$ | $Y_S$ | $Y_3$ | $Y_C$ | $E_X$ | $E_Y$ |
| 58.15 | 119 | | 76 | | | | 30.2186 | 118.967 | 43.192 | 75.775 | 123.546 | 25.188 | 98.850 | -0.23 | 0.36 |
| 58.35 | | | | 125 | 26 | 99 | 30.6181 | 118.560 | 43.029 | 75.531 | 124.299 | 25.466 | 98.773 | -0.47 | -0.0 |
| 58.70 | 118 | 42 | 76 | 126 | | 100 | 31.2648 | 117.835 | 42.739 | 75.096 | 125.448 | 25.950 | 99.998 | -0.90 | -0.50 |
| 59.0 | 117 | | 75 | | | | 31.8195 | 117.201 | 42.486 | 74.715 | 126.482 | 26.362 | 100.120 | -0.29 | 0.12 |
| 59.2 | | | | 128 | 27 | 101 | 32.1895 | 116.771 | 42.315 | 74.456 | 127.169 | 26.636 | 100.533 | -0.54 | -0.47 |
| 59.5 | 116 | | 74 | | | | 32.7446 | 116.117 | 42.054 | 74.063 | 128.197 | 27.045 | 101.152 | 0.06 | 0.15 |
| 59.7 | | | | 130 | 28 | 102 | 33.1149 | 115.684 | 41.879 | 73.795 | 128.881 | 27.316 | 101.565 | -0.21 | -0.44 |
| 60.05 | 115 | 41 | 74 | 131 | | 103 | 33.7631 | 114.886 | 41.567 | 73.319 | 130.074 | 27.788 | 102.286 | -0.68 | -0.71 |
| 60.28 | 114 | | 73 | | | | 34.1493 | 114.360 | 41.359 | 73.001 | 130.853 | 28.096 | 102.759 | 0 | -0.24 |
| 60.55 | | | | 133 | 29 | 104 | 34.6980 | 113.733 | 41.112 | 72.621 | 131.770 | 28.457 | 103.313 | -0.38 | -0.69 |
| 60.80 | 113 | 40 | 73 | | | | 35.3018 | 112.954 | 40.806 | 72.148 | 132.883 | 28.894 | 103.989 | -0.85 | -0.01 |
| 61.20 | 112 | | 72 | 134 | 30 | 104 | 35.8955 | 112.184 | 40.504 | 71.680 | 133.958 | 29.315 | 104.643 | -0.32 | 0.64 |
| 61.40 | | | | 136 | | 106 | 36.2667 | 111.696 | 40.314 | 71.382 | 134.627 | 29.577 | 105.056 | -0.62 | -0.95 |
| 61.72 | 111 | | 71 | | 31 | 105 | 36.8609 | 110.905 | 40.005 | 70.900 | 135.696 | 29.994 | 105.700 | -0.10 | 0.70 |
| 62.08 | 110 | | 70 | 137 | | 106 | 37.5297 | 109.999 | 39.652 | 70.347 | 136.886 | 30.459 | 106.425 | 0.35 | 0.43 |
| 62.25 | | | | | | | | | | | | | | | 0.48 |
| 62.60 | 109 | 39 | 70 | 139 | 32 | 107 | 38.4963 | 108.660 | 39.132 | 69.528 | 138.601 | 31.123 | 107.478 | -0.47 | |
| 62.93 | 107 | | 68 | | | | 39.1101 | 107.792 | 38.797 | 68.995 | 139.680 | 31.541 | 108.139 | 1.00 | |
| 63.10 | | | | | | | | | | | | | | | 1.14 |
| 63.45 | 106 | 38 | 68 | 141 | 33 | 108 | 40.0778 | 106.396 | 38.259 | 68.137 | 141.368 | 32.191 | 109.177 | 0.14 | 1.18 |
| 63.79 | 105 | | 67 | 142 | | 109 | 40.7108 | 105.464 | 37.901 | 67.563 | 142.463 | 32.612 | 109.851 | 0.56 | 0.85 |
| 63.95 | | | | | | | | | | | | | | | |
| 64.30 | 104 | 37 | 67 | | | | 41.6609 | 104.039 | 37.355 | 66.684 | 144.092 | 33.236 | 110.856 | -0.32 | -0.14 |
| 64.67 | 103 | | 66 | 145 | 34 | 111 | 42.3506 | 102.985 | 36.952 | 66.033 | 145.262 | 33.683 | 111.579 | 0.03 | 0.58 |
| 64.81 | | | | | | | | | | | | | | | |
| 65.15 | 101 | 36 | 65 | 147 | 35 | 112 | 43.2457 | 101.591 | 36.421 | 65.170 | 146.768 | 34.256 | 112.512 | 0.17 | 0.51 |
| 65.50 | 100 | | 64 | | | | 43.8988 | 100.557 | 36.038 | 64.529 | 147.855 | 34.669 | 113.186 | 0.53 | 1.19 |
| 65.67 | | | | | | | | | | | | | | | |
| 66.0 | 99 | 35 | 64 | 150 | 36 | 114 | 44.8321 | 99.053 | 35.459 | 63.594 | 149.392 | 35.252 | 114.140 | -0.41 | 0.14 |
| 66.37 | 98 | 34 | 64 | 151 | | 115 | 45.5231 | 97.920 | 35.031 | 62.889 | 150.518 | 35.677 | 114.841 | -1.11 | 0.16 |
| 66.5 | | | | 152 | | 116 | 45.7660 | 97.518 | 34.880 | 62.638 | 150.911 | 35.825 | 115.086 | -1.36 | -0.91 |
| 66.87 | 96 | | 62 | | | | 46.4573 | 96.363 | 34.445 | 61.918 | 152.023 | 36.243 | 115.780 | -0.08 | -0.22 |
| 67.2 | 95 | | 61 | 153 | 37 | 116 | 47.0742 | 95.318 | 34.053 | 61.265 | 153.004 | 36.612 | 116.392 | 0.27 | 0.39 |
| 67.35 | | | | | | | | | | | | | | | |
| 67.72 | 93 | 33 | 60 | 155 | 38 | 117 | 48.0466 | 93.646 | 33.426 | 60.220 | 154.533 | 37.184 | 117.349 | 0.22 | 0.35 |
| 68.09 | 92 | | 59 | | | | 48.7388 | 92.437 | 32.975 | 59.462 | 155.607 | 37.586 | 118.101 | 0.46 | 1.10 |
| 68.40 | 91 | 32 | 59 | 156 | | 118 | 49.389 | 91.412 | 32.692 | 58.820 | 156.490 | 37.917 | 118.581 | -0.18 | 0.58 |
| 68.85 | | | | 158 | 39 | 119 | 49.9997 | 90.912 | 32.406 | 58.506 | 156.925 | 38.077 | 118.848 | -0.47 | -0.15 |
| 68.90 | 89 | 31 | 58 | | | | 50.2550 | 89.734 | 31.969 | 57.765 | 157.916 | 38.445 | 119.471 | -0.24 | -0.47 |
| 69.30 | 88 | | 57 | 159 | | 120 | 51.0042 | 88.372 | 31.463 | 56.909 | 159.034 | 38.860 | 120.174 | -0.09 | 0.17 |
| 69.40 | | | | 160 | | 121 | 51.1915 | 88.028 | 31.336 | 56.672 | 159.311 | 38.962 | 120.349 | -0.31 | -0.65 |
| 69.77 | 87 | | 56 | 161 | 40 | 121 | 51.8348 | 86.798 | 30.862 | 55.886 | 160.328 | 39.339 | 120.989 | -0.11 | -0.01 |
| 70.12 | 85 | 30 | 55 | | | | 52.5408 | 85.522 | 30.410 | 55.112 | 161.278 | 39.609 | 121.589 | 0.11 | 0.0 |
| 70.50 | 84 | 29 | 55 | 162 | | 122 | 53.2532 | 84.177 | 29.914 | 54.263 | 162.290 | 40.064 | 122.232 | -0.74 | 0.23 |
| 70.61 | | | | 164 | | 124 | 53.4595 | 83.784 | 29.770 | 54.014 | 162.528 | 40.172 | 123.416 | -0.99 | -1.58 |
| 70.98 | | | | | | | | | | | | | | | |
| 71.32 | 81 | 28 | 53 | 165 | 41 | 124 | 54.7914 | 81.219 | 28.823 | 52.391 | 164.442 | 40.853 | 123.590 | -0.61 | -0.41 |
| 71.69 | 80 | | 52 | | | | 55.4057 | 79.662 | 28.331 | 51.531 | 165.329 | 41.199 | 124.190 | -0.47 | 0.17 |
| 71.81 | 79 | | 51 | 166 | 42 | 124 | 55.7109 | 79.418 | 28.168 | 51.250 | 165.692 | 41.310 | 124.382 | 0.26 | 0.38 |
| 72.18 | 78 | 27 | 51 | 167 | | 125 | 56.4055 | 78.042 | 27.666 | 50.316 | 166.619 | 41.699 | 124.930 | -0.62 | -0.03 |
| 72.55 | 77 | | 50 | 168 | | 126 | 57.1003 | 76.651 | 27.158 | 49.493 | 167.530 | 41.981 | 125.598 | -0.81 | -0.46 |
| 72.90 | 75 | 26 | 49 | | | | 57.7577 | 75.323 | 26.675 | 48.648 | 168.379 | 42.290 | 126.085 | -0.35 | 0.07 |
| 73.00 | | | | 170 | 43 | 127 | 57.9456 | 74.942 | 26.536 | 48.406 | 168.618 | 42.377 | 126.248 | -0.59 | -0.27 |
| 73.39 | 73 | 25 | 48 | | | | 58.6784 | 73.444 | 25.992 | 47.452 | 169.548 | 42.713 | 126.830 | -0.65 | -0.17 |
| 73.75 | 72 | | 47 | 171 | | 128 | 59.3549 | 72.048 | 25.466 | 46.562 | 170.381 | 43.017 | 127.364 | -0.44 | -0.64 |
| 74.10 | | | | | | | | | | | | | | | |
| 74.30 | 69 | 24 | 45 | 172 | 44 | 128 | 60.3649 | 69.101 | 24.420 | 44.681 | 172.079 | 43.631 | 128.449 | 0.32 | 0.45 |
| 74.60 | 68 | 23 | 45 | 173 | | 129 | 60.9580 | 68.704 | 24.276 | 44.328 | 172.308 | 43.711 | 128.585 | -0.77 | -0.41 |
| 74.95 | 67 | | 44 | | | | 61.6113 | 67.308 | 23.773 | 43.535 | 173.065 | 43.987 | 129.078 | -0.47 | 0.48 |
| 75.33 | 66 | | 43 | 174 | | 130 | 62.3261 | 66.756 | 23.222 | 42.534 | 173.077 | 44.280 | 129.599 | 0.53 | -0.40 |
| 75.70 | 64 | 22 | 42 | | | | 63.0223 | 64.279 | 22.692 | 41.597 | 174.654 | 44.589 | 130.095 | -0.40 | 0.10 |
| 76.08 | 63 | | 41 | 175 | 45 | 130 | 63.7801 | 62.726 | 22.091 | 40.635 | 175.433 | 44.858 | 130.570 | -0.37 | 0.68 |

Table IV — Continued

| REF | GENERATED | | | | | | COMPUTED | | | | | | | ERROR | |
|---|---|---|---|---|---|---|---|---|---|---|---|---|---|---|---|
| $\alpha_1$ | $X_5$ | $X_3$ | $X_6$ | $Y_5$ | $Y_3$ | $Y_6$ | $\alpha_T$ | $X_B$ | $X_3$ | $X_C$ | $Y_B$ | $Y_3$ | $Y_C$ | $\delta_X$ | $\delta_Y$ |
| 76.16 | 62 | 21 | 41 | 176 | | 181 | 63.000 | 62.397 | 22.006 | 40.991 | 175.594 | 44.091 | 130.697 | -0.61 | -0.80 |
| 76.52 | 61 | | 40 | 177 | | 182 | 64.045 | 60.912 | 21.474 | 40.400 | 176.311 | 45.150 | 131.157 | -0.56 | -0.84 |
| 76.90 | | | | | | | | | | | | | | | |
| 77.29 | 58 | 20 | 38 | 178 | 46 | 182 | 66.055 | 57.700 | 20.584 | 37.876 | 177.707 | 45.685 | 132.106 | -0.62 | 0.11 |
| 77.63 | 56 | 19 | 37 | | | | 66.659 | 56.367 | 19.018 | 36.944 | 178.917 | 45.907 | 132.510 | -0.55 | 0.51 |
| 77.72 | 55 | | 36 | 179 | | 183 | 66.9250 | 55.097 | 19.677 | 36.210 | 178.921 | 45.966 | 132.615 | 0.21 | -0.89 |
| 78.10 | 54 | 18 | 36 | 180 | | 184 | 67.5419 | 54.272 | 19.101 | 35.171 | 179.264 | 46.260 | 133.058 | -0.85 | | |
| 78.49 | | | | | | | | | | | | | | | |
| 78.86 | 51 | 17 | 34 | 181 | 47 | 184 | 68.9546 | 51.055 | 17.955 | 33.100 | 180.593 | 46.665 | 133.510 | -0.90 | -0.12 |
| 79.22 | 49 | | 32 | | | | 69.6519 | 49.453 | 17.386 | 32.063 | 181.148 | 46.880 | 134.260 | 0.07 | 0.87 |
| 79.60 | 47 | 16 | 31 | | | | 70.2683 | 47.799 | 16.799 | 31.000 | 181.750 | 47.094 | 134.666 | 0 | 0.66 |
| 79.67 | | | | 182 | | 185 | 70.5002 | 47.193 | 16.690 | 30.003 | 181.852 | 47.132 | 134.787 | -0.80 | -0.87 |
| 80.05 | 46 | | 30 | 183 | 48 | 185 | 71.2167 | 45.023 | 16.100 | 29.128 | 182.457 | 47.387 | 135.100 | -0.37 | 0.18 |
| 80.42 | 44 | 15 | 29 | | | | 71.9144 | 44.197 | 15.582 | 28.675 | 182.701 | 47.530 | 135.451 | -0.35 | 0.96 |
| 80.80 | 42 | 14 | 28 | | | | 72.6316 | 42.514 | 14.926 | 27.899 | 183.519 | 47.720 | 135.799 | -0.41 | 0.80 |
| 81.18 | 41 | | 27 | 184 | | 186 | 73.3477 | 40.823 | 14.328 | 26.495 | 184.086 | 47.903 | 136.200 | -0.51 | 0.71 |
| 81.55 | 39 | 13 | 26 | | | | 74.0657 | 39.168 | 13.744 | 25.424 | 184.534 | 48.074 | 136.446 | -0.50 | 0.98 |
| 81.93 | 37 | 12 | 25 | | | | 74.7605 | 37.461 | 13.143 | 24.318 | 184.797 | 48.245 | 136.785 | -0.68 | 0.94 |
| 82.30 | | | | 186 | | 188 | 74.8569 | 37.236 | 13.062 | 24.174 | 185.054 | 48.264 | 136.799 | -0.80 | -1.81 |
| 82.36 | 35 | | 23 | | | | 75.5789 | 35.520 | 12.457 | 23.063 | 185.510 | 48.423 | 137.087 | 0.06 | -0.91 |
| 82.74 | | | | | | | | | | | | | | | |
| 83.12 | 32 | 11 | 21 | 187 | 49 | 138 | 77.000 | 32.068 | 11.241 | 20.827 | 186.352 | 48.720 | 137.682 | -0.17 | -0.87 |
| 83.50 | 30 | 10 | 20 | | | | 77.7253 | 30.333 | 10.630 | 19.703 | 186.741 | 48.857 | 137.880 | -0.80 | -0.18 |
| 83.90 | 28 | 9 | 19 | | | | 78.1628 | 29.417 | 10.308 | 19.109 | 186.908 | 48.926 | 138.012 | 0.11 | 0.04 |
| 84.25 | 26 | 8 | 18 | | | | 78.5970 | 26.890 | 9.805 | 17.605 | 187.196 | 49.013 | 138.439 | -1.00 | 0.40 |
| 84.62 | 25 | | 17 | | | | 79.8395 | 25.164 | 8.820 | 16.964 | 187.363 | 49.216 | 138.547 | -0.64 | 0.55 |
| 85.01 | 24 | | 16 | 188 | | 139 | 80.0449 | 23.380 | 8.187 | 15.193 | 188.074 | 49.325 | 138.749 | -0.81 | -0.25 |
| 85.39 | 22 | 7 | 15 | | | | 81.2933 | 21.618 | 7.569 | 14.049 | 188.355 | 49.424 | 138.931 | -0.95 | -0.07 |
| 85.80 | 19 | 6 | 13 | | 50 | 138 | 82.0675 | 19.711 | 6.900 | 12.811 | 188.634 | 49.522 | 139.112 | -0.19 | 1.11 |
| 86.18 | 17 | 5 | 12 | | | | 82.7851 | 17.941 | 6.280 | 11.661 | 188.869 | 49.604 | 139.265 | -0.34 | 1.27 |
| 86.56 | 15 | | 10 | | | | 83.5121 | 16.143 | 5.650 | 10.493 | 189.085 | 49.680 | 139.405 | 0.68 | 1.41 |
| 86.95 | 14 | 4 | 10 | 190 | | 140 | 84.2392 | 14.342 | 5.019 | 9.323 | 189.279 | 49.748 | 139.531 | -0.68 | -0.47 |
| 87.33 | 12 | | 8 | | | | 84.9569 | 12.561 | 4.395 | 8.166 | 189.447 | 49.806 | 139.641 | 0.17 | | |
| 87.71 | 11 | 3 | 8 | | | | 85.6746 | 10.778 | 3.771 | 7.007 | 189.593 | 49.858 | 139.735 | -0.99 | | |
| 88.09 | 9 | | 6 | | | | 86.3923 | 8.993 | 3.146 | 5.847 | 189.717 | 49.901 | 139.816 | -0.15 | -0.18 |
| 88.47 | 7 | 2 | 5 | | | | 87.1100 | 7.206 | 2.521 | 4.685 | 189.818 | 49.936 | 139.882 | -0.32 | -0.12 |
| 88.85 | 5 | 1 | 4 | | | | 87.8272 | 5.394 | 1.887 | 3.507 | 189.898 | 49.964 | 139.934 | -0.49 | -0.07 |
| 89.23 | 3 | 0 | 3 | | | | 88.5569 | 3.600 | 1.259 | 2.341 | 189.955 | 49.984 | 139.971 | -0.66 | -0.03 |
| 89.61 | 1 | | 1 | | | | 89.2785 | 1.800 | 0.630 | 1.170 | 189.988 | 49.996 | 139.993 | 0.17 | -0.01 |
| 90. | 0 | | 0 | | | | 90. | 0 | 0 | 0 | 190. | 50. | 140 | 0 | 0 |

I claim:

1. Apparatus for displacing a tracing tool with respect to an article to trace thereon a two-lobed epitrochoid contour defined by the trace of point in a generating circle as it rolls around a base circle, the distance of the trace point from the center of the generating circle being $a$, the radius of the base circle being $b$ and equal to twice the radius of the generating circle, comprising:
   a data input for entering data relating to $a$ and $b$;
   an $R_1$ circle generator generating electrical signals representing a first circular path having a radius equal to $3b/2$;
   an $R_2$ circle generator generating electrical signals representing a second circular path having a radius equal to $a$;
   a circle coordinator coordinating the $R_1$ and $R_2$ circle generators such that the angle of rotation ($\alpha_2$) of the $R_2$ circle generator signals is substantially maintained at three times the angle of rotation ($\alpha_1$) of the $R_1$ circle generator signals;
   and control means controlled by said $R_1$ and $R_2$ generator signals for controlling the relative displacement of the tracing tool with respect to said article to trace thereon the two-lobed epitrochoid contour.

2. Apparatus as defined in claim 1, wherein said displacement is effected by two drives having mutually orthogonal axes of motion, and wherein:
   said $R_1$ circle generator generates a train of pulses for each axis;
   said $R_2$ circle generator generates a further train of pulses for each axis; and
   said control means is controlled by the axispulses of the $R_1$ and $R_2$ generators and generates command axis-pulses supplied to the respective axis drives to trace said contour.

3. Apparatus as defined in claim 2 wherein: said data input also enters feedrate command data;
   said control means includes a contour generator generating in response to said $R_1$ and $R_2$ generator axis-pulses, a train of contour axis-pulses for each axis corresponding to the coordinates of the contour being traced; and wherein said control means further includes a velocity control system operative to compare the entered feedrate command data with the vector of said contour axis-pulses and to produce $R_1$ feed pulses controlling the rate of pulse generation of said $R_1$ circle generator so that the generation of the contour axis-pulses by the contour generator is at the feedrate commanded by the entered feedrate command data.

4. Apparatus as defined in claim 2, wherein said circle coordinator includes coordinating means detecting the rate of generation of the $R_1$ generator axis-pulses and controlling in response thereto the rate of generation of $R_2$ generator axis-pulses so that $\alpha_2 = 3\alpha_1$.

5. Apparatus as defined in claim 4, wherein said coordinating means comprises:
an error register;
a sign detector detecting the sign of the error register;
means effective upon the generation of an $R_1$ generator axis pulse to increment the error register in one direction by three times the sum of the X-axis and Y-axis distances of the current point on the $R_2$ circle radius, and to generate, whenever the error register crosses zero due to that incrementing, an $R_2$ feedpulse supplied to the $R_2$ circle generator to produce another $R_2$ generator axis pulse; and
means effective upon the generation of an $R_2$ generator axis-pulse to increment the error register in the opposite direction by the sum of the X-axis and Y-axis distances of the current point on the $R_1$ circle radius, until the error register changes sign or becomes zero, such that the generation of each $R_1$ and $R_2$ generator axis-pulse increments the error register in the direction to approach zero.

6. Apparatus as defined in claim 1, wherein the tracing tool has a length $R_3$ from its center to its tracing edge, said data input including means for entering data corresponding to length $R_3$; said apparatus further comprising:
an $R_3$ circle generator generating electrical signals representing a third circular path having a radius $R_3$;
and a circle coordinator coordinating said $R_3$ circle generator so that the radius vector of the generated $R_3$ circle signals is always normal to the contour being traced;
said control means being controlled also by said $R_3$ circle generator signals and controlling the relative displacement of the center of the tracing tool with respect to the article to trace thereon the two-lobed epitrochoid contour.

7. Apparatus as defined in claim 6, wherein said displacement is effected by two drives having mutually orthogonal axes of motion; and wherein:
said $R_1$ circle generator generates a train of pulses for each axis;
said $R_2$ circle generator generates a further train of pulses for each axis;
said $R_3$ circle generator generates a still further train of pulses for each axis; and
said control means is controlled by the axis-pulses of the $R_1$, $R_2$ and $R_3$ circle generators and generates command axis-pulses supplied to the respective axis drives to trace said contour.

8. Apparatus as defined in claim 7, wherein said $R_3$ circle coordinator includes:
a tangent generator generating a train of tangent pulses for each axis representing the tangent of the contour being traced; and
coordinating means detecting the generation of said tangent axis-pulses and controlling in response thereto the generation of the $R_3$ generator axis-pulses so that the angle ($\alpha$) with respect to one orthogonal axis formed by the radius vector of the $R_3$ circle generator axis-pulses follows the angle ($\alpha_T$) with respect to the other orthogonal axis formed by the tangent to the current generated point on the contour.

9. Apparatus as defined in claim 8, wherein said $R_3$ circle coordinating means comprises:
an error register;
a sign detector detecting the sign of said error register;
means effective upon the generation of a tangent axis-pulse to increment said error register in one direction by the x-component of the current point on the $R_3$ circle generator for a y-axis tangent pulse and by the y-component of the current point on the $R_3$ circle generator for an x-axis tangent pulse, and to generate, whenever said error register is of one sign, an $R_3$ feed pulse supplied to the $R_3$ circle generator to produce another $R_3$ generator axis-pulse; and
means effective upon the generation of an $R_3$ generator axis-pulse to increment said error register in the opposite direction by the x-axis distance of the current point on the tangent to the contour if a y-axis pulse had been produced and by the y-axis distance of the current point on the tangent if the $R_3$ generator output was an x-axis pulse, until the error register changes sign or becomes zero, such that the generation of each tangent and $R_3$ generator axis-pulse increments the error register in the direction to approach zero.

10. Apparatus for generating command axis-pulses to be supplied to two drives having mutually orthogonal axes of motion to produce a resultant displacement of a tracing tool with respect to an article to trace thereon a two-lobed epitrochoid contour defined by the trace of a point in a generating circle as it rolls around a base circle, the distance of the trace point from the center of the generating circle being $a$, the radius of the base circle being $b$ and equal to twice the radius of the generating circle, comprising:
a data input for entering data relating to $a$ and $b$;
an $R_1$ circle generator generating a train of pulses for each axis representing a first circular path having a radius equal to $3b/2$;
an $R_2$ circle generator generating a train of pulses for each axis representing a second circular path having a radius equal to $a$;
a circle coordinator coordinating the rate of pulse generation of one of the circle generators with respect to the other such that the angle of rotation ($\alpha_2$) of the $R_2$ circle generator pulses is substantially maintained at three times the angle of rotation ($\alpha_1$) of the $R_1$ circle generator;
and control means controlled by the $R_1$ and $R_2$ generator axis-pulses for producing command axis-pulses to be supplied to the respective axes drives for tracing said contour.

11. Apparatus as defined in claim 10, wherein the generated command axis-pulses define the tool-center path of the tool, the tool having a length $R_3$ from its center to its tracing edge, the data input including means for entering data corresponding to length $R_3$; the apparatus further comprising:

an $R_3$ circle generator generating a train of pulses for each axis representing a third circular path having a radius of $R_3$;

and an $R_3$ circle coordinator coordinating the rate of pulse generation of the $R_3$ circle generator;

said $R_3$ circle coordinator including a tangent generator generating a train of tangent pulses for each axis representing the tangent of the contour being traced and coordinating means controlling the rate of generation of the $R_3$ generator axis-pulses so that the angle ($\alpha_3$) with respect to one orthogonal axis formed by the radius vector of the $R_3$ circle generator pulses follows the angle ($\alpha_1$) with respect to the other orthogonal axis formed by the tangent to the current generated point on the contour.

12. Apparatus for generating electrical signals to control the displacement of a tool with respect to a workpiece comprising:

a first circle generator generating electrical signals representing a first circular path having a radius $R_1$;

a second circle generator generating electrical signals representing a second circular path having a radius $R_2$;

and a circle coordinator including coordinating means detecting the rate of generation of the $R_1$ generator signals and controlling in response thereto the rate of generation of the $R_2$ generator signals such that the angle of rotation ($\alpha_2$) of the $R_2$ circle generator signals is substantially maintained at a multiple of $n$ times the angle of rotation ($\alpha_1$) of the $R_1$ circle generator signals.

13. Apparatus as defined in claim 12, wherein the tool is displaceable with respect to the X and Y axes, and wherein said circle generators each generates a train of axis-pulses for each of the X and Y axes.

14. Apparatus as defined in claim 13, wherein said coordinating means comprises:

an error register;

a sign detector detecting the sign of the error register;

means effective upon the generation of an $R_1$ generator axis-pulse to increment the error register in one direction by $n$ times the sum of the X-axis and Y-axis distances of the current point on the $R_2$ circle radius, and to generate, whenever the error register is of one sign, a feed pulse applied to the $R_2$ circle generator to produce another $R_2$ generator axis-pulse; and means effective upon the generation of an $R_2$ generator axis-pulse to increment the error register in the opposite direction by the sum of the X-axis and Y-axis distances of the current point on the $R_1$ circle radius, until the error register changes sign or becomes zero, such that the generation of each $R_1$ and $R_2$ generator axis-pulse always increments the error register in the direction to approach zero.

15. Apparatus for generating drive electrical signals to be supplied to drive means to produce a resultant movement of a tracing tool with respect to an article to trace thereon a specific contour, the tracing tool having a length R from its center to its tracing edge, comprising:

a contour generator generating contour electrical signals representing the contour to be traced;

a circle generator generating further electrical signals representing a circular path having a radius R;

a circle coordinator continuously receiving the contour electrical signals from the contour generator and coordinating the circle generator so that the radius vector of the generated circle signals is always normal to the contour being traced;

and a tool-center path signal generator utilizing both said contour electrical signals and further electrical signals to produce motion command electrical signals defining the path the center of the tool is to take in order to trace said contour at its tracing edge.

16. Apparatus as defined in claim 15, wherein said circle coordinator includes: a tangent generator continuously receiving the contour electrical signals from the contour generator and generating tangent electrical signals representing the tangent of the contour being traced.

17. Apparatus as defined in claim 16, wherein said drive means includes two drives having mutually orthogonal axes of motion, and wherein each of said generators generates a train of pulses for each of said two axes.

18. Apparatus as defined in claim 17, wherein said circle coordinator further includes coordinating means detecting the generation of the axis-pulses by the tangent generator and controlling in response thereto the generation of the circle generator axis-pulses so that the angle with respect to one orthogonal axis formed by the radius vector of the circle generator axis-pulses follows the angle with respect to the other orthogonal axis formed by the tangent to the current generated point on the contour.

19. A method of displacing a tracing tool with respect to an article to trace thereon a two-lobed epitrochoid contour defined by the trace of a point in a generating circle as it rolls around a base circle, the distance of the trace point from the center of the generating circle being $a$, the radius of the base circle being $b$ and equal to twice the radius of the generating circle, comprising:

generating $R_1$ electrical signals representing a first circular path having a radius equal to $3b/2$;

generating $R_2$ electrical signals representing a second circular path having a radius equal to $a$; coordinating the generation of the $R_1$ and $R_2$ circle signals such that the angle of rotation ($\alpha_2$) of the $R_2$ circle signals is substantially maintained at three times the angle of rotation ($\alpha_1$) of the $R_1$ circle signals;

and utilizing said $R_1$ and $R_2$ electrical signals for controlling the relative displacement of the tracing tool with respect to the article to trace thereon the two-lobed epitrochoid contour.

20. The method as defined in claim 19, wherein the tracing tool has a length $R_3$ from its center to its tracing edge, the method further comprising:

generating $R_3$ electrical signals representing a third circular path having a radius equal to $R_3$;

coordinating the generation of the $R_3$ electrical signals so that the radius vector of the generated $R_3$ circle is always normal to the contour being traced; and utilizing said $R_3$ electrical signals in addition to said $R_1$ and $R_2$ electrical signals, for controlling the relative displacement of the tool-center with respect to the article to cause the tracing edge of the tool to trace said two-lobed epitrochoid contour on the article.

21. The method as defined in claim 20, wherein the electrical signals generated are each in the form of a train of pulses for the X-axis and a train of pulses for the Y-axis.

22. The method as defined in claim 21, wherein the coordinating of the generation of the $R_3$ electrical signals is effected by generating tangent electrical signals in the form of a pulse train for each axis representing the tangent of the contour being traced, detecting the generation of the tangent axis-pulses, and controlling in response thereto the generation of the $R_3$ axis-pulses so that the angle with respect to one axis formed by the radius vector of the $R_3$ circle axis-pulses follows the angle with respect to the other axis formed by the tangent axis-pulses.

* * * * *